United States Patent [19]
Ozawa et al.

[11] Patent Number: 5,717,493
[45] Date of Patent: Feb. 10, 1998

[54] COMMUNICATION SYSTEM

[75] Inventors: Masatoshi Ozawa, Matsudo; Hideyuki Fukaya, Chigasaki; Masakazu Imanishi, Kawasaki; Yosuke Kanamori, Sakura, all of Japan

[73] Assignee: Matsushita Graphic Communication Systems Inc., Japan

[21] Appl. No.: 367,926

[22] Filed: Jan. 3, 1995

Related U.S. Application Data

[63] Continuation of Ser. No. 32,286, Mar. 17, 1993, abandoned.

[30] Foreign Application Priority Data

| Mar. 17, 1992 | [JP] | Japan | 4-60036 |
| Mar. 17, 1992 | [JP] | Japan | 4-60037 |
| Mar. 17, 1992 | [JP] | Japan | 4-60038 |
| Mar. 17, 1992 | [JP] | Japan | 4-60039 |
| Mar. 17, 1992 | [JP] | Japan | 4-60040 |
| Mar. 17, 1992 | [JP] | Japan | 4-60041 |
| Aug. 11, 1992 | [JP] | Japan | 4-213900 |
| Aug. 11, 1992 | [JP] | Japan | 4-213901 |
| Aug. 11, 1992 | [JP] | Japan | 4-213902 |
| Aug. 11, 1992 | [JP] | Japan | 4-213903 |
| Aug. 11, 1992 | [JP] | Japan | 4-213904 |

[51] Int. Cl.$^6$ .................................................. H04N 1/00
[52] U.S. Cl. ...................... 358/403; 358/400; 358/402; 358/435; 379/100
[58] Field of Search .................... 358/400, 403, 358/402, 405, 401, 435, 440; 379/219, 100, 92, 123, 13; H04N 1/00

[56] References Cited

U.S. PATENT DOCUMENTS

| 3,825,689 | 7/1974 | Baichtal et al. | 379/13 |
| 4,891,836 | 1/1990 | Takahashi | 379/100 |
| 4,956,721 | 9/1990 | Tasaki et al. | 358/402 |
| 4,970,603 | 11/1990 | Kanai | 358/400 |
| 4,994,926 | 2/1991 | Gordon et al. | 358/400 |
| 5,014,300 | 5/1991 | Harvath et al. | 379/100 |
| 5,057,935 | 10/1991 | Williams | 358/402 |
| 5,065,254 | 11/1991 | Hishida | 358/402 |
| 5,065,393 | 11/1991 | Sibbitt et al. | 379/92 |
| 5,068,888 | 11/1991 | Scherk et al. | 379/100 |
| 5,072,309 | 12/1991 | Brown | 358/403 |
| 5,136,632 | 8/1992 | Bernard | 379/123 |
| 5,200,993 | 4/1993 | Wheeler et al. | 358/402 |
| 5,227,893 | 7/1993 | Ett | 358/405 |
| 5,265,153 | 11/1993 | Ozawa | 379/100 |
| 5,299,255 | 3/1994 | Iwaki et al. | 358/402 |
| 5,381,242 | 1/1995 | Fujii | 358/468 |
| 5,404,231 | 4/1995 | Bloomfield | 358/400 |
| 5,425,081 | 6/1995 | Gordon et al. | 379/100 |
| 5,544,229 | 8/1996 | Creswell et al. | 379/100 |

Primary Examiner—Edward L. Coles, Sr.
Assistant Examiner—Madeleine AV Nguyen
Attorney, Agent, or Firm—Rossi & Associates

[57] ABSTRACT

A communication system that efficiently monitors a tones of a push-button phone which are sent from a facsimile or an adapter. The system further prevents a user from becoming offended by transmitting holding tones or music to a terminal during a period of time taken from retrieving and transferring image information.

4 Claims, 41 Drawing Sheets

VP : VOICE-PROCESSING

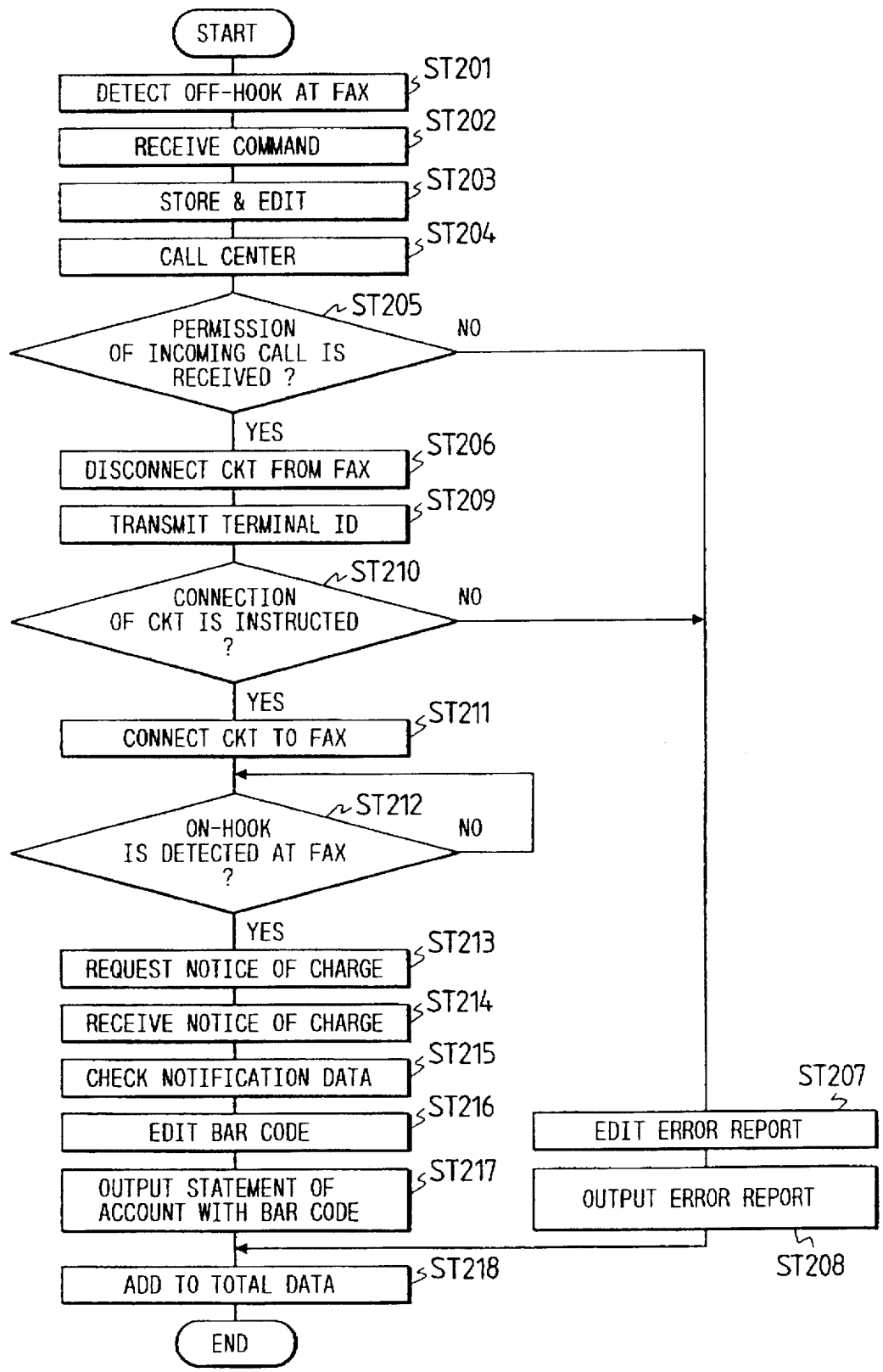

FIG. 8(a)
MESSAGE FAX
MESSAGE BOARD/REGISTRATION
1993/10/19  15:30
1 SHEET  ¥50
4904040300709
8110006
FIG. 8(b)
MESSAGE FAX
DIRECT COMMUNICATION
1993/10/19  15:30
38 SECONDS  ¥50
4904040300709
8110006
FIG. 8(c)
MESSAGE FAX
BULLETIN BOARD/OUTPUT
1993年10月19日  15:30
INFORMATION /PROCESSING
CHARGE    /CHARGE  FREE
4904040300709
8110006
FIG. 8(d)
COMMUNICATION ERROR REPORT
1993年10月19日  15:30
ERROR CODE    XX
TERMINAL ID:XXXXXXX
FIG. 8(e)
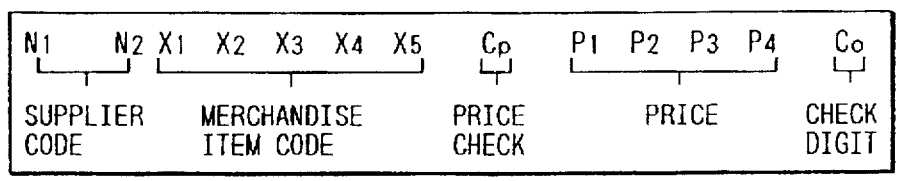
| N1  N2 | X1 X2 X3 X4 X5 | Cp | P1 P2 P3 P4 | Co |
| SUPPLIER CODE | MERCHANDISE ITEM CODE | PRICE CHECK | PRICE | CHECK DIGIT |

FIG. 33

INFORMATION STORED IN BOX MANAGEMENT DB

★★★ INDIVIDUAL ESTABLISHMENT (NEW/RENEWAL) ★★★                                   99/99/99

```
ESTABLISHMENT CODE              9    (0:NEW  1:RENEWAL)
BOX NO.                         999999999999
SERVICE CODE                    9    (2:POB  3:BULLETIN BOARD  4:MARK SHEET POB)
SUPPLIER PASSWORD               XXXXXXXXXXXX
REGISTRATION/OUTPUT PASSWORD    XXXXXXXXXXXX    (DEFAULT:REGISTRATION/OUTPUT ID SELECTION)
SUPPLIER CODE                   XXXXXXXXXXXX
BOX CHARGE CODE                 9    (0:CHARGED  1:FREE)
MARK SHEET FORMAT NO.           XXXXXX          CHECK NO. OF OMR SHEETS  9  (0:NECESSARY  1:UNNECESSARY)
OMR IMAGE              9        (0:PRESENT  1:ABSENT) APPLICATION      (9) (0:NECESSARY  1:UNNECESSARY)
NO. OF OMR SHEETS      99                          CONDITION ESTABLISHMENT
UNIT PRICE OF REFUND TO SUPPLIER  ￥ ZZ,ZZZ,ZZ9   UNIT PRICE FOR INFORMATION ￥ ZZ,ZZZ,ZZ9
UNIT PRICE OF CHARGE FOR READING  ZZ,ZZZ,ZZ9     DELETION AFTER OUTPUT 9  (0:NECESSARY  1:UNNECESSARY)
SUPPLIER CKT GROUP               XX                       ⟨4⟩
                                                 USER CKT GROUP          XX ⟨1⟩
⟨2⟩ 1ST DAY OF TERM OF CONTRACT  9999 / 99 / 99          (DEFAULT:TODAY)
    LAST DAY OF TERM OF CONTRACT 9999 / 99 / 99   LIMITLESS:9     (INPUT ONE OF 2 VALUES)
⟨3⟩ MAX NO. OF DOCUMENTS         999999           MAX NO. OF SHEETS       999
    STORAGE TIME                 99 HOURS 999 DAYS LIMITLESS:9    (INPUT ONE OF 3 VALUES)
    PRICE PER SHEET              ￥ ZZ,ZZZ,ZZ9.99  BOX CAPACITY CHARGE    ￥ ZZ,ZZZ,ZZ9
    ESTABLISHMENT UNIT COST      ￥ ZZ,ZZZ,ZZ9.99  ESTABLISHMENT CHARGE   ￥ ZZ,ZZZ,ZZ9
    STORAGE UNIT COST            ￥ ZZ,ZZZ,ZZ9.99  STORAGE TIME           ￥ ZZ,ZZZ,ZZ9
                                                   BOX CHARGE             ￥ZZZ,ZZZ,ZZ9
                                                              DESTINATION SCREEN NO.  XXX
⟨KEY INPUT TERMINAL⟩
```

FIG. 34

IN CASE THAT APPLICATION CONDITION IS ATTACHED

★★★ INDIVIDUAL ESTABLISHMENT (NEW/RENEWAL) ★★★     99/99/99

```
⟨5⟩  GROUP ID              99999999  99999999  99999999  999999999
⟨6⟩  AREA ID               99        99        99        99         99
⟨7⟩  G-FAX APPLICATION     9  (1:PERMIT  2:INHIBIT)
⟨8⟩  G-FAX AREA ID         9         99        99        99         99
     APPLICATION PATTERN   9  (1~5 NO INPUT IS REGARDED AS NOT DESIGNATED)
⟨9⟩  INDICATE DAY OF WEEK  9         9         9  (0:    1:    2:    3:    4:    5:    6:
     INDICATE DATE         99        99        99        99         99
     INDICATE MONTH        99        99        99        99         99 (99:
     INDICATE PERIOD       99~99     99~99     99~99     99~99
     IN MONTH              99~99     99~99     99~99     99~99      (99:
     INDICATE TERM         9999/99/99  ~  9999/99/99
                           9999/99/99  ~  9999/99/99
                           9999/99/99  ~  9999/99/99
⟨10⟩ INDICATE TIME         99:99~99:99  99:99~99:99
                           99:99~99:99  99:99~99:99
                           99:99~99:99  99:99~99:99
⟨11⟩ LIMIT TO NO. OF
     APPLICATIONS          9  (1:NONE  2:EVERY DAY  3:ACCUMULATION)
     NO. OF APPLICATIONS   999999  (ONLY IF THERE IS LIMIT THERETO)
```

⟨KEY INPUT TERMINAL⟩                              DESTINATION SCREEN NO. XXX

G-FAX : GENERAL-PURPOSE FAX

NDC : NOTICE OF DISCONNECTION OF CIRCUIT

T0 : OMR SHEET SENSING MARK
T1~Tn : TIMING MARK
I1~I2 : IMAGE INFORMATION AREA

FIG. 42

| | ORDER FORM | | | |
|---|---|---|---|---|
| ABC ELECTRIC CO., LTD | | | | 1990 7 21 |

| TRADE NAME | ITEM NO. | NO. | UNIT PRICE | AMOUNT |
|---|---|---|---|---|
| BS TUNER | EW-5346S | 3 | 29,800 | 89,400 |
| ANSWER PHONE | RD-9876TL | 10 | 58,000 | 580,000 |
| FAX | 123456 | 17 | 110,000 | 1,870,000 |
| REFRIGERATOR | GU-8763W | 2 | 248,000 | 496,000 |
| AIR CONDITIONER | AS-0910HW | 7 | 278,000 | 1,946,000 |
| TOTAL | | | | 4,981,400 |

⎫ N1

```
ADDRESS   : SHIMOMEGURO 2-3-8, MEGRO WARD, TOKYO
NAME      : ××× × CORPORATION
TELEPHONE : ○○-△△△△-□□□□
```
⎫ I1

DESIRED
DISPATCH DATE : 1990/7/27

⎫ N2

```
SERIAL CONTENTS : GOODS SHOULD REACH US IN THE MORNING.
                  IN PASSING, WE MAY MAKE ADDITIONAL ORDER
                  FOR ITEM NO. 123456. PLS CHECK STOCKS
```
⎫ I1

N1~N2 : AREAS CONVERTED FROM RESULTS OF RECOGNITION OF MARK
        SHEET INTO IMAGE
I1~I2 : IMAGE INFORMATION AREA EXTRACTED FROM OMR SHEET

COMMUNICATION SYSTEM

This is a Continuation of application Ser. No. 08/032,286 filed Mar. 17, 1993, now abandoned.

BACKGROUND OF THE INVENTION

1. Field of the Invention

This invention generally relates to a facsimile communication system in which facsimile terminals are connected by a telephone network with each other, and more particularly to a communication system provided with an image storage device as a central unit for storing and reading image data from each facsimile terminal, and to communication terminals employed in the communication system.

2. Description of the Related Art

In recent years, there has been rapid increase in utilization of facsimile devices. Further, a large facsimile network has been constructed. Moreover, various ways of utilizing such a facsimile network have been developed. For example, a broadcast communication method has been developed. Namely, in case of this method, a store-and-forward switching unit is provided in the facsimile network, and facsimile terminals are connected to a telephone network. Thus, a same message can be simultaneously sent from a facsimile terminals to a large number of facsimile terminals at designated time. Further, a mail box communication method has been also developed. Namely, in case of this method, a message sent from a facsimile terminal is registered by adding an identification (ID) number thereto and is stored in a store-and-forward switching unit and thereafter the stored message is read therefrom by another facsimile by using the same ID number.

Such a conventional communication system, however, does not have various functions necessary for performing an efficient communication. The present invention is created to solve such a problem of the conventional communication system.

It is, therefore, an object of the present invention to provide an improved communication system which can perform an efficient communication.

Practically, it is an object of the present invention to provide a communication system which can efficiently monitor a tone of a push-button phone (hereunder referred to as a PB tone), which is sent from a facsimile (FAX) or an adapter (ADP).

Further, it is another object of the present invention to provide a communication system which can send a holding tone to a receiving terminal during designated image information is outputted.

SUMMARY OF THE INVENTION

To achieve the foregoing object, in accordance with an aspect of the present invention, there is provided a communication system which comprises communication processing means being capable of receiving a manual control command issued by a manual operation and an automatic control command issued by a central processing unit, first error processing means for standing by for a manual control command for a first predetermined period of time after a predetermined processing is performed by the communication processing means, and for performing an error processing in case where no manual control command is received during the first predetermined period of time, and second error processing means for standing by for an automatic control command for a second predetermined period of time after a predetermined processing is performed by the communication processing means, and for performing an error processing in case where no automatic control command is received during the second predetermined period of time.

Further, to achieve the foregoing object, in accordance with another aspect of the present invention, there is provided a communication system which comprises a central unit for storing facsimile information, a receiving terminal for receiving the stored facsimile information, a repeating unit provided on a communication channel between the receiving terminal and the central unit, a control means provided in the central unit for retrieving the facsimile information stored in the central unit and transferring the retrieved information to the repeating unit in response to an instruction from the repeating unit, and a voice transmission means for transmitting holding tones at least during a period of time between a first moment, at which the retrieving of the information is started, and a second moment at which the transfer of the information is completed.

With the above described configuration, PB tones sent from the ADP or FAX can be efficiently monitored. Further, by transmitting holding tones (or a piece of music) to the FAX (namely, the terminal) during a period of time taken for retrieving and transferring image information, the system can prevent a user from being offended.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 7 is a flowchart for illustrating an operation of the ADP in case of performing the functions of requesting calculation of charge and receiving a notice of the calculated charge;

FIGS. 8(a) to 8(e) are diagrams for illustrating examples of bills outputted by using a bar code;

FIG. 33 is a diagram for illustrating information stored in a BOX management data base;

FIG. 34 is a diagram for illustrating information stored in a BOX management data base in case where conditions of acceptance are predetermined;

FIG. 42 is a diagram for illustrating an example of a draft outputted in case of a mark sheet POB service.

DETAILED DESCRIPTION OF THE PREFERRED EMBODIMENT

Hereinafter, the preferred embodiment of the present invention will be described in detail by referring to the accompanying drawings.

Figure 1:
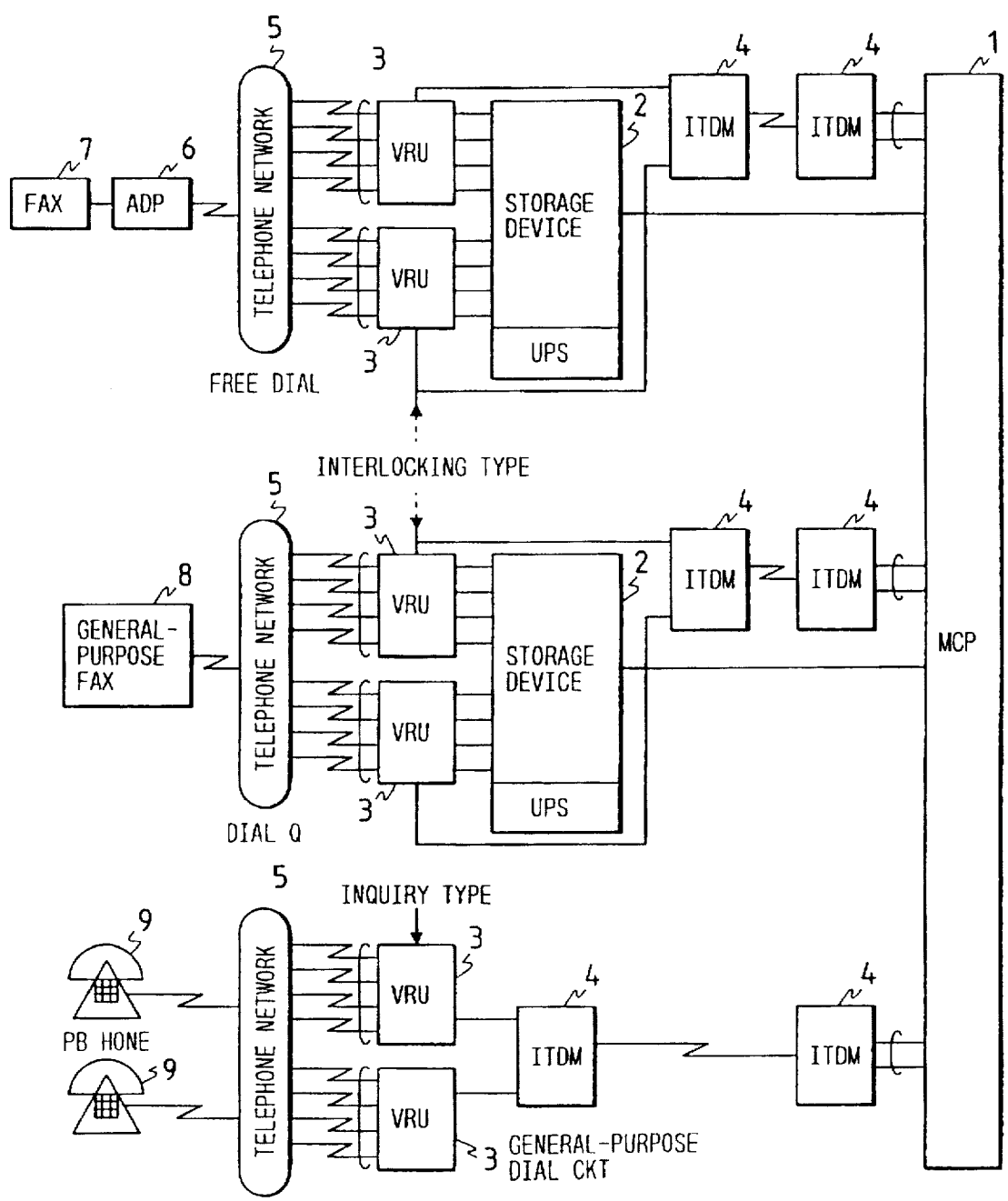
FIG. 1 is a schematic block diagram for illustrating the configuration of a communication system embodying the present invention.

FIG. 1 is a diagram for illustrating the configuration of the embodiment of the present invention.

In FIG. 1, reference numeral 1 denotes an MCP for controlling the entire system, storing image data or information, calculating charges, totalling charges and collecting statistical information; 2 a storage device for storing messages sent from a FAX terminal and the MCP 1, for performing the function of a telephone having a PB tone and for serving as a FAX server which stores a message sent from a FAX terminal in accordance with instructions from the MCP 1 and transmits the stored message to a requesting FAX terminal; 3 a VRU for recognizing various instruction information from a FAX terminal to the MCP 1 by means of PB tones, for notifying the MCP 1 of the instruction information, for converting instructions issued by the MCP 1 into PB tones, for transmitting the PB tones and for giving the instructions to a FAX operator with a voice; 4 an intelligent modem (hereunder referred to as Intelligence Time Division Multiplexer (ITDM)); 5 a public telephone network; 6 a terminal adapter (ADP) for performing a dialing function, by which a subsequent FAX 7 has accesses to the telephone network 5 and the VRU 3, and for receiving from the MCP 1 a notice of charges for communication with the FAX 7 and for printing out the charges; 8 a general-purpose FAX for connecting and communicating with the VRU 3 directly through the telephone network 5 without the ADP 6 intervening therebetween differently from case of the FAX 7; and 9 a PB phone for communicating with the VRU 3 through the telephone network 5. Incidentally, the FAX terminal is a general term for the ADP 6, the FAX 7 and the general-purpose FAX 8.

Figure 2:
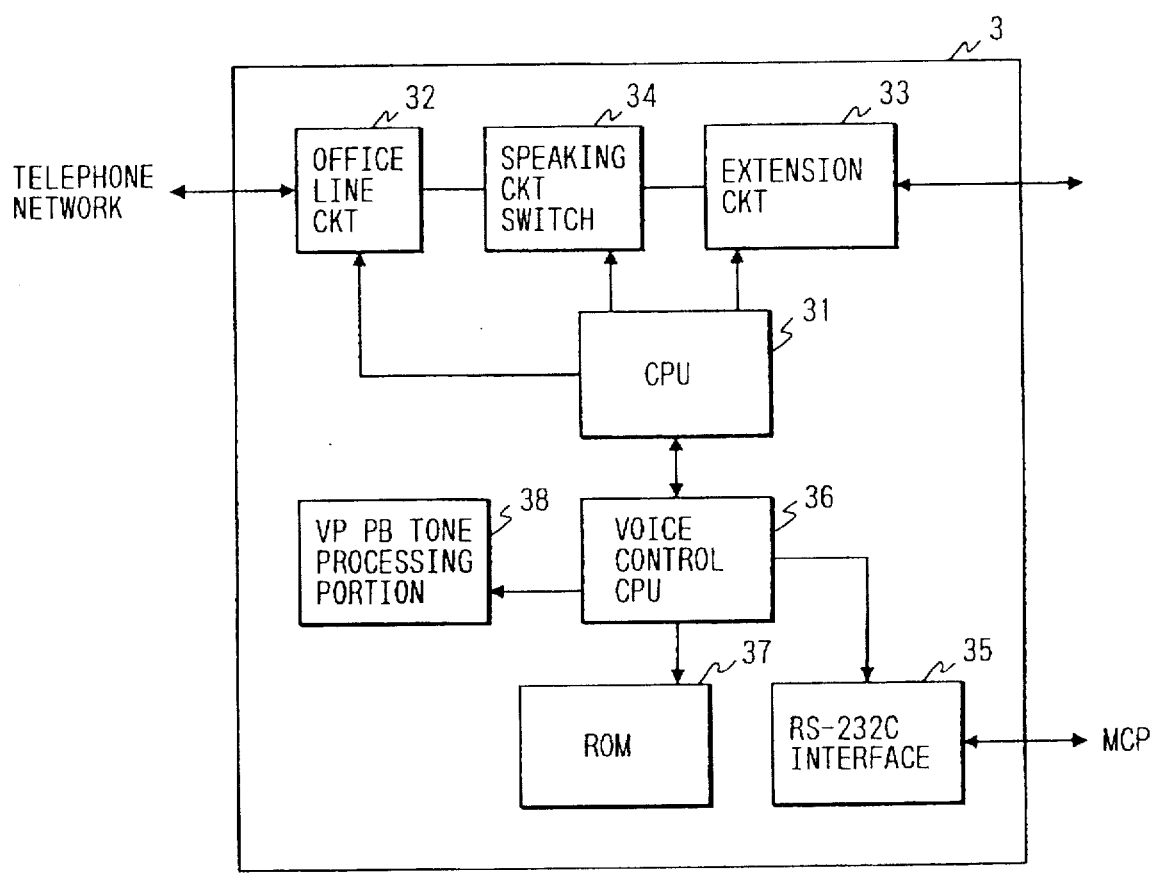
FIG. 2 is a block diagram for illustrating the configuration of a voice response unit (hereunder abbreviated as a VRU) employed in the embodiment of FIG. 1.

FIG. 2 is a block diagram for illustrating the configuration of the VRU. As shown in this figure, the VRU 3 consists of a communication management system and a voice response system. The communication management system is controlled by an exchange control central processing unit (CPU) 31. Further, the communication management system is comprised of an office line circuit 32 connected to the telephone network 5, an extension circuit 33 connected to the storage device 2, a speaking circuit switch 34 for connecting or disconnecting between the office line circuit 32 and the extension circuit 33, and an RS-232C interface 35 connected to the MCP 1.

The voice response system is controlled by a voice control CPU 36. Further, the voice response system transmits voices stored in a voice response read-only memory (ROM) 37 according to instructions from the MCP 1, which are inputted from the RS-232C interface 35, to the FAX 7, the general-purpose FAX 8 or the PB phone 9 through the office line circuit 32 and the telephone net work 5. A speech-processing PB-tone processing portion 38 communicates with the FAX 7 by using PB tones (namely, signals representing numerals 0 to 9, symbols # and *, and alphabetical characters A to D). Further, the portion 38 communicates with the MCP 1 by means of American Standard Code for Information Interchange (hereunder referred to as ASCII code). Therefore, the conversions of the PB tones and the ASCII code are necessary and thus are performed. Incidentally, in this embodiment, there are four lines connected with the voice-processing PB-tone processing portion 38.

The VRU 3 further performs the following operation together with the MCP 1. Namely, after voice guidance is transmitted, the interval between each pair of consecutive PB tones transmitted from the FAX 7 is monitored at predetermined regular time intervals (hereunder referred to as predetermined timer values). If the next PB tone is detected within the predetermined timer value, an error notice is sent to the MCP 1. Then, the VRU operates in accordance with instructions issued from the MCP 1. This timer value can be set as a predetermined value. It is, however, preferable that the timer value should be changed depending on which of the ADP 6 and the FAX 7 (namely, an operator) generates a PB tone to be transmitted. Practically, let T1 denote a timer value corresponding to a PB tone generated by the ADP 6. Further, let T2 denote a timer value corresponding to a PB tone generated by the FAX 7. These timer values are determined such that T1<T2. This is because of the fact that a response from the ADP 6 is quicker than that from the FAX 7 (namely, an operator). Namely, it is necessary for efficiently performing a communication to shorten the timer value T1.

Figure 3:
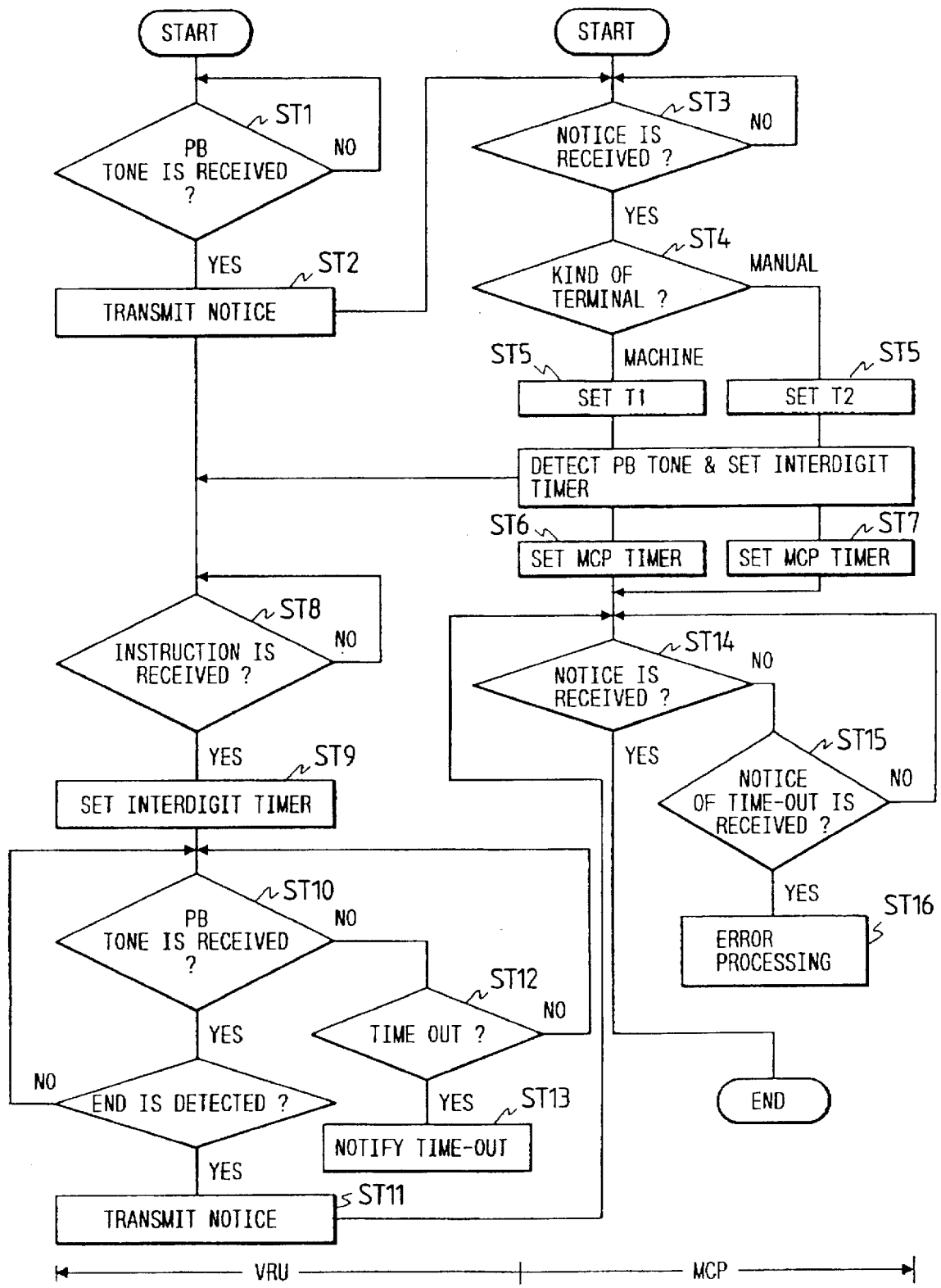
FIG. 3 is a flowchart for illustrating operations to be performed by the VRU and a main control processor (hereunder abbreviated as an MCP) when a PB tone is detected.

Hereinafter, operations to be performed by the VRU 3 and the MCP 1 in case of detecting PB tones will be described by referring to FIG. 3 which is a flowchart for illustrating such operations of the VRU 3 and the MCP 1. First, when the VRU 3 receives a PB tone transmitted from the ADP 6 or the FAX 7 in step ST1, the VRU 3 immediately informs the MCP of the reception of the PB tone in step ST2.

On the other hand, when the MCP 1 receives from the VRU 3 in step ST3 a signal indicating that the VRU 3 receives a PB tone, the MCP 1 judges in step ST4 which of the ADP 6 and the FAX 7 generates this PB tone. In step ST5, if this PB tone is sent from the ADP 6, the timer value T1 is set. If this PB tone is sent from the FAX 7, the timer value T2 is set in the same step. Further, in the former case, in step ST6, the MCP 1 issues to the VRU 3 a signal (hereunder sometimes referred to as a PB tone detection instruction signal) representing an instruction to detect a PB signal and another signal representing an instruction to set the timer value T1. Furthermore, a timer value for detecting a PB tone, which is employed in the MCP 1, is set in the same step. Moreover, in the latter case (namely, in case of the PB tone sent from the FAX 7), the timer value for detecting a PB tone, which is employed in the MCP 1, is similarly set in step ST7 as will be described later.

Incidentally, the timer value for detecting a PB tone, which is employed in the MCP 1, is a period of time required for detecting all PB tones sent from the FAX 7 or the ADP 6 and is nearly equal to a value obtained by multiplying the previously described timer value T1 or T2 by the number of digits represented by the signal indicating the PB tone.

In case where it is judged in step ST4 that the PB tone is sent from the ADP 6, when the VRU 3 receives the PB tone detection instruction signal sent from the MCP 1 in step ST8, the timer value T1 is set in step ST9. Then, the VRU 3 becomes in a receiving state and stands by for a PB tone (incidentally, this PB tone indicates registration or output operation, the number of a requesting terminal, and so on and is generated by the ADP 6) issued from the ADP 6 thereafter. Subsequently, it is judged in step ST10 whether or not such a PB tone (hereunder sometimes referred to as a "subsequent PB tone") has been received. If judged that such a PB tone has been received, it is further judged whether or not this PB tone represents a termination code. If not, the system returns to step ST10 again. Namely, the VRU 3 becomes in a receiving state again and stands by for the above described "subsequent PB tone" issued from the ADP 6 thereafter. In contrast, if the received PB tone represents a termination code, the VRU 3 immediately informs the MCP 1 of the completion of the reception of this PB tone in step ST11.

Furthermore, in case where no "subsequent PB tone" is received in step ST10, it is judged in step ST12 whether or not a quiescent time for reception reaches the timer value T1. If not, the VRU 3 is still in a receiving state and stands by for the "subsequent PB tone". If reaches (namely, in case of the time-cut), the VRU 3 informs the MCP 1 of the time-out in step ST13.

On the other hand, the MCP 1 is also in a receiving state and stands by for the signal issued in step ST11, which signal indicates that all of PB tones are normally received, in step ST14. In case where such a signal is not received in step ST15 even when the quiescent time exceeds the timer value set in step ST6, an error processing is performed in step ST16.

Further, if the PB tone received in step ST1 is that sent from the FAX 7, the MCP 1 sets the timer value T2 in step ST5 as described above. Moreover, similarly as in case of the operation of detecting the PB tone sent from the ADP 6, the MCP 1 transmits to the VRU 3 a PB tone detection instruction signal and a signal indicating an instruction to set the timer value T2. Thereafter, in step ST14, the MCP 1 sets the timer value for the detection, which is employed therein, and stands by for a signal indicating that all of PB tones transmitted from the VRU 3 are normally received.

Incidentally, an operation of the VRU to be performed in a period of time from a moment, at which the signal representing an instruction to set the timer value T2, to a moment, at which a signal informing of the normal reception of all of PB tones is transmitted, is similar to that to be performed at the time of detecting the PB tone sent from the ADP 6.

Thus, as the result of the fact that the timer value used for monitoring the interval between each pair of contiguous PB tones sent from the ADP 6 is different from that used for monitoring the interval between each pair of contiguous PB tones sent from the FAX 7, the response of the PB tone transmitted from the ADP 6 is quicker than that of the PB tone transmitted from the FAX 7. Therefore, the monitoring of PB tones can be efficiently performed.

Further, when the communication between the VRU 3 and the MCP 1 is interrupted by disconnecting the circuit or line, or when the system is not ready for performing a regular processing according to instructions from the MCP 1, the VRU 3 outputs a message indicating that the communication system is not available at present.

Moreover, when a FAX terminal requests a reading of a registered or stored message and the system is preparing for transmission of the message, a piece of music is transmitted to the FAX terminal. This music response is automatically stopped when the VRU receives the next instruction from the MCP 1. Hereinafter, such an operation will be described in detail by referring to a flowchart of FIG. 4.

Figure 4:
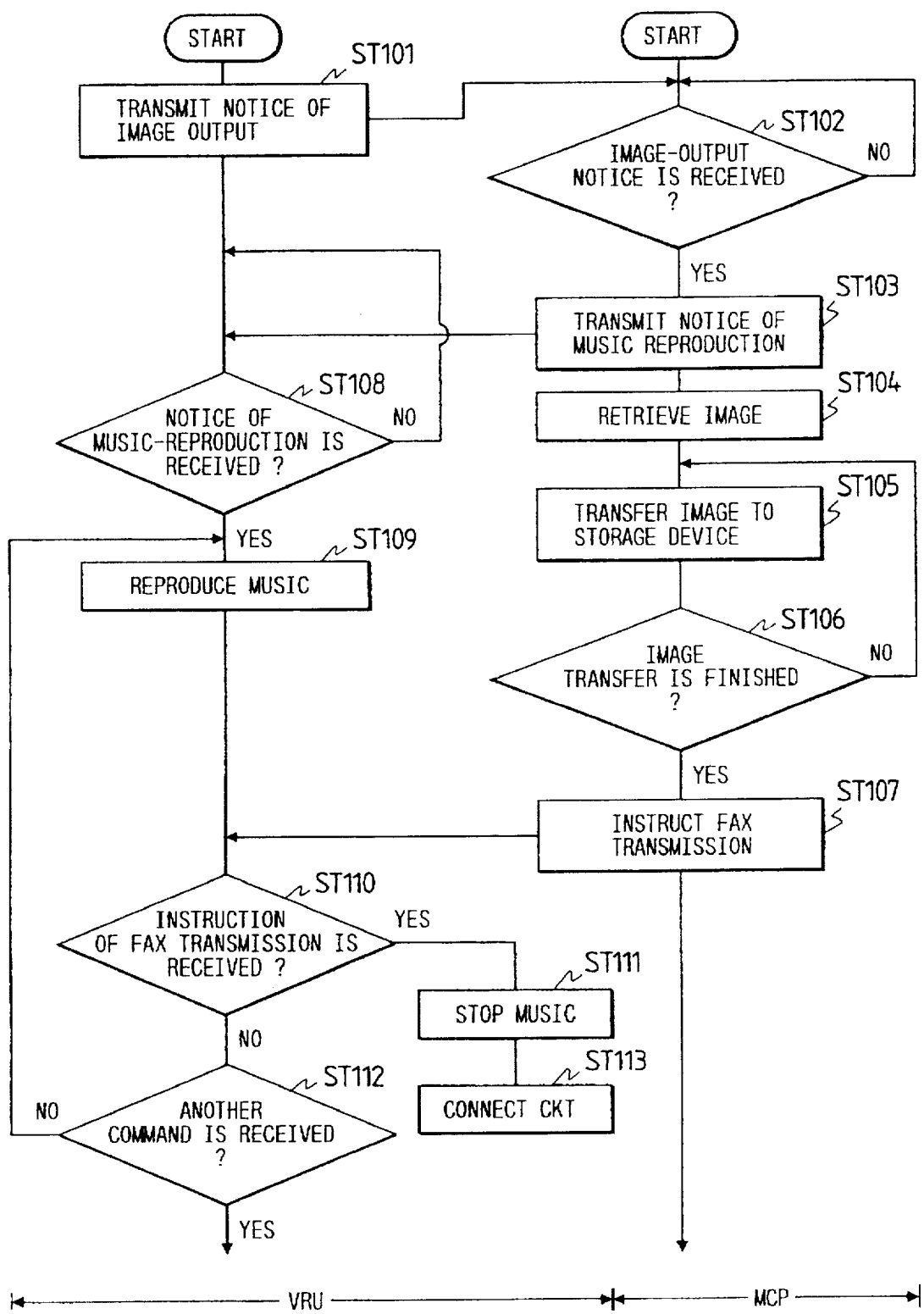
FIG. 4 is a flowchart for illustrating operations to be performed by the VRU and the MCP in order to transmit a signal representing a piece of music to a FAX.

As is shown in FIG. 4, when the VRU 3 receives from the FAX 7 a signal indicating that an image should be outputted, the VRU 3 immediately transmits such a signal to the MCP 1 in step ST101. When the MCP 1 receives this signal in step ST102, the MCP 1 transmits to the VRU 3 a signal representing an instruction to reproduce a piece of music in step 103. Further, the retrieval of the designated image is performed in step ST104. Furthermore, the retrieved image is transferred to the storage device in ST105. Upon completion of this transfer of the image in step ST106, the MCP 1 gives the VRU 3 an instruction to transmit the image to the FAX 7 in step ST107.

On the other hand, when the VRU 3 receives the signal issued in step ST103 representing the instruction to reproduce a piece of music in step ST108, the VRU 3 reproduces a piece of music and transmits the reproduced piece of music in step ST109. Further, when the VRU 3 receives the signal (hereunder sometimes referred to as the FAX transmission instruction signal) issued from the MCP 1 in step ST107, which signal represents an instruction to transmit a piece of music to the FAX 7, in step ST110, the VRU 3 stops the reproduction of the piece of music in step ST111. Then, in step ST113, the VRU 3 becomes in a receiving state and stands by for image information outputted by the MCP 1. Further, in case where the FAX transmission instruction signal is not received by the VRU 3, the VRU 3 judges in step ST112 whether or not another instruction or command is received. If not, the reproduction of the piece of music is further performed.

As stated above, during designated image information is retrieved by the MCP 1 and the retrieved image information is transferred, the VRU 3 reproduces a piece of music and transmits the reproduced piece of music to the FAX 7. Thus, an operator of the FAX can stand by without being offended during the retrieval and transfer of the image information. Incidentally, the time required for the transfer and retrieval of the image information is the major part of the entire communication time. Therefore, the above described effects becomes substantial.

Figure 5:
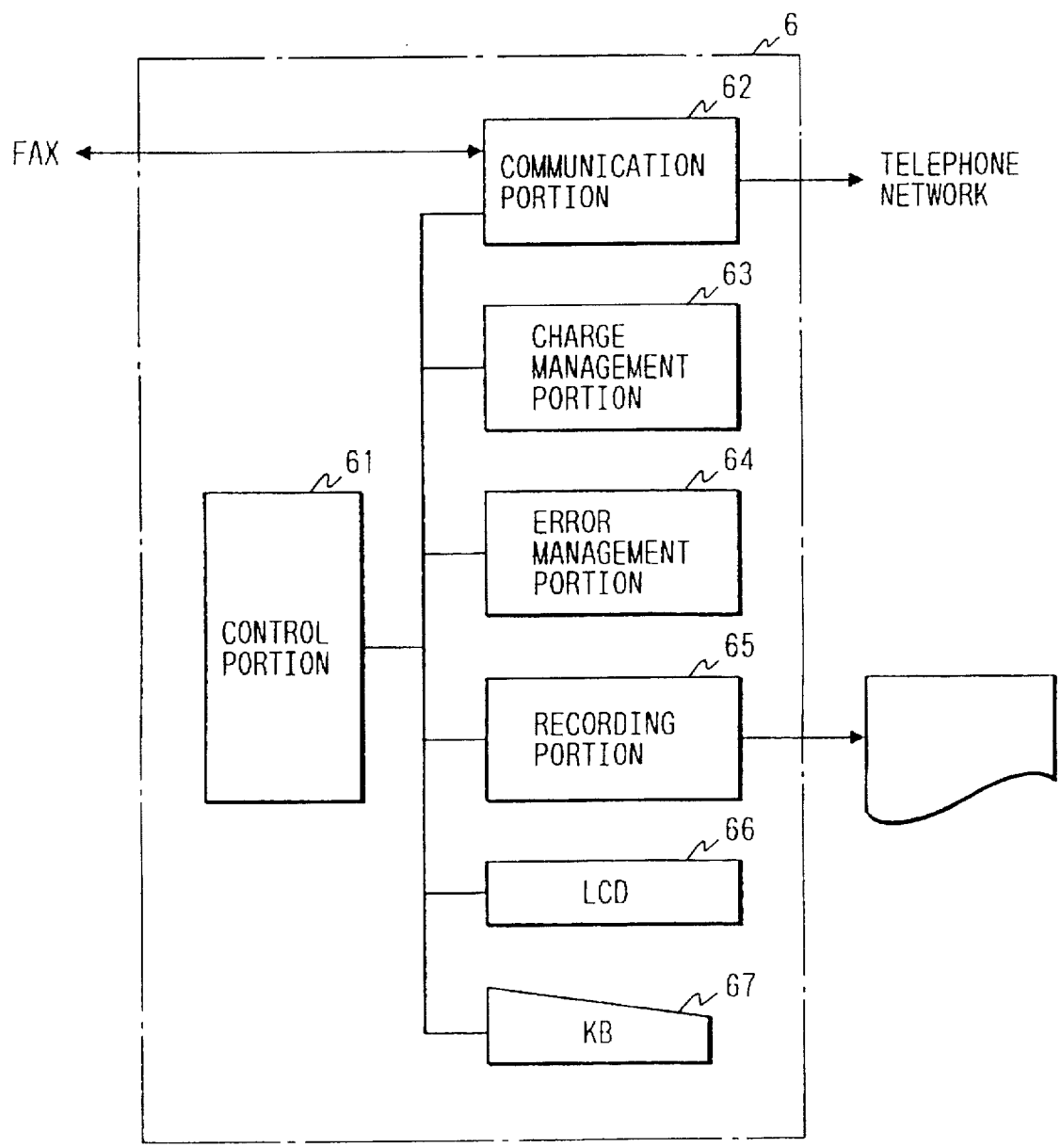
FIG. 5 is a block diagram for illustrating the configuration of an ADP employed in the embodiment of FIG. 1.
Figure 6:
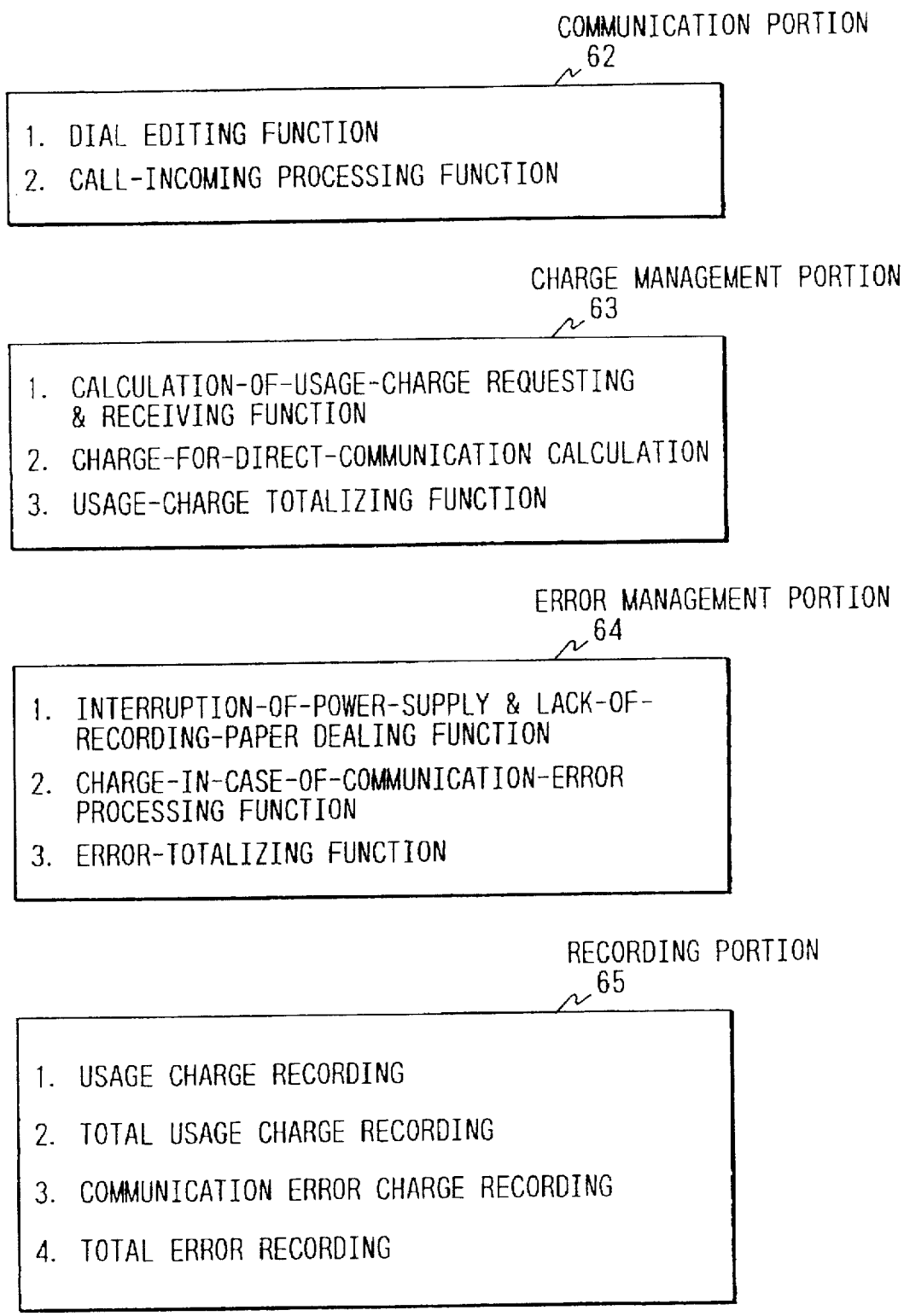
FIG. 6 is a diagram for illustrating the functions of composing elements of the ADP of FIG. 5.

FIG. 5 is a schematic block diagram for illustrating the configuration of the ADP 6. FIG. 6 illustrates the functions of the composing elements of the ADP 6 of FIG. 5 detailedly. As shown in FIG. 5, a communication portion 62 communicates with the VRU 3 through the FAX 7 and the telephone network 5. Further, the communication portion 62 has a dial editing function and a call-incoming processing function as illustrated in FIG. 6. This dial editing function is to conduct the following dialing operations according to the contents of a dialing signal transmitted from the FAX 7.

① Registration of a message in the storage device 2 and reading of a message therefrom.

② Restriction of dial transmission.

③ Transmission of an identification symbol (ID) of the FAX 7.

④ Direct communication in which a FAX 7 directly communicates with another FAX 7 or a general-purpose FAX 8.

Incidentally, a start-using-FAX button is provided in the ADP 6. A telephone circuit is connected between the FAX 7 and the ADP 6 by depressing this button.

Regarding the call-incoming processing function, the ADP 6 performs no processing on a call incoming from the telephone network 5 (namely, such a call passes through the ADP 6). Incidentally, such a call incoming is ignored during the ADP is being used and the power supply is interrupted.

A charge management portion 63 the function of requesting the MCP 1 to calculate a usage charge and receiving the result of the calculation, that of calculating a charge for a direct communication and that of accumulating the usage rates as illustrated in FIG. 6. Namely, after a massage is registered in the storage device 2 and a registered message is read therefrom, the FAX 7 requests the MCP 1 through the VRU 3 to calculate a usage charge. Further, the FAX 7 receives information on usage charge and time from the MCP 1 and then displays the information on the usage charge by using a liquid crystal display (LCD) 66. Moreover, a recording portion 65 prints out a statement of account indicating the usage charge and time. Furthermore, in case where a FAX 7 performs a direct communication with another FAX 7 or a general-purpose FAX 8, the communication time is monitored by the portion 63 after accepting a direct communication command. Thereafter, the calculation of usage charge, the displaying of usage charge and time on the LCD 66 and the printing thereof are performed. Moreover, the portion 66 has the function of totaling charges for usage of the system for a predetermined period of time (e.g., a predetermined number of hours, a day, or a month). Additionally, data indicating the total of the usage charges for the predetermined period of time (e.g., a month) is printed out by the recording portion 65 and is transmitted to the MCP 1. Incidentally, the printing-out of the usage charge may be performed by using a bar code instead of numerals.

Such a bar code includes data indicating a place at which the FAX 7 is positioned, the fact that this is a FAX communication, and a communication rate. Thereby, in case where a FAX 7 is placed in a superstore or the like, the calculation of a usage charge for this FAX 7 and a charge for bought goods can be easily effected by using a bar code reader.

The above-mentioned functions of requesting the calculation of usage charges and receiving the result of the calculation and calculating charges for the usage of a direct communication will be described further detailedly by referring to a flowchart of FIG. 7.

FIG. 7 is a flowchart for illustrating an operation of the ADP 6 which requests the calculation of usage charges and receives the result of the calculation. As shown in this figure, the ADP 6 first receives from the FAX 7 a signal representing Off-Hook in step ST201. Next, the ADP 6 receives a command from the FAX 7 in step ST202. This command instructs to register or output stored image information or data. When receiving this command, the ADP 6 generates and stores a command for accessing the center (namely, the MCP 1), which includes a terminal ID. Moreover, in step ST204, the ADP 6 makes a call through the telephone network in order to inform the MCP 1 of the fact that there is a request from the FAX 7 for registration or output of the image information or data. Thereafter, when receiving from the MCP 1 a signal (hereunder sometimes referred to as a incoming call permission signal) indicating the permission of an incoming call within a predetermined period of time in step ST205, the ADP 6 disconnects the circuit between it and the MCP 1 once in step ST206 in order to prevent sounds corresponding to PB tones, which are generated when transmitting the terminal ID or the like stored or edited by the ADP 6, from being heard by a user. Further, in case where no incoming call permission signal is received within a predetermined constant period of time, an error report is edited in step ST207 and is then outputted in step ST208. Upon completion of disconnection of the circuit between the ADP 6 and the MCP 1, the ADP 6 transmits to the MCP 1 a PB tone representing a center access command in step ST209. Thereafter, when a signal indicating that the circuit is connected between the ADP 6 and the MCP 1 is received by the ADP 6 in step ST210, the ADP 6 connects the circuit between the ADP 6 and the FAX 7, which was once disconnected in step ST206, in step ST211. Then, the ADP 6 performs the registration of image information in a BOX having a BOX NO. designated by the FAX 7 or reads image information from a BOX having a BOX NO. designated by the FAX 7.

Upon completion of such a processing, the ADP 6 receives from the FAX 7 a signal representing On-Hook in step ST212 and then transmits to the MCP 1 a signal representing a request for a notice of charge in step ST213. Further, when receiving from the MCP 1 in step ST214 a signal indicating that the MCP 1 notifies the ADP 6 of a charge for this communication, the ADP 6 checks data represented by this notice in step ST215. If correct, the data is edited by using a bar code in step ST216. Subsequently, the ADP 6 outputs the edited bar code as a statement of account describing a charge in step ST217. Further, the charge indicated by this statement of account is added to the total charge data in step ST218. This total charge data is used for totalizing the usage charge for a predetermined number of hours, a day or a month.

Incidentally, information on the statement of account outputted in step ST217, which indicates the usage charge, is held in a memory (not shown) provided in the ADP 6 until the next coming-call representing usage charge data is received. Further, as long as such information is held in the memory, the statement of account can be outputted in response to an operation effected by an operator.

FIGS. 8(a) to 8(e) show examples of the statement of account outputted as the result of the calculation of usage charge in the foregoing operation by using a bar code. As the result of outputting the statement by using a bar code, the usage charge for a communication, as well as the charge for bought goods, can be processed by a bar code reader. Namely, it is not necessary to settle the charge for a communication separately. This is very convenient for a user.

Hereinafter, the examples of the outputted statements of account of FIGS. 8(a) to 8(e) will be described practically.

FIG. 8(a) shows an example of the printed form outputted in the foregoing operation in case where information is registered in the center. In this example, characters "¥ 50 per sheet" and a corresponding bar code are printed. Thereby, a user can use this example as a statement of account. Further, a supplier of a terminal can use this example for printing an amount of a charge thereon. Moreover, ID NO. of a terminal is printed in the lower part of this example. Thereby, a supplier of a terminal can use this printed form for confirming the charge after the fact.

FIG. 8(b) shows an example in case of charging for a direct communication. This printed from describes communication time and thus can be used as a reference when utilizing a direct communication next time.

FIG. 8(c) shows an example in case where the usage charge is 0. Although the bar code represents 0, character "free" is printed as the result of the edition instead of characters "¥ 0". Thus the legibility can be improved.

FIG. 8(d) shows an example of an error report which indicates an ID NO. and can be used for confirming the charge.

FIG. 8(e) illustrates a rule of the arrangement of bar codes. As is seen from this figure, the bar codes include a supplier code representing a supplier of a terminal, a merchandise-item code representing a service using a terminal, a price code representing a charge for such a service, a price checking code for checking the mount of a charge and a checking digit. Especially, the price code is characterized in that in spite of the same service, the amount of the charge changes every time of communication. Namely, in general, a bar code corresponds to a fixed price of a kind of goods. Moreover, the price is usually stored in a memory of a register and thus the bar code does not represent the price directly. Further, the merchandise-item code and the price code directly representing the corresponding charge are included in the bar code. Thereby, in the same way as in case of buying goods in a retail store, the settlement of the charge can be effected by using a bar code.

Next, an operation of the ADP 6 in calculating a charge for a direct communication will be described hereinbelow. Here, note that charging operations as described later are performed to deal with an erroneous operation of an operator (for instance, in case where an operator has a wrong number). Thus such charging operations will be described hereinbelow before describing an operation of the ADP 6. The charging operations correspond to the following cases 1 to 6, respectively.

① Case 1 (in this case, the inversion 1 of the polarity is first effected after Off-Hook of the FAX 7, and thereafter a signal having the frequency of 2100 hertzes (Hz) is detected within 60 seconds. After that, more than 10 seconds later, On-Hook thereof or the inversion 2 of the polarity is detected.)

In this case, the charging is performed on the basis of communication time and distance by treating as effecting a usual direct communication.

② Case 2 (in this case, the inversion 1 of the polarity is first effected after Off-Hook of the FAX 7, and thereafter a signal having the frequency of 2100 Hz is detected within 60 seconds. After that, within 10 seconds, On-Hook thereof or the inversion 2 of the polarity is detected.)

In this case, a charging is not performed by regarding as suspending a transmission by an user as the result of noticing errors in dialing or in drafts just after the transmission is started.

③ Case 3 (in this case, the inversion 1 of the polarity is first effected after Off-Hook of the FAX 7, and thereafter, within 60 seconds, On-Hook thereof or the inversion 2 of the polarity is detected.)

In this case, a charging is not performed by regarding as suspending a transmission by an user as the result of noticing the fact that the user has wrong number.

④ Case 4 (in this case, the inversion 1 of the polarity is first effected after Off-Hook of the FAX 7, and thereafter, a signal having the frequency of 2100 Hz is not detected even when more than 60 seconds have passed.)

In this case, an error report is outputted without charging by regarding as the result of an occurrence of some failure.

⑤ Case 5 (in this case, the inversion of the polarity is not effected after Off-Hook of the FAX 7, and thereafter a signal having the frequency of 2100 hertzes (Hz) is detected. After that, more than 10 seconds later, On-Hook thereof is detected.)

In this case, the information supplier is charged by treating the operation effected from the detection of the signal of 2100 Hz to the On-Hook of the FAX 7 as effecting a Free Dial communication.

⑥ Case 6 (in this case, the inversion of the polarity is not effected after Off-Hook of the FAX 7, and thereafter a signal having the frequency of 2100 hertzes (Hz) is detected. After that, within 10 seconds, On-Hook thereof is detected.)

In this case, a charging is not performed by regarding as suspending a transmission by an user as the result of noticing errors in dialing just after a transmission is started in the Free Dial communication.

Thus, by effecting the charging operations according to various situations, an excellent communication system can be realized, which never charges a user unduly.

Figure 9:
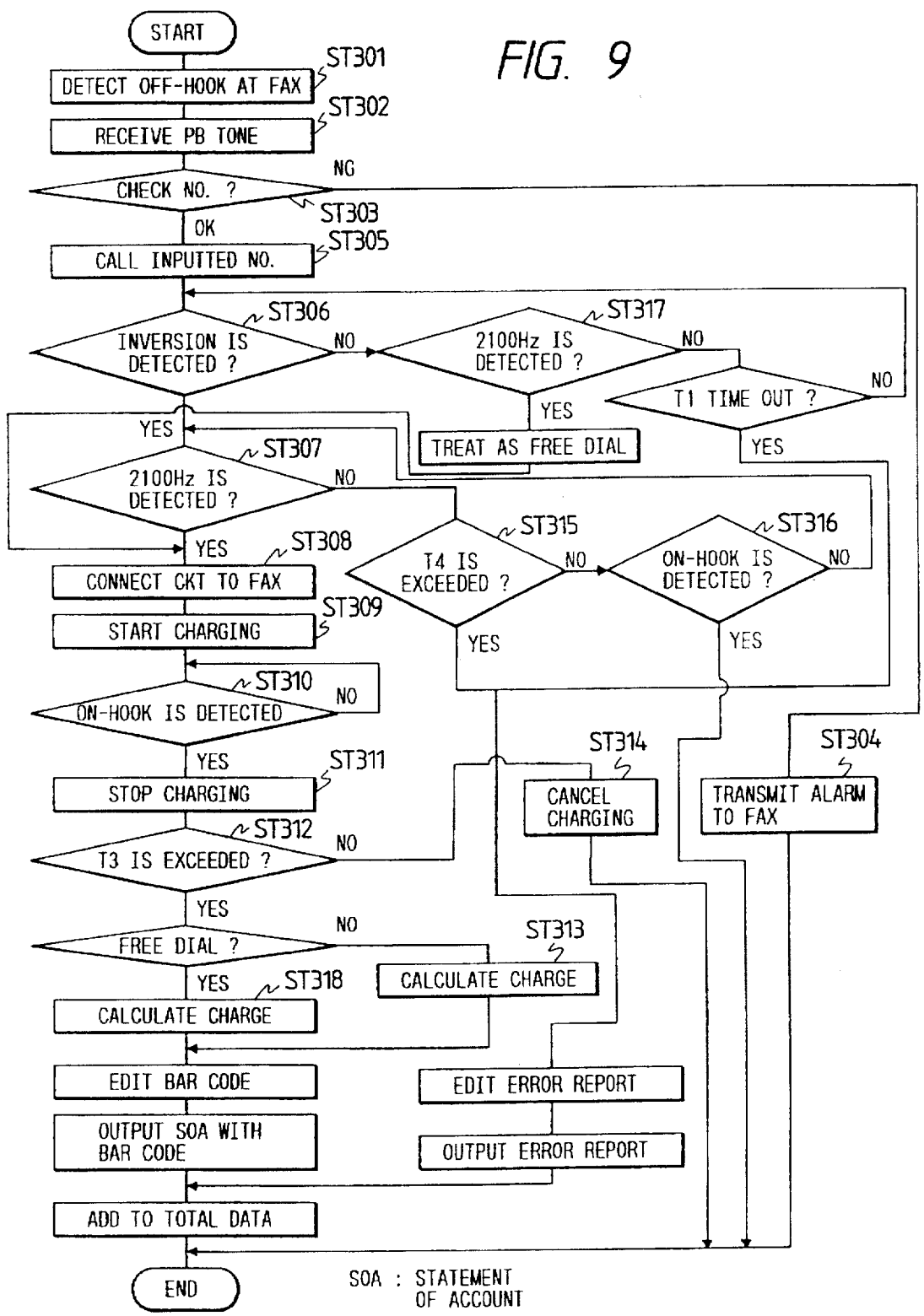
FIG. 9 is a flowchart for illustrating an operation of the ADP at the time of calculating charge for direct communication.

Hereinafter, an operation of the ADP 6 at the time of calculating a charge for a direct communication will be described by referring to FIG. 9.

As shown in this figure, the ADP 6 first receives a signal sent from the FAX 7 representing Off-Hook in step ST301. Next, the ADP 6 receives a PB tone from the FAX 7 representing a dial number in step ST302. Subsequently, this dial number represented by the PB tone is checked in step ST303. If the result of the checking is no good (NG), an alarm tone is transmitted to the FAX 7 in step ST304 and thus a charging operation is not effected. If NG is not found, a call is made by dialing the number inputted from the FAX 7 in step ST305. Thereafter, it is judged in step ST306 whether or not the inversion of the polarity indicating the presence of an incoming call from a receiving terminal is detected. If detected, it is further judged in step ST307 whether or not a signal having a frequency of 2100 Hz is detected within 60 seconds after the detection of the inversion of the polarity. If it is judged that the signal having the frequency of 2100 Hz is detected, the circuit is connected to the FAX 7 in step ST308 and a charging operation is started in step ST309. Thereafter, the charging operation is performed in step ST310 until On-Hook of the FAX 7 is detected. If On-Hook is detected, the charging operation is completed in step ST311. Further, it is judged in step ST312 whether or not a period of time from a moment, at which the signal having the frequency of 2100 Hz is detected, to another moment, at which On-Hook is detected, exceeds T3 (namely, 10 seconds in this case). Here, a case where such a period exceeds T3 corresponds to the above described Case 1. Thus, a charge is calculated on the basis of a communication time in step ST313. Moreover, operations of editing a bar code and outputting a statement of account using the bar code are effected according to the result of the calculation as previously described by referring to FIG. 7.

In contrast, a case where it is judged in step ST312 that the period of time between a moment, at which the signal having the frequency of 2100 Hz is detected, and another moment, at which On-Hook is detected, is equal to or less than 10 seconds, corresponds to the case 2 and therefore a charging operation is cancelled in step ST314.

Further, in case where a signal having the frequency of 2100 Hz is not detected in step ST307, it is judged in step ST315 whether such a signal is not detected since the detection of the inversion of the polarity for a period of time longer than T4 (namely, 60 seconds in this embodiment). As the result, in case where it is judged in step ST316 that such a period of time is not more than T4 and moreover On-Hook is detected, such a case corresponds to the case 3 and thus a charging operation is not effected. Additionally, a case where a signal having the frequency of 2100 Hz is not detected even when more than 60 seconds passes since the detection of the inversion of the polarity corresponds to the case 4, and therefore operations of editing an error report and outputting the error report are effected according to the result of the calculation as previously described by referring to FIG. 7.

Furthermore, in case where a signal having the frequency of 2100 Hz is detected in step ST317 but the inversion of the polarity is not detected, such a communication is treated as a Free Dial communication. However, in such a case, subsequent operations to be performed from steps ST308 to ST312 are similar to the corresponding operations to be effected in the case 1. Further, in such a case, similarly as in the case 1, it is judged in step ST312 whether or not a period of time between the detection of the signal having the frequency of 2100 Hz and that of On-Hook exceeds 10 seconds. If judged as exceeding 10 seconds, such a case corresponds to the case 5 (namely, such a communication is treated as a Free Dial communication) and thus an information supplier is charged. Moreover, a user is charged a cheap rate for the usage of the terminal in step ST318, and a statement of account is outputted by using a bar code.

Furthermore, in case where the inversion of the polarity is not detected in step ST306 and the signal having the frequency of 2100 Hz is detected in step ST317 and On-Hook is detected within 10 seconds since then in step ST312 similarly as the case 5, such a case is treated as corresponding to the case 6 and hence, a charging operation is cancelled in step ST314.

Additionally, in case where no inversion of the polarity occurs and a signal having the frequency of 2100 Hz is not detected within a constant period of time, an error processing is performed as above described.

Thus, in case of calculating a charge for a direct communication, it is determined according to various situations whether or not a charging operation is performed. Therefore, a user can be prevented from being charged unduly, for instance, in case where the user suspends a transmission of a draft because it is just after the starting of the transmission that he notices the fact that there is an error in the draft.

The principal functions of the charge management portion 63 has been described just hereinabove.

Next, as shown in FIG. 6, an error management portion 64 has the functions of dealing with an interruption of power supply and lack of recording paper, that of charging when a communication error occurs, and that of totalizing errors. When power supply is interrupted due to, for instance, an electricity failure or due to the fact that a plug socket is out of place, the FAX 7 is disconnected from the telephone network 5. Further, in case of lack of recording paper of the recording portion 65, such a disconnection state is maintained when the lack of recording paper is detected. Moreover, the portion 64 recognizes an error command represented by a PB tone sent from the VRU 3 and then outputs an error report. Similarly, in case that no error command is received and an abnormal termination is effected, or in case that an operator or user of the FAX 7 hangs up the receiver during the procedure is performed, an error report is outputted. Furthermore, in case where a communication error occurs during effecting a direct communication, an error report is similarly outputted and such a communication is treated as a free-charge call. These error reports are collected every predetermined period of time and are printed out by the recording portion 65.

Incidentally, commands or instructions (e.g., an instruction to print out charges for communications effected during a predetermined period of time) are inputted from a keyboard 67. Additionally, a control portion 61 controls each of the above described portions or units of the ADP 6.

In the foregoing description, the configuration and operations of each portion of the ADP 6 have been described. Hereinafter, in order to describe the calculation of a usage charge further detailedly, operations of the ADP 6, the VRU 3 and the MCP 1, which should be performed when the registration and output of image information is effected, will be described in each case of a normal situation and an abnormal situation.

Figure 10:
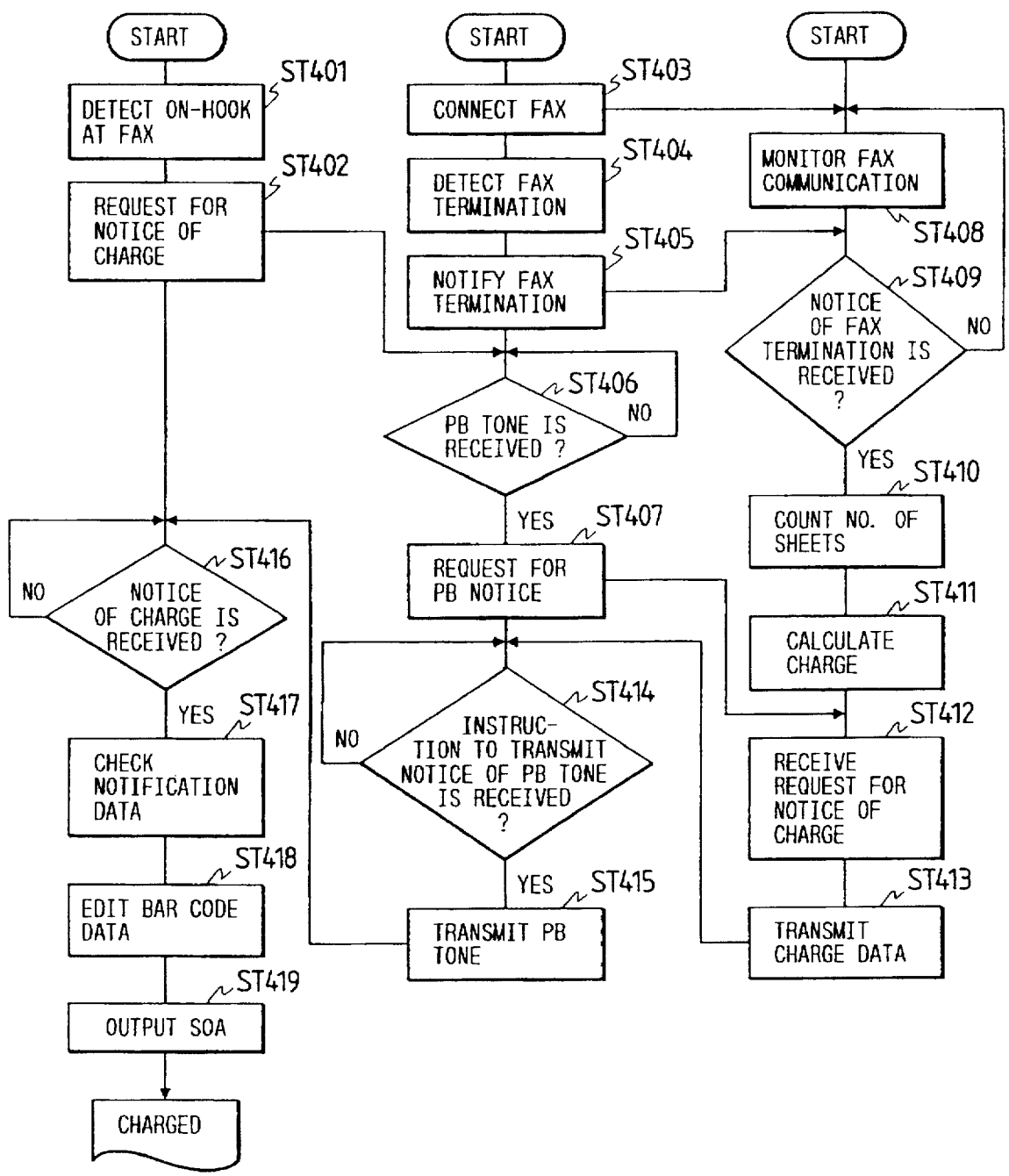
FIG. 10 is a flowchart for illustrating an operation of the entire communication system in case where the registration and output of image information are normally performed.

FIG. 10 is a flowchart for illustrating an operation of each of these portions 1, 3 and 6 in case where the registration and output of image information are normally performed. As shown in this figure, when the ADP 6 detects On-Hook of the FAX 7 in step ST401, the ADP 6 transmits to the VRU 3 a signal indicating a request for a notification of a charge in step ST402.

On the other hand, during the VRU 3 is connected to the FAX 7, the VRU 3 transmits a connection state signal to the MCP 1 continuously in step ST403. Further, the VRU 3 detects the termination of FAX communication from the result of the detection in step ST404 and transmits to the MCP 1 a FAX termination notification signal indicating the termination of FAX communication in step ST405. Thereafter, the VRU 3 is in a receiving state and stands by for a signal from the ADP 6 representing a request for a notice of a charge. When detecting the reception of this signal in step ST406, the VRU 3 immediately outputs to the MCP 1 in step ST407 a PB tone indicating that a notice of a charge is requested.

Further, the MCP 1 monitors the condition of a communication (namely, the registration and output of the image information) in step ST408 when receiving the signal in step ST403. When detecting the FAX termination notification signal sent from the VRU 3 in step ST409, the number of sheets of recording paper used for a communication is counted in step ST410 and subsequently a charge is calculated in step ST411 according to the counted number of sheets of recording paper. Moreover, upon completion of this operation, the MCP 1 is in a receiving state and stands by for the PB tone (namely, the signal sent in step ST407) sent from the VRU 3. When this signal is detected in step ST412, data representing a communication charge calculated in step ST411 is transmitted to the VRU 3 in step ST413.

When receiving the data representing a charge for a communication in step ST414, the VRU 3 transmits the received data to the ADP 6 in step ST415. When the ADP 6 receives the data representing a charge for a communication in step ST416, the ADP 6 checks the received data in step ST417 similarly as in case of FIG. 7 and edits the data as bar code data in step ST418 and outputs a statement of account using a bar code in step ST419.

Figure 11:
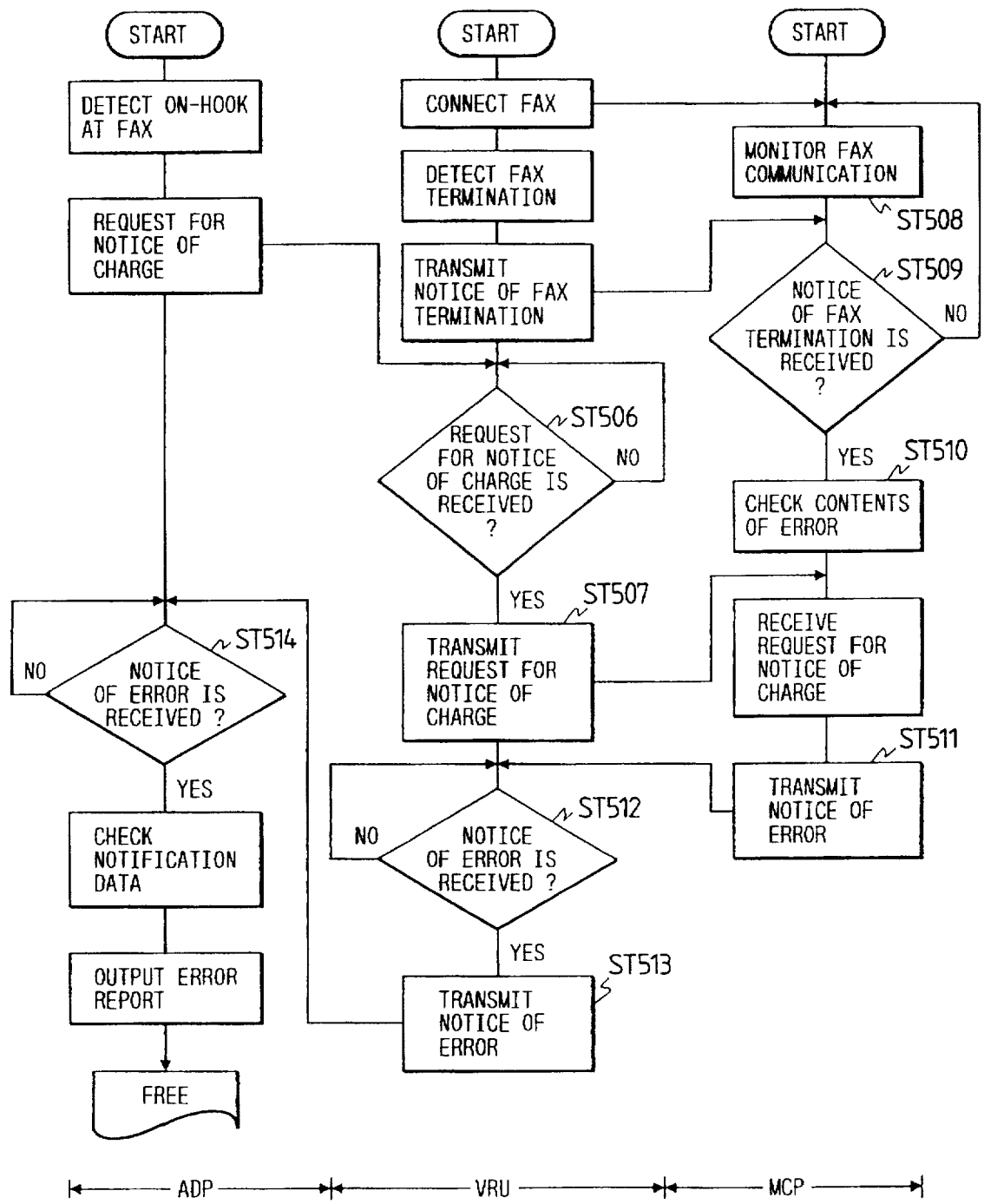
FIG. 11 is a flowchart for illustrating an operation of the entire communication system in case where the registration of image information is abnormally performed.

Further, FIG. 11 is a flowchart for illustrating an operation of each of these portions 1, 3 and 6 in case where the registration and output of image information are abnormally performed. In this case, a charging operation is not effected unless all image information is registered, as will be described later.

Namely, similarly as in case of FIG. 10, the ADP 6 transmits to the VRU 3 a signal representing a request for a notice of a charge. When the VRU 3 receives this signal in step ST506, the VRU 3 immediately transmits to the MCP 1 in step ST407 a PB tone indicating that a request for a notice of a charge is effected. (This operation is similar to the corresponding operation described by referring to FIG. 10.)

On the other hand, when judging as abnormal at the time of monitoring the operation of registering in step ST508, the MCP 1 checks the contents of an error in step ST510 after a FAX termination notification signal from the VRU 3 is detected in step ST509. Especially, in case where information described in a plurality of pages of recording paper is registered, when a communication error occurs halfway, information described on pages normally received is discarded and a charging operation is not performed but the contents of the error is analyzed. Further, when a signal representing a request for a notice of a charge is received from the VRU 3, the MCP 1 transmits to the VRU 3 in step ST511 a signal (hereunder sometimes referred to as an error notification signal) indicating that an error occurs in the registering operation.

When receiving this error notification signal in step ST512, the VRU 3 further transmits such a signal to the ADP 6 in step ST513. Then, the ADP 6 receives this signal in step ST514 and checks data representing the notice and outputs an error report.

As described above, when an error occurs during the registering processing, image information or data is discarded and such a processing becomes free of charge.

Figure 12:
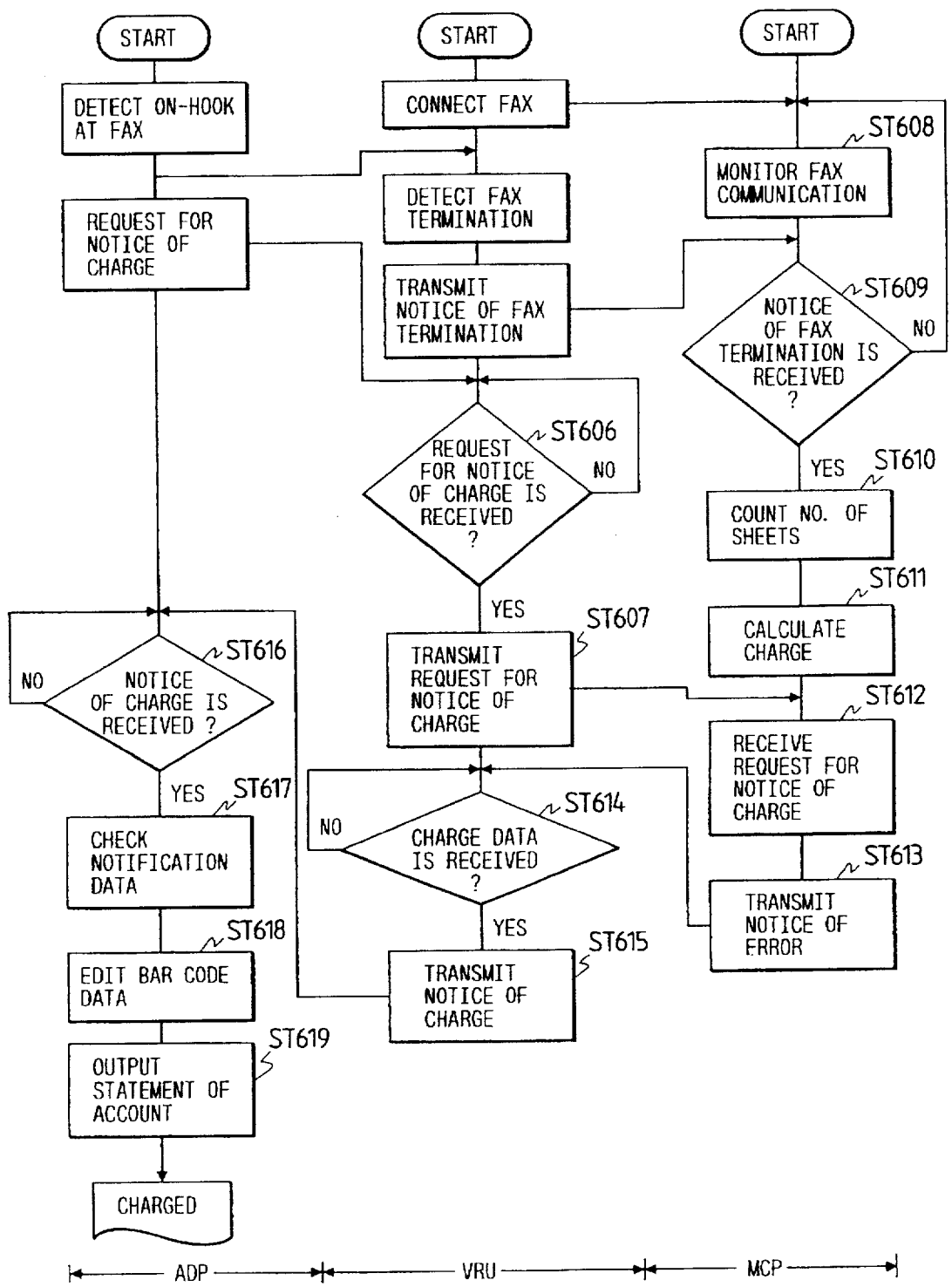
FIG. 12 is a flowchart for illustrating an operation of the entire communication system in case where the registration of image information is abnormally performed.

Referring next to FIG. 12, there is illustrated a charming operation in case where an error or failure occurs during an output processing. As shown in this figure, when the VRU 3 receives from the ADP 6 a signal representing a request for a notice of a charge in step ST606, the VRU 3 immediately transmits such a request to the MCP 1 in step ST607.

On the other hand, when judging as abnormal at the time of monitoring the operation of outputting in step ST608, the MCP 1 counts the number of pages of recording paper describing image information, which are normally transmitted, in step ST610 (incidentally, this operation is different from the operation of FIG. 11 to be performed in case of abnormal registration). In case of this counting operation, when a communication error occurs halfway, pages normally outputted are counted for charging for them. Naturally, if there are no pages normally outputted, no pages are counted.

Thereafter, a charge for a communication is calculated on the basis of the count in step ST611. Further, the MCP 1 becomes in a receiving state and stands by for data representing a charge for a communication. Then, when receiving the signal, which is transmitted in step ST607, in step ST612, the MCP 1 transmits to the VRU 603 in step ST613 the data generated in step ST611. Subsequent operations are similar to the corresponding operations of FIG. 10. Namely, the ADP 6 receives the data through the VRU 3 in steps ST614, ST615 and ST616. Then, the ADP 6 performs a bar-code edition in step ST618 and outputs a statement of account in step ST619.

Thus, differently from the case of the abnormal registration operation, a rate for pages normally outputted is charged in case of the abnormal outputting operation.

Figure 13:
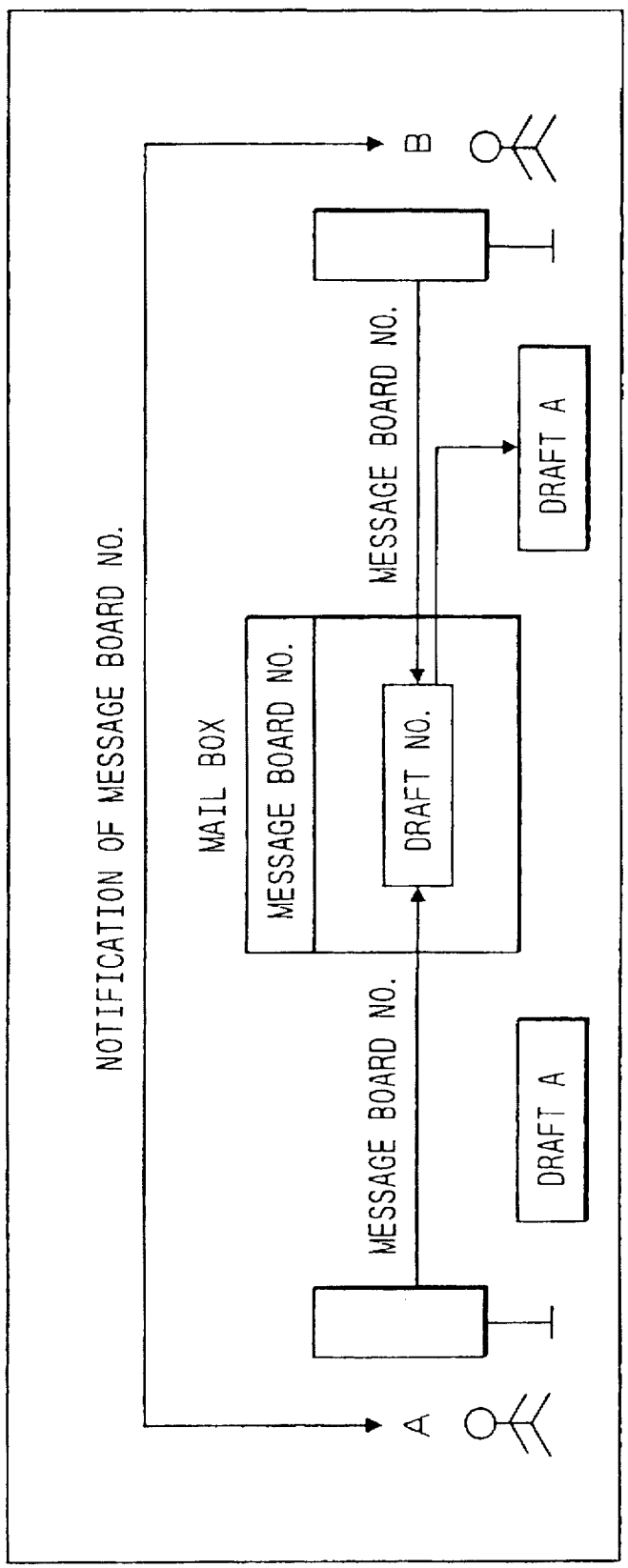
FIG. 13 is a schematic diagram for illustrating a manner of application of the present invention.

FIG. 13 is a diagram for illustrating a manner of application of the present invention, namely, a FAX message board. Here, it is assumed that users A and B preliminarily know Message Board NO. and one of the users preliminarily records a message on the message board. Then, the other of the users reads the registered message on the basis of the Message Board NO. At that time, the latter user had better confirm the registration of the message corresponding to this Message Board NO. over the PB phone 9 before reading the message. Incidentally, as stated above, both of the user registering the message and the other user reading (or outputting) the message are charged. Further, a period of time when a message can be registered in the MCP 1 is preliminarily determined. If such a period of time expires, the registered message is deleted. Therefore, when inquiring over the PB phone 9, the registration date and the deadline for reading the registered message can be confirmed.

Figure 14:
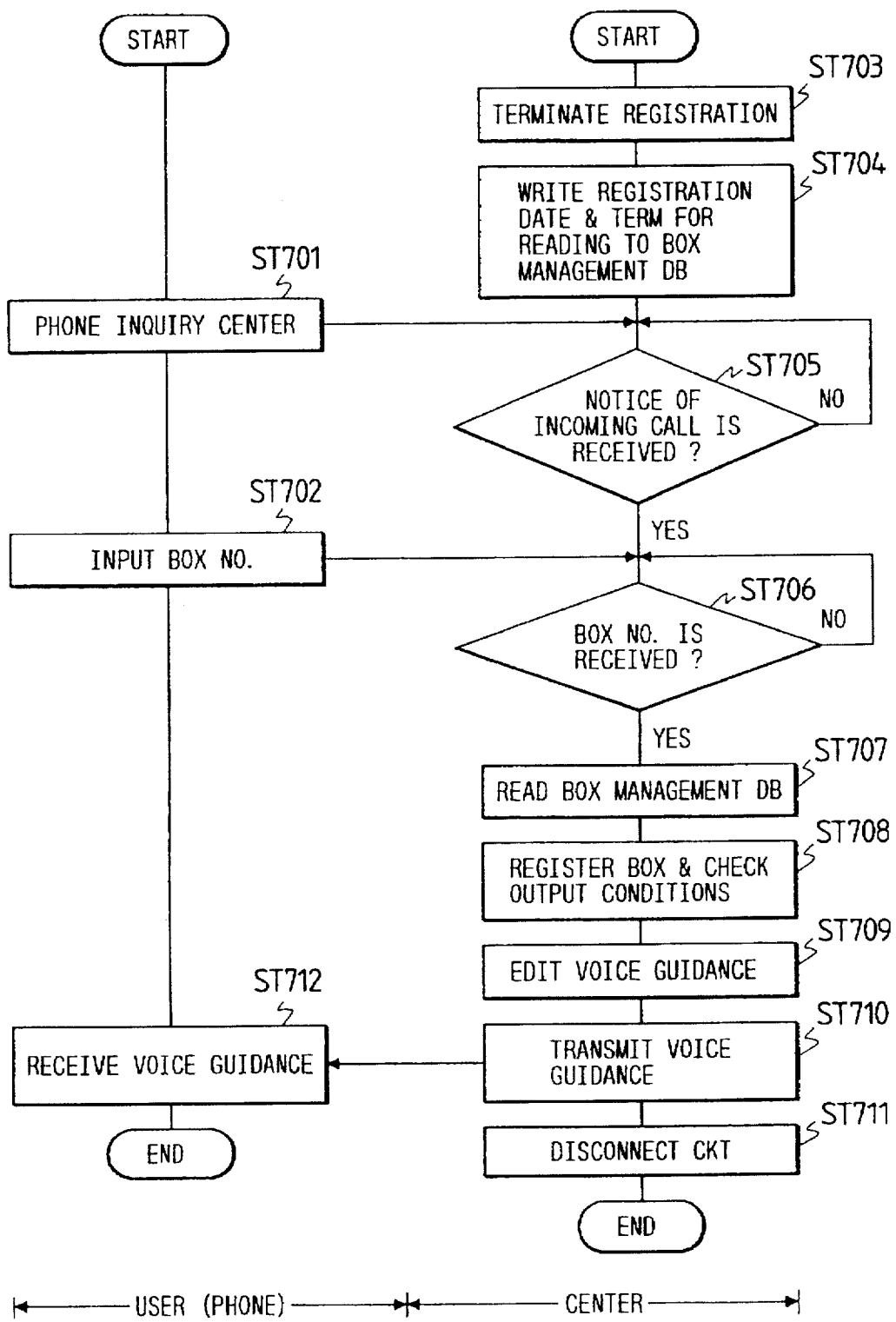
FIG. 14 is a flowchart for illustrating an operation of checking the date of the registration of the registered image information and the term of output thereof by using a bush-button (PB) phone.

Hereinafter, this inquiry operation will be described in detail by referring to FIG. 14. As shown in this figure, a user transmits from the PB phone 9 to the center (namely, the MCP 1) in step ST701 a signal representing a request for such an inquiry. Further, in step ST702, the user transmits a signal representing BOX NO. to be inquired.

On the other hand, in the center, the writing of data representing the registration date and the deadline for reading the registered message to a BOX management file is completed in step ST704 just after the registration of a message is completed in step ST703. Further, when receiving the signals, which are transmitted in steps ST701 and ST702, in step ST705 and ST706, information on the designated BOX NO. is read from the BOX management file in step ST707. Then, the registration date and the deadline for reading, which correspond to the designated BOX NO., are checked from the read data in step ST708. Further, a voice guidance is edited from the checked data in step 709. Subsequently, the edited voice guidance is transmitted to the user (thus, the PB phone 9) in step ST710, and thereafter the circuit between the center and the PB phone 9 is disconnected in step ST711.

A user can easily confirm the registration date and the deadline for reading by hearing the transmitted voice guidance in step ST712.

Figure 15:
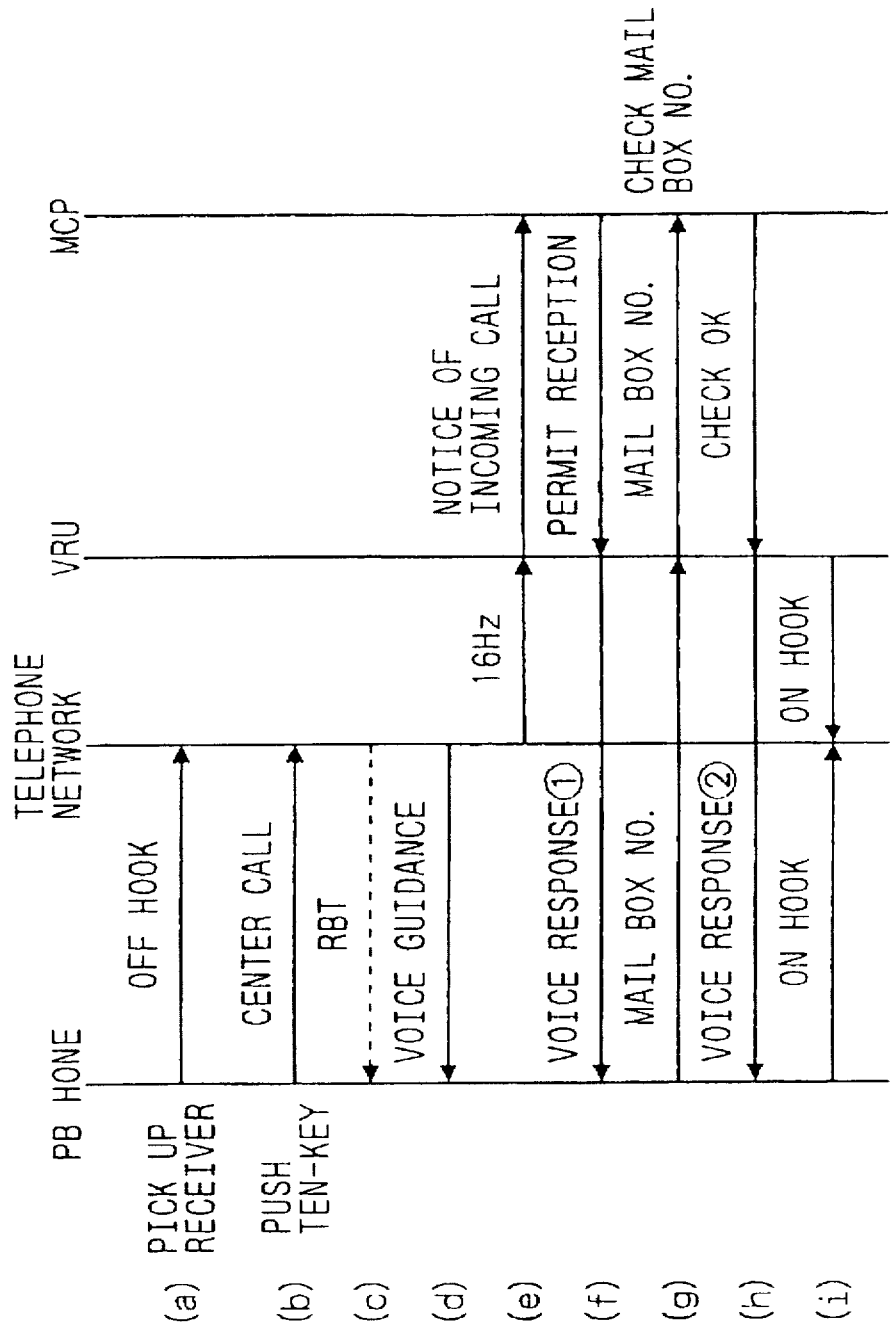
FIG. 15 is a communication sequence of an inquiry by using a PB phone.

This inquiry operation using the PB phone will be described further detailedly with reference to FIG. 15 which is a communication sequence diagram for illustrating the procedure of such an operation. As shown in this figure, a user first picks up the receiver of the PB phone 9 in step (a). Subsequently, the user presses down the ten keys of the PB phone 9 in step (b). Then, an RBT signal is sent to the telephone network 5 in step (c). Next, in step (d), a guidance indicating that this service using the public telephone is charged is transmitted. Then, in step (e), a signal having the frequency of 16 Hz is sent from the telephone network 5 to the VRU 3, and further the VRU 3 sends such a signal as an incoming call notification to the MCP 1. If the MCP 1 permits reception in step (f), the VRU 3 sends a mail BOX NO. transmission outline by using a voice.

Then, in step (g), the PB phone 9 informs the MCP 1 of the mail Box NO. through the VRU 3. If the MCP 1 checks the mail BOX NO. and the result of the check is OK, a message indicating that a message corresponding to the mail BOX NO. is registered and also indicating the registration date and the deadline for reading is transmitted by using voice in step (h). Further, a communication is completed in step (i).

Next, another manner of application of this embodiment of the present invention will be described by referring to FIGS. 16 and 17.

Figure 16:
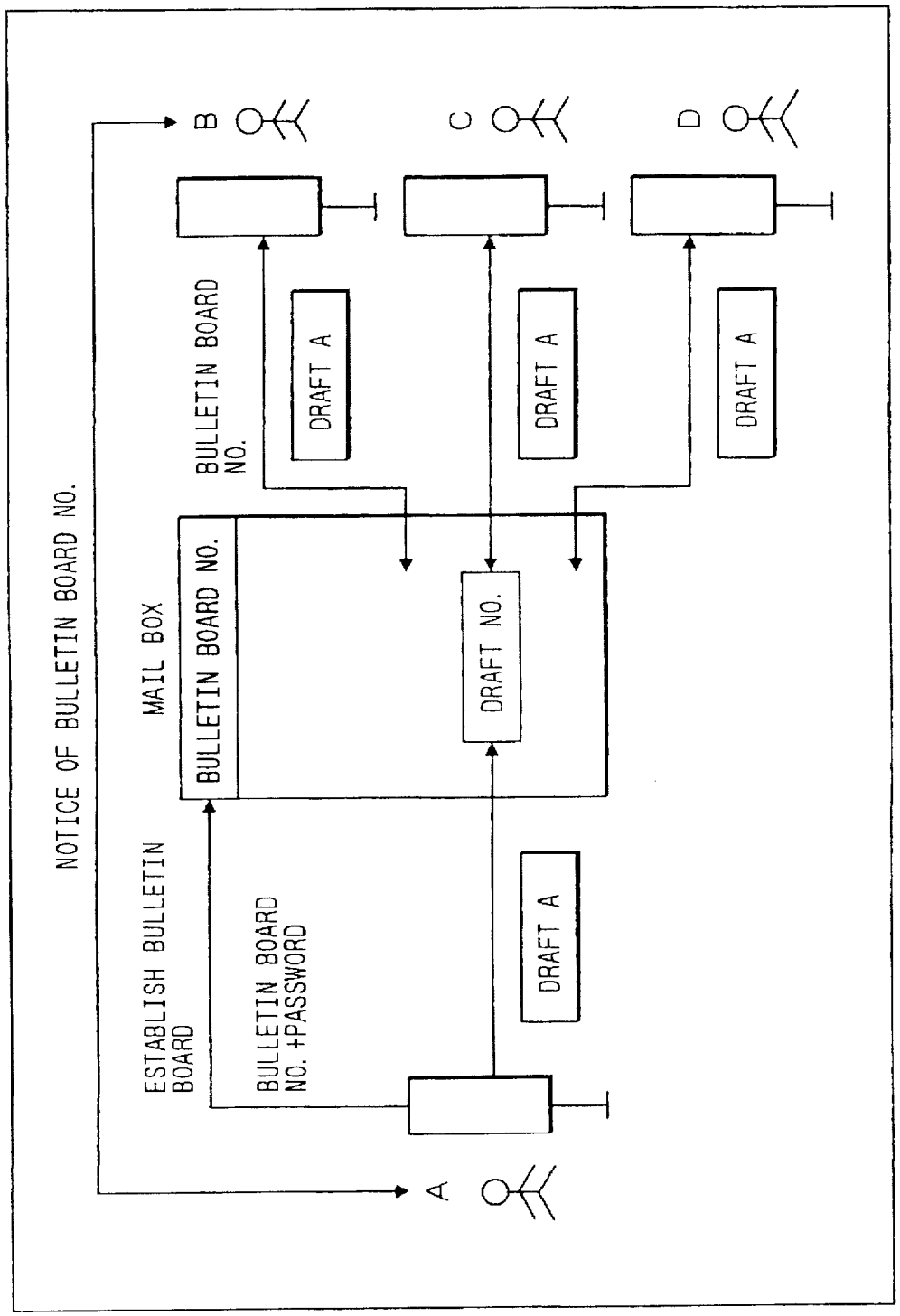
FIG. 16 is a schematic diagram for illustrating a FAX bulletin board in case of a manner of application of the present invention.

FIG. 16 is a diagram for illustrating a FAX bulletin board which is a manner of application of this embodiment of the present invention. A BOX NO. can be registered as effective for the term of a contract by preliminarily establishing a BOX in order to exchange information on private circles and supply information on IP (Information Provider) corporations. A User registers information represented by drafts by using this BOX NO. and a password as keys, and another user reads information described in drafts on the basis of the BOX NO. In FIG. 16, character A denotes a user registering information described in drafts; and B, C and D user reading the registered information.

Figure 17:
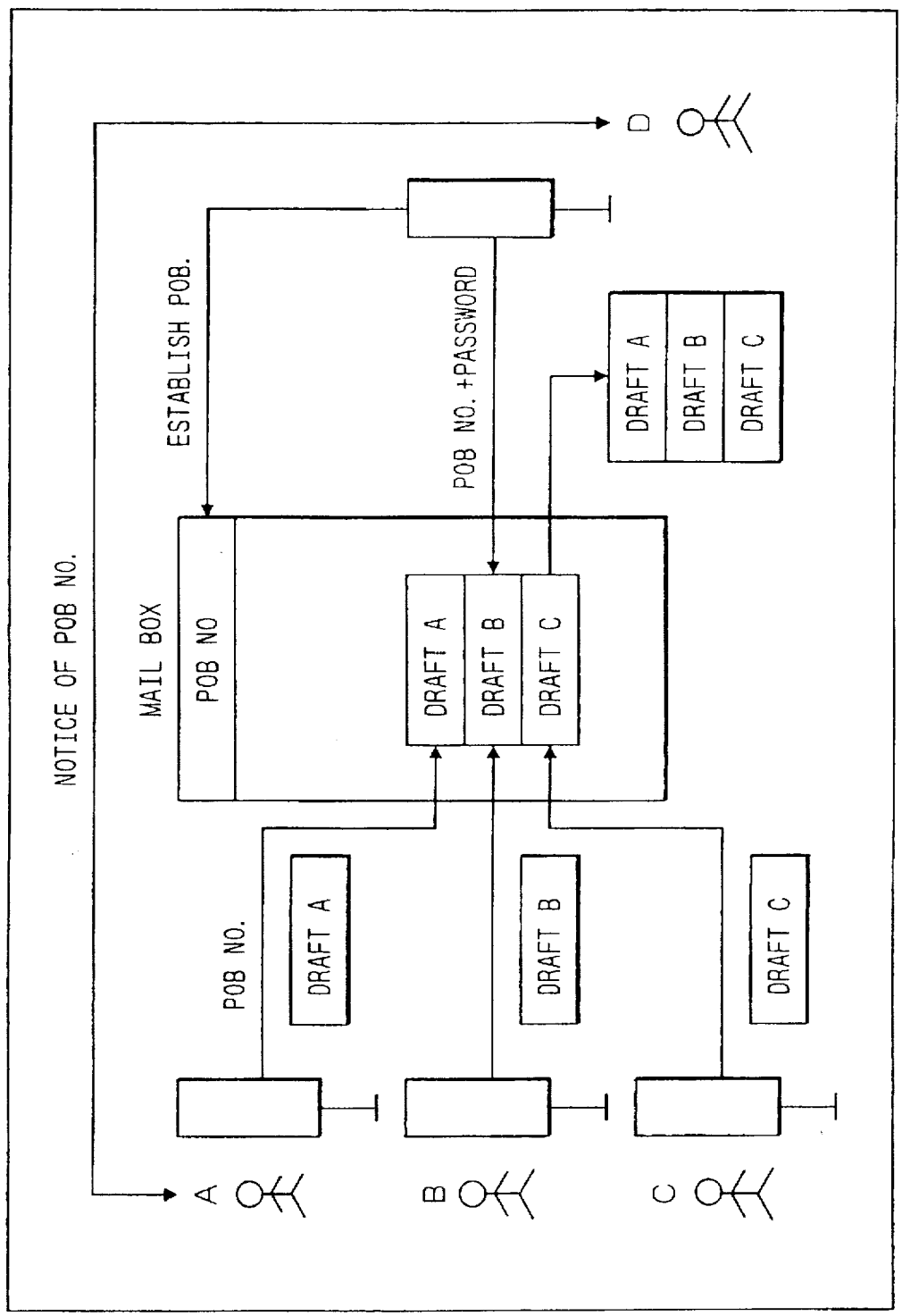
FIG. 17 is a schematic diagram for illustrating a FAX post-office box (POB) in case of a manner of application of the present invention.

Further, FIG. 17 is a diagram for illustrating a POB which is a manner of application of the present invention. Moreover, a user can register BOX NO., which is effective for the term of a contract, in the center by preliminarily establishing a BOX therein. Incidentally, the center is comprised of the MCP 1, the storage device 2 and the VRU 3. A user registering information represented by drafts in the center by using this BOX NO. as a key. Further, a user reading the registered information reads (or outputs) information on the basis of a BOX NO. and a password. In FIG. 17, characters A, B and C denotes users registering information; D a user reading information represented by a draft by using BOX NO., which is a POB NO., and a password.

Hereinafter, a FAX bulletin board and a FAX POB, which are manners of application of the present invention, will be described in detail together with a FAX message board.

Figure 18A:
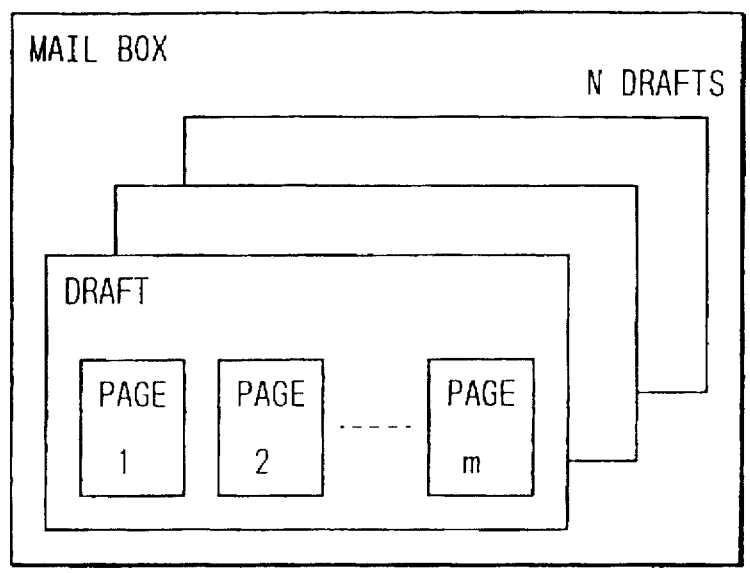
FIGS. 18(a), 18(b) and 18(c) are diagrams each for illustrating the number of documents which can be registered in a mail box corresponding to each manner of application of the present invention.
Figure 18B:
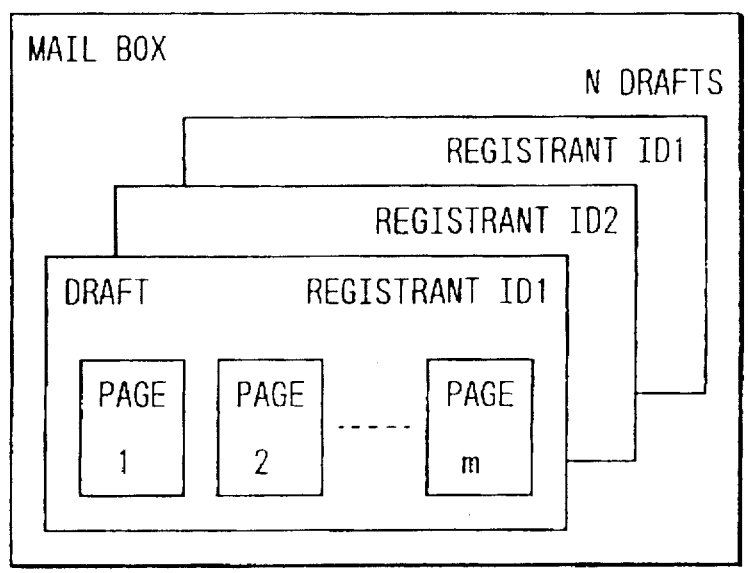
Figure 18C:
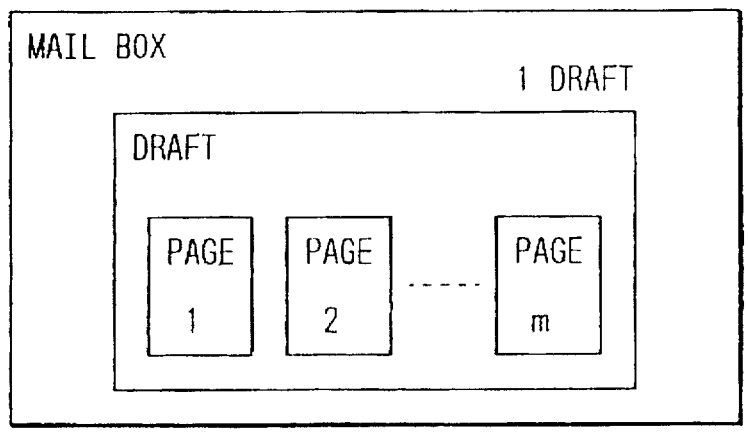

Here, note that the number of draft documents, which can be stored in a BOX, varies depending on a manner of application of the present invention. FIG. 18(a) is a diagram for illustrating the number of documents, which can be registered in a mail BOX, in case of using a FAX message board which is a manner of application of the present invention. FIG. 18(b) is a diagram for illustrating the number of documents, which can be registered in a mail BOX, in case of using a FAX POB which is another manner of application of the present invention. FIG. 18(c) is a diagram for illustrating the number of documents, which can be registered in a mail BOX, in case of using a FAX bulletin board which is a further manner of application of the present invention. As is apparent from these figures, information (or data) described in a plurality of draft documents can be registered in a mail BOX in cases of FAX message board and FAX POB. Practically, in case of utilizing a FAX message board service, 5 draft documents, each of which has 5 pages, can be registered in a mail BOX. In case of utilizing a FAX POB service, 100 draft documents, each of which has 5 pages, can be registered in a mail BOX. In the latter case, specific corporations such as a mail-order firm establishes mail BOXes and unspecified users such as a buyer register information described in drafts such as a written-application postcard and thus mail-order selling services are provided. Therefore, in case of utilizing a FAX POB, the system is adapted such that a large number of draft documents can be registered in a mail BOX. In contrast, in case of utilizing the present invention as a FAX bulletin board, the system is adapted such that information described in only 1 draft document can be registered in a (mail) BOX. Namely, in case of utilizing a FAX bulletin board service, a large number of specific users read the registered information differently from the case of utilizing a FAX POB service. Thus, it is very important for each user for reading the registered information to securely grasp a BOX NO. and information described in a draft document registered in a corresponding mail BOX. Consequently, in case of utilizing a FAX bulletin board service, the system is constructed such that information described in only 1 draft document can be registered in a BOX. Especially, a bulletin board (or notice board) is often used by many corporations for commercial advertisement. Therefore, it is very important for users to surely grasp the corresponding relation between a BOX NO. and a draft document. Thus, the system with the foregoing configuration has a lot of good effects in commercial advertisement.

Figure 19:
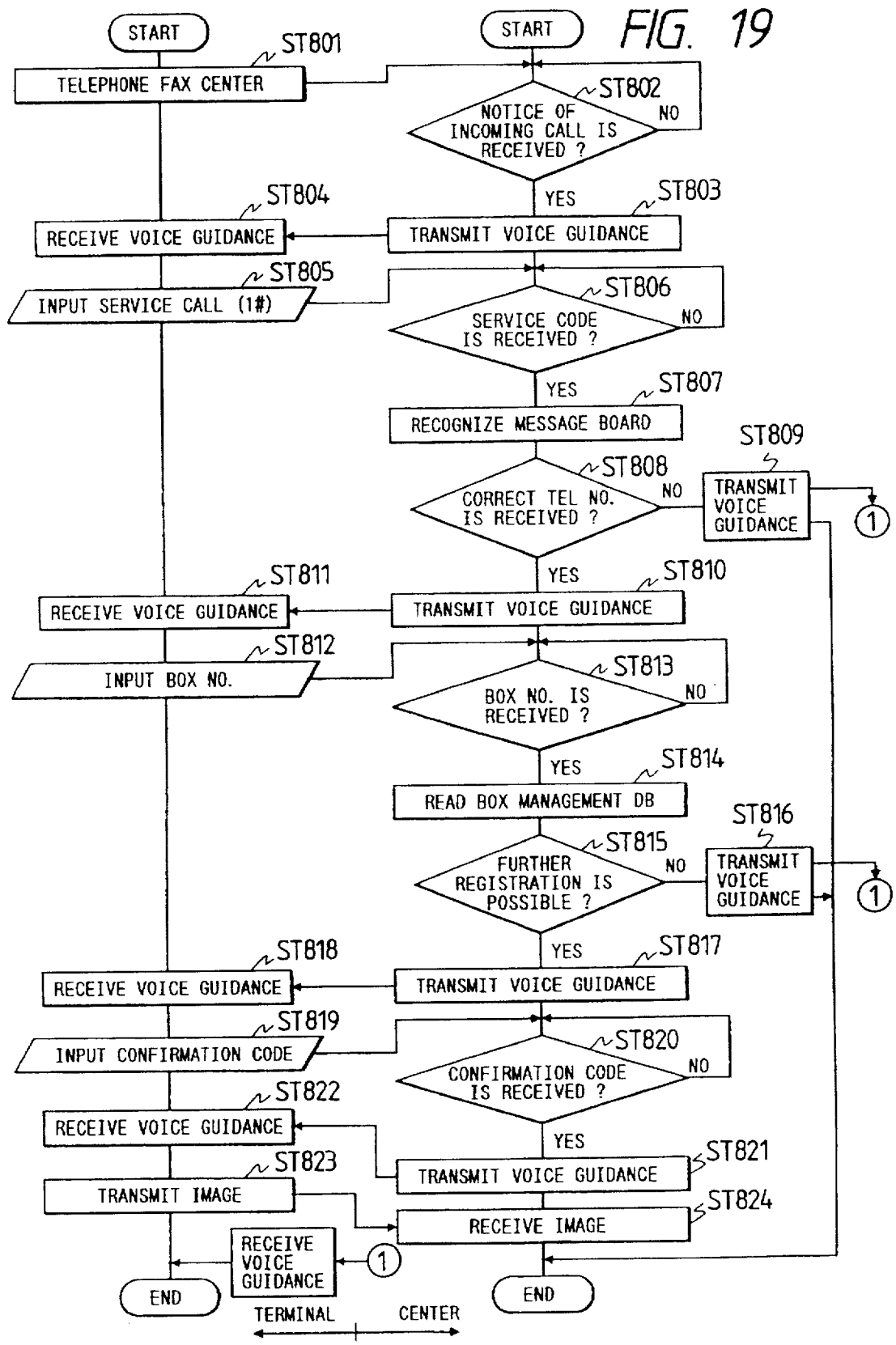
FIG. 19 is a flowchart for illustrating an operation of registration of a draft in case of a message board service.

Next, an operation of registering information described in a draft document in case of utilizing a message board service will be described hereinbelow by referring to FIG. 19. A flowchart shown in the left side of this figure illustrates an operation of a FAX terminal. Further, another flowchart shown in the right side of this figure illustrates operations of the MCP 1, the storage device 2 and the VRU 3 (hereunder sometimes referred to simply as the center).

As shown in this figure, a call is made from the FAX terminal to the center by telephoning a specific telephone number (corresponding to a message hoard service) in step ST801. The center is in a receiving state and stands by for a signal indicating a notice of an incoming call from the FAX terminal. When receiving this notice in step ST802, the center transmits voice guidance ① to the FAX terminal in step ST803. The voice guidance ① to be transmitted is "Hello, this is FAX Center. You wish to register information, don't you? Please make sure that your draft is set correctly. If you need a message board service, please push buttons representing 1 and #; if a POB service, please push buttons representing 2 and #; if a notice board service, please push buttons representing 3 and #; and if a mark sheet POB service, please push buttons representing 4 and #."

When a FAX terminal receives this guidance in step ST804, a user inputs a service code in step ST805. Here, is supposed that a code consisting of 1 and # are inputted for utilizing the message board service. The center is in a receiving state and stands by for this service code. When receiving the service code in step ST806, the center recognizes in step ST807 that the user wishes the message board service. Then, the center judges in step ST808 whether or not the telephone number transmitted from the FAX terminal is that corresponding to the message board service. If not, voice guidance ② and the operations are finished in step ST809. This voice guidance is "Message board service is not available by this telephone number. Please make sure how to utilize the service, and try again." Further, if judged as right number, the center transmits voice guidance ③ to the FAX terminal in step ST810. This voice guidance is "You wish to register a message in a BOX for a message board service, don't you? If wrong, please push buttons representing * and #. If correct, please inputs BOX NO. and push buttons representing #." When receiving the voice guidance ③ in step ST811, the user inputs the BOX NO. in step ST812. The center is in a receiving state and stands by for this BOX NO. When receiving the BOX NO. in step ST813, the center reads data from a BOX management database in step ST814. Further, it is judged in step ST815 whether a message can be further registered in the BOX corresponding to the designated BOX NO. As described above, the system of this embodiment is adapted to register 5 draft documents in each BOX. In case where a user tries to register documents more than 5 documents (namely, the designated BOX is full), the center transmits voice guidance ④ to the FAX terminal in step ST816 and then stops all of the operations. This voice guidance is "Message cannot be registered in your designated BOX because of overcapacity. Please make sure how to utilize the service, and try again." Further, in case where it is judged in step ST815 that if a document is further registered in the designated BOX, the accumulated number of the registered documents is within a permitted limit (i.e., 5), the center transmits voice guidance ⑤ to the FAX terminal in step ST817. This voice guidance is "Your designated BOX NO. is XXXX, isn't it? 5 sheets of your draft can be registered at a time. If correct, please push a button representing #. If wrong, please push buttons representing * and #".

When the FAX terminal receives this voice guidance in step ST818, the user inputs a confirmation code # in step ST819.

On the other hand, after transmitting the voice guidance in step ST817, the center is in a receiving state and stands by for the confirmation code. Further, when receiving this confirmation code in step ST820, the center transmits voice guidance ⑥ in step ST821. This voice guidance is "To start registration of your draft, please push a start-button and put back the receiver."

When receiving this voice guidance in step ST822, the transmission of the draft is commenced in step ST823. Further, the transmitted draft is registered in the designated BOX in the center in step ST824.

In the foregoing description, the operations of the FAX terminal and the center in case of registration of drafts in the message board service.

Next, an operation of outputting (or reading) drafts in case of the message board service will be described hereinbelow.

Figure 20:
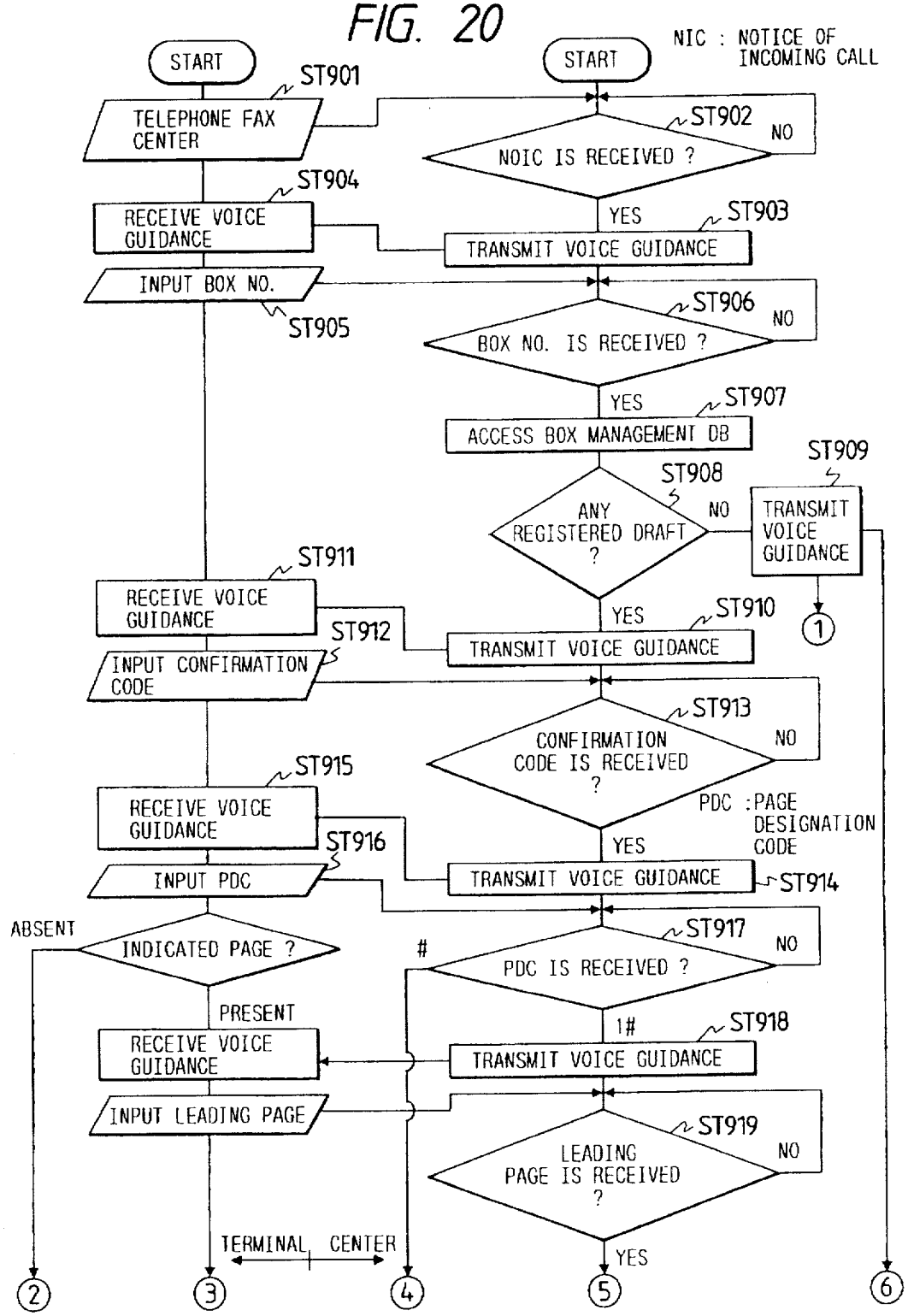
FIGS. 20 and 21 are flowcharts for illustrating operations of output of drafts in case of a message board service.
Figure 21:
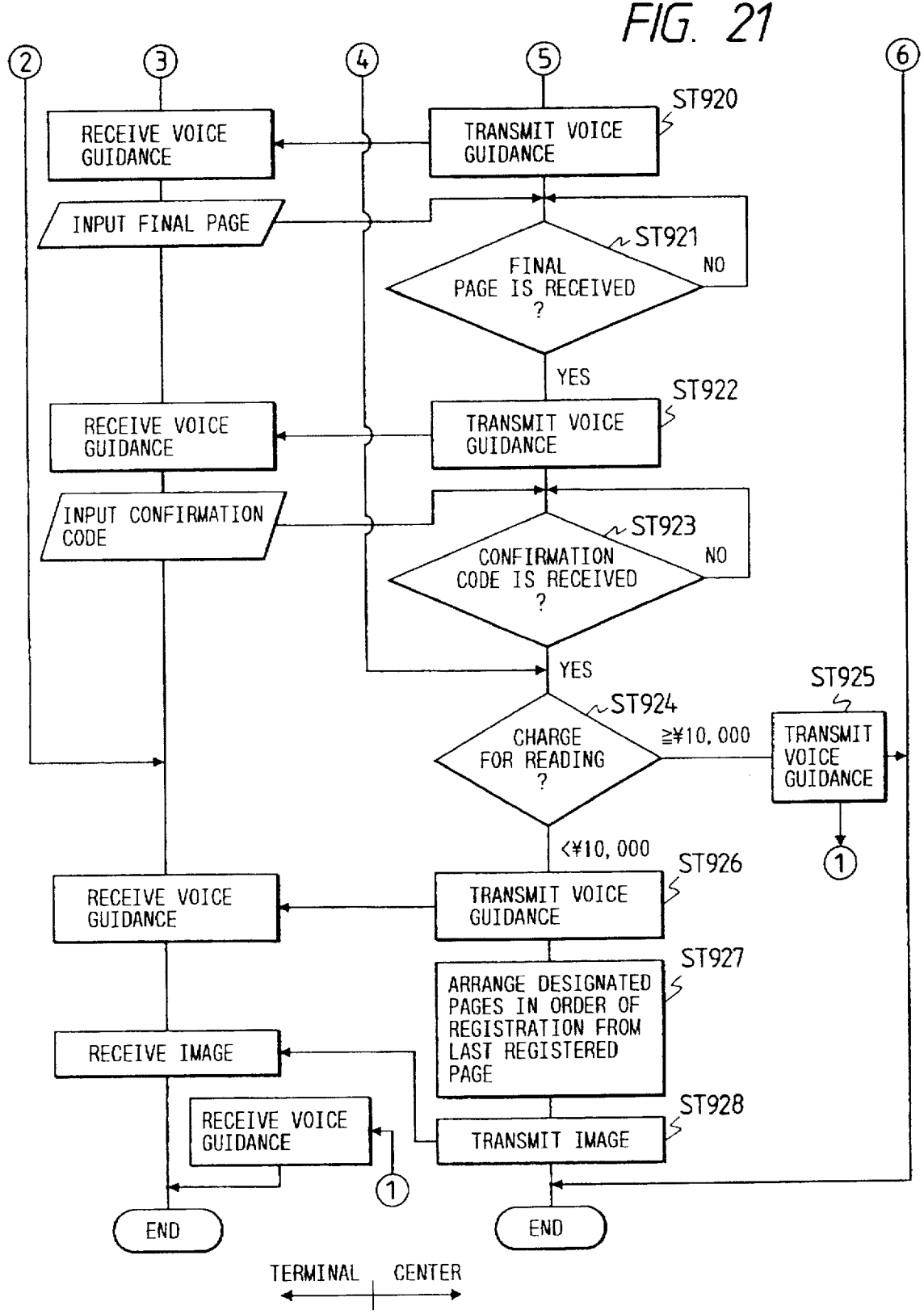

FIGS. 20 and 21 are flowcharts illustrating operations of the FAX terminal and the center, respectively. As shown in these figures, a call is made from the FAX terminal to the center by telephoning a specific telephone number (corresponding to the message board service) in step ST901. The center is in a receiving state and stands by for a signal indicating a notice of an incoming call from the FAX terminal. When receiving this notice in step ST902, the center transmits voice guidance ① to the FAX terminal in step ST903. The voice guidance ① to be transmitted is "Hello, this is FAX Center. You wish to read information, don't you? Please input BOX NO. and push a button representing #."

When the FAX terminal receives this voice guidance in step ST904, the user inputs BOX NO. indicating a BOX, which stores the draft to be read, in step ST905. The center is in a receiving state and stands by for this BOX NO. When receiving the BOX NO. from the FAX terminal in step ST906, a BOX management database is accessed in step ST907. Further, it is judged in step ST908 whether any draft or message is already registered in the designated BOX. If no draft is registered in the designated BOX, the center transmits voice guidance ② to the FAX terminal in step 909 and then stops all of the operations. This voice guidance is "Your designated BOX NO. is not registered now. Please make sure how to utilize the service, and try again." Further, in case where it is judged in step ST908 that if any document is registered in the designated BOX, the center transmits voice guidance ③ to the FAX terminal in step ST910. This voice guidance is "Your designated BOX NO. is XXXX, isn't it? If correct, please push a button representing #. If wrong, please push buttons representing * and #".

When the FAX terminal receives this voice guidance in step ST911, the user inputs a confirmation code # in step ST912.

On the other hand, after transmitting the voice guidance in step ST910, the center is in a receiving state and stands by for the confirmation code. Further, when receiving this confirmation code in step ST913, the center transmits voice guidance ④ in step ST914. This voice guidance is "Now your designated BOX is searched. (Background music is played.) There are X drafts and Y sheets in total. If you need all of the drafts, please push a button representing #. If you designates necessary pages, please push buttons representing 1 and #." Incidentally, the reason why the background music is played in the voice guidance ④ is as follows. Namely, a period of time required for searching the BOX for registered drafts is relatively long. Thus it is necessary to prevent a user from feeling unpleasant (as described in FIG. 4).

When receiving this voice guidance in step ST915, the user designates necessary pages of the draft in accordance with this voice guidance in step ST916. Then, the center performs the following operation when receiving a page designation code in step ST917. Namely, the center first transmits to the user in step ST918 voice guidance ⑤ instructing to input a leading page. When receiving from the FAX terminal a signal indicating the leading page in step ST919, the center further transmits to the user in step ST920 voice guidance ⑥ instructing to input a final page. Incidentally, the voice guidance ⑤ and the voice guidance ⑥ are "Please input a leading page and push a button representing #" and "Please input a final page and push a button representing #", respectively. Further, when receiving from the FAX terminal a signal representing the final page in step ST921, the center transmits voice guidance ⑦ in step ST922. This voice guidance is "You wish to read draft from pages XX to YY, don't you? If correct, please push a button representing #. If wrong, please push buttons representing * and #." Thereafter, when receiving from a confirmation code # in step ST923, the center calculates a charge for reading and judges whether the charge is equal to or more than 10,000 yen, in step ST924. If more than 10,000 yen, the center transmits voice guidance ⑧ and all of the operations are finished in step ST925. This voice guidance is "You cannot read the draft because the charge exceeds 10,000 yen.

Further, if the charge is less than 10,000 yen, the center transmits voice guidance ⑨ in step ST926. Subsequently, the center arranges the designated pages in the ascending order in step ST927 and transmits these pages to the FAX terminal in step ST928.

Incidentally, if it is judged in step ST917 that the user does not choose a page designation mode, the center returns to step ST924 and checks the charge for reading.

As above described, art upper limit to a charge for reading is predetermined and a reading operation is not performed if a charge exceeds the upper limit, for convenience of settlement or adjustment of a charge. Generally, a FAX terminal for such a kind of service is provided in a retail store such as a convenience store. In case of such a retail store, the settlement of a charge equal to or more than a predetermined amount (by using a bar code) is often impossible. Thus, to eliminate such a drawback, the settlement of a charge using a bar code is enabled by cancelling a request for reading if a charge for reading is equal to or more than a predetermined amount (i.e., 10,000 yen in this embodiment). Incidentally, so long as can be treated in the settlement processing in this embodiment, an appropriate amount other than 10,000 yen may be employed as the upper limit.

In addition, necessary pages of a draft can be designated in this embodiment. As the result, users do without reading unnecessary pages thereof. Consequently, communication time and charge can be saved.

Next, the registration and output (or reading) of drafts in case of a FAX POB service described by referring to FIG. 17 will be described hereinbelow. Generally, this POB service is utilized in an application for a quiz program or a prize contest or in mail-order selling. Therefore, those who establishes a BOX and reads drafts are specified users such as a mail-order firm. Further, those who register drafts in a BOX are unspecified users such as applicants for a prize contest and a buyer purchasing goods from a mail-order firm.

Figure 22:
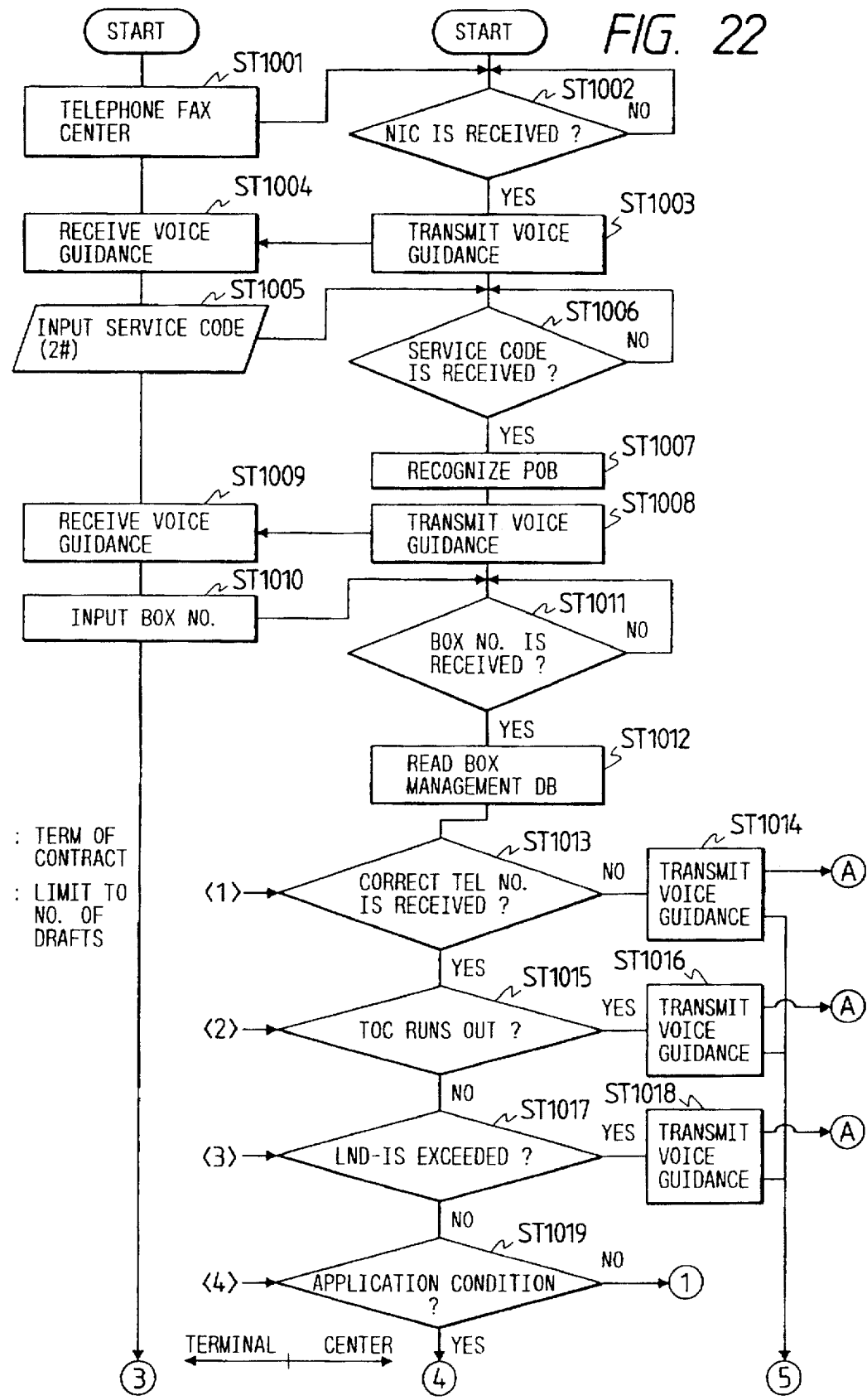
FIGS. 22, 23 and 24 are flowcharts for illustrating operations of registration of drafts in case of a POB service.
Figure 23:
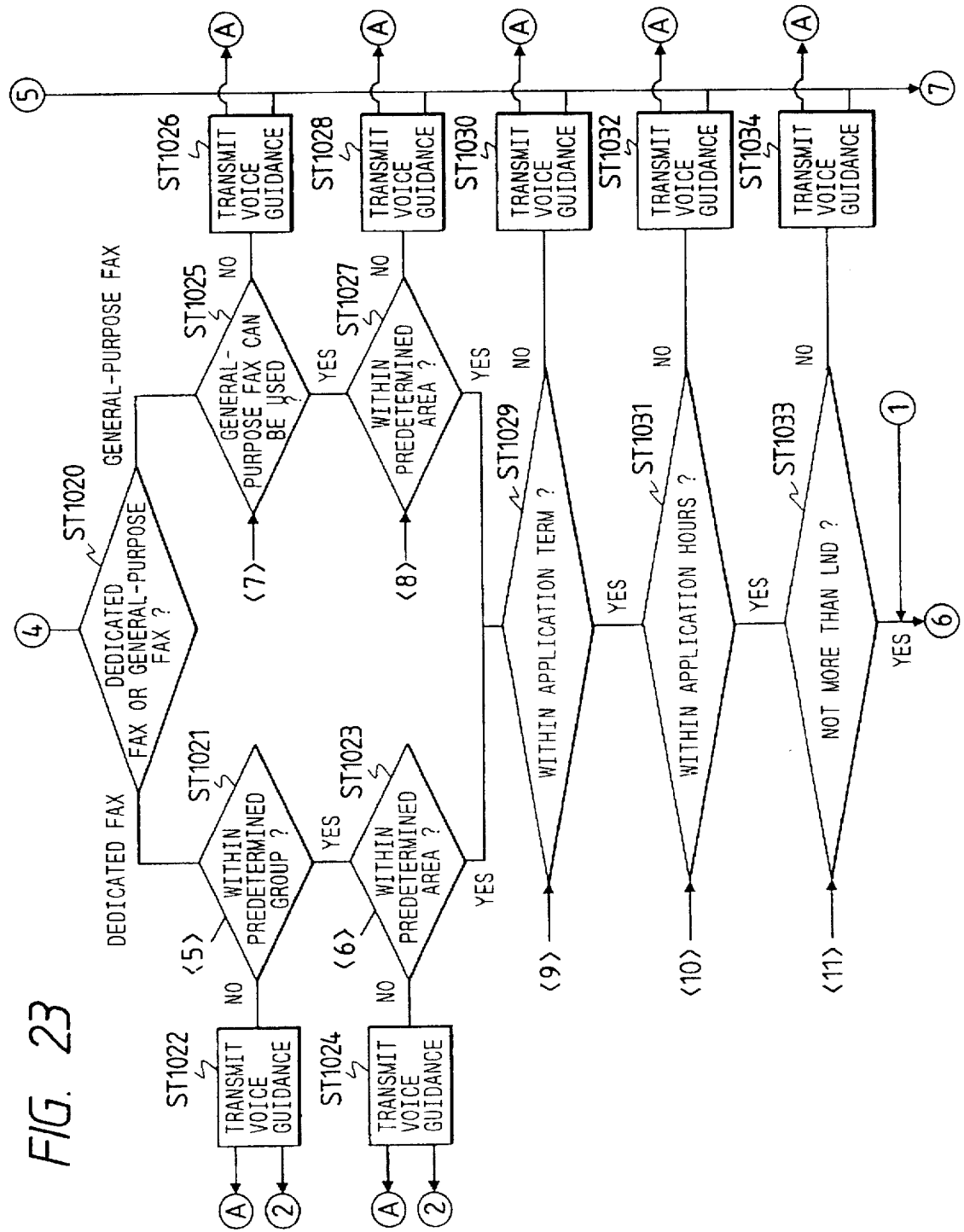
Figure 24:
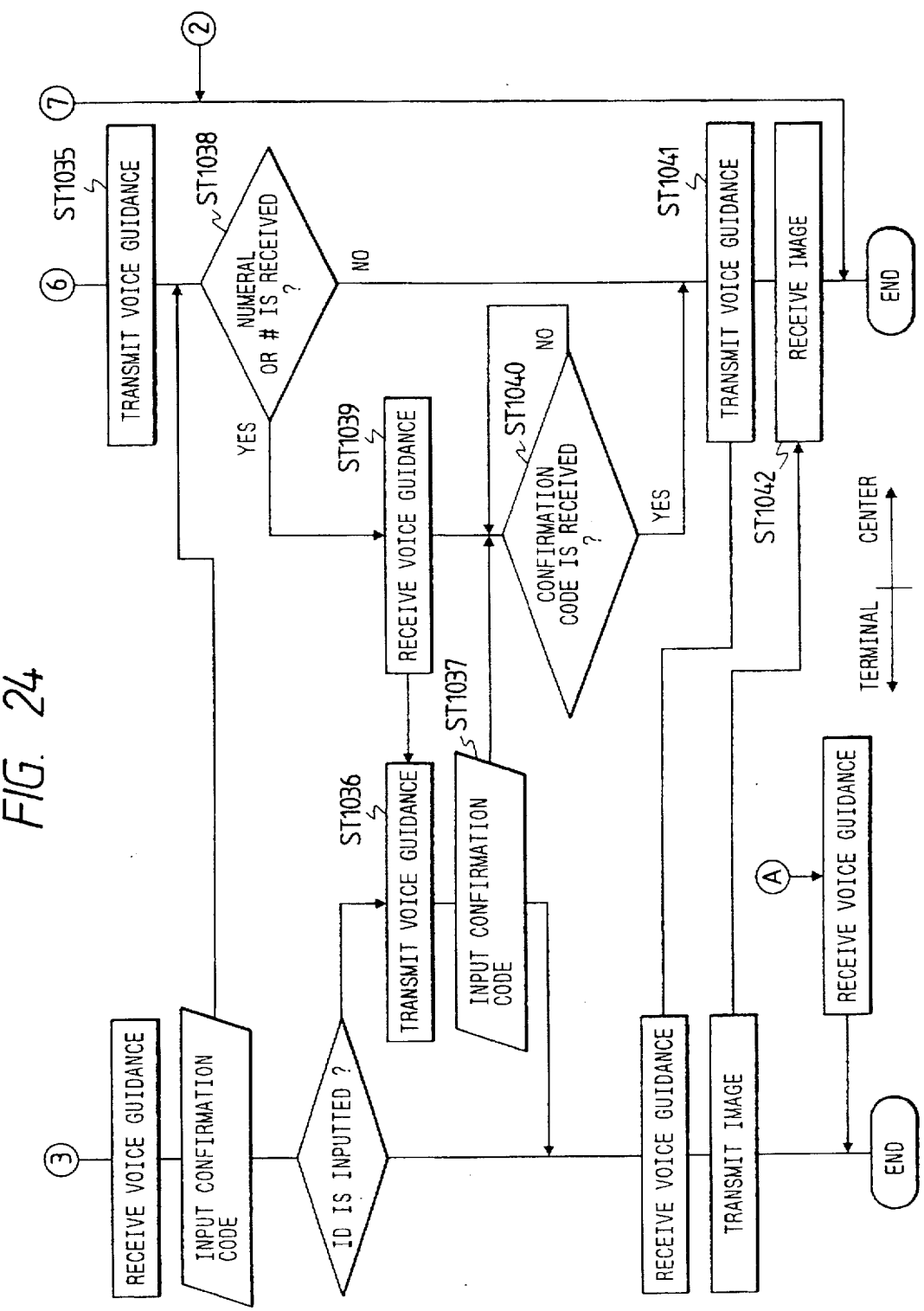

FIGS. 22 to 24 are flowcharts illustrating operations of the FAX terminal and the center in case of utilizing POB service, respectively. As shown in these figures, a call is made from the FAX terminal to the center by telephoning a specific telephone number (corresponding to the POB service) in step ST1001. The center is in a receiving state and stands by for a signal indicating a notice of an incoming call from the FAX terminal. When receiving this notice in step ST1002, the center transmits voice guidance ① to the FAX terminal in step ST1003. The voice guidance ① to be transmitted is "Hello, this is FAX Center. You wish to register information, don't you? Please make sure that your draft is set correctly. If you need a message board service, please push buttons representing 1 and #; if a POB service, please push buttons representing 2 and #; if a notice board service, please push buttons representing 3 and #; and if a mark sheet POB service, please push buttons representing 4 and #."

When a FAX terminal receives this voice guidance in step ST1004, a user inputs a service code in step ST1005. Here, it is assumed that a code consisting of 1 and # is inputted for utilizing the POB service. The center is in a receiving state and stands by for this service code. When receiving the service code in step ST1006, the center recognizes in step ST1007 that the user wishes the POB service. Then, the center transmits voice guidance ② in step ST1008. This voice guidance is "You wish to register a message in a BOX for a message board service, don't you? If wrong, please push buttons representing * and #. If correct, please inputs BOX NO. and push buttons representing # ."

When the FAX terminal receives this voice guidance in step ST1009, the user inputs the BOX NO. in step ST1010. The center is in a receiving state and stands by for this BOX NO. When receiving the BOX NO. from the FAX terminal in step ST1011, the center reads data from a BOX management database in step ST1012. Further, it is judged in step ST1013 whether the telephone number transmitted from the FAX terminal is a phone number corresponding to the designated BOX. If not, the center transmits voice guidance ③ in step ST1014 and stops all of the operation. This voice guidance is "Your designated BOX NO. is not available by this telephone number now. Please make sure how to utilize a BOX, and try again". Further, in case where it is judged in step ST1013 that the telephone number corresponds to the designated BOX, it is further judged in step ST1015 whether the term of contract of the BOX does not run out. If runs out, the center transmits voice guidance ④ in step ST1016 and stops all of the operations. This voice guidance is "Your designated BOX NO. is not used now. Please make sure how to utilize, and try again". If judged in step ST1015 as not run out, it is next judged in step ST1017 whether or not a draft can be registered in the designated BOX. In this case, this embodiment is set such that 100 drafts can be registered in a BOX, differently from the message board service. However, if a total of the number of already registered drafts and that of drafts, which the user wishes to register now, exceeds 100 (namely, an upper limit to the number of drafts which can be registered in a BOX), the center transmits voice guidance ⑤ in step ST1018 and finishes all of the operations. This voice guidance is "Draft cannot be registered in your designated BOX because of overcapacity. Please make sure how to utilize the service, and try again." Further, in case where it is judged in step ST1019 that the total of the documents is within the permitted limit, it is further judged in step ST1019 whether or not acceptance conditions are established. If established, it is judged in step ST1021 which of a dedicated FAX (namely, the FAX 7 of FIG. 1) provided in a service system and a general-purpose FAX (namely, the FAX 8 of FIG. 1) the calling FAX terminal is. Thereby, FAX terminals which can accept the service are limited to dedicated FAX terminals which are provided in stores kept by specific corporations. Namely, by excluding the registration of drafts sent from terminals (namely, applications for a quiz program and in mail-order selling or the like) other than such a group of the dedicated FAX terminals, an information supplier for outputting draft, which is usually a specific corporation, can restrict users who accepts the service (namely, a prize, mail-order goods or the like). Consequently, this is very effective in advertising the specific corporation.

Incidentally, if the calling FAX terminal is not of the group of the dedicated FAX terminals, the center transmits voice guidance ⑥ in step ST1022 and stops the operations. This voice guidance is "Your designated BOX cannot be used for registering drafts sent from your used store. Please make sure how to utilize the service, and try again."

If it is judged in step ST1021 that the calling FAX terminal is of the group, it is further judged in step ST1023 whether or not the calling FAX terminal is provided in a predetermined area. Thereby, places at which FAX terminals accepting the service (namely, FAX terminals capable being used for registration of drafts) are provided are limited within the predetermined area. Practically, only dedicated FAX terminals placed within, for instance, Tokyo can utilize the service. As the result, applicants for a prize contest or a mail-order selling service can be limited in respect of addresses or residences. Thus information suppliers (e.g., a mail-order selling firm) for outputting drafts can effectively supply the services in various ways.

Incidentally, if the calling FAX terminal is not within the predetermined area, the center transmits voice guidance ⑥ in step ST1024 and then stops all of the operations similarly as in step ST1021.

Further, if it is judged in step ST1020 that the calling FAX terminal is a general-purpose FAX terminal, it is further judged in step ST1025 whether or not this general-purpose FAX terminal can be used for registering drafts in case of the POB service. In case where a general-purpose FAX terminal cannot be used for accepting the service, the center transmits voice guidance ⑦ in step ST1026 and then stops all of the operation. This voice guidance is "Your designated BOX NO. is a dedicated FAX NO. Please make sure how to utilize the service, and try again." In contrast, if a general-purpose FAX terminal can be used for accepting the service, it is further judged in step ST1027 whether or not the general-purpose FAX terminal is provided in the predetermined area, similarly as in step ST1023. If the general-purpose FAX terminal is not within the predetermined area, the center transmits voice guidance ⑧ in step ST1024 and then stops all of the operations similarly as in step ST1021. This voice guidance is "BOX having your designated BOX NO. is not available from your used telephone due to restriction to a utilization area. Please make sure how to utilize the service, and try again."

If within the predetermined area, it is further judged in step ST1029 whether or not an application term (namely, a term when drafts can be registered) expires, similarly as in case where it is judged in step ST1023. If not, the center transmits voice guidance ⑨ in step ST1030 and then finishes all of the operations. This voice guidance is "Application term of your designated BOX NO. has expired. Please make sure how to utilize the service, and try again." If not expire, it is next judged in step ST1031 whether or not application hours have passed. If passed, the center transmits voice guidance ⑩ and then finishes all of the operation. This voice guidance is "Your designated BOX NO. is not available because application hours have passed. Please make sure how to utilize the service, and try again."

As above described, application term and hours are predetermined or limited, and only applications transmitted from applicants within the predetermined application term and hours are valid in this embodiment. Thus services useful for suppliers (namely, specific corporations) for outputting drafts can be realized.

Further, if it is judged in step ST1031 that the application hours have not passed, it is next judged in step ST1033 whether the upper limit to the number of drafts registered in the designated BOX is exceeded. Thus the number of drafts registered within a predetermined term is restricted by preliminarily setting the number of drafts in the BOX by the information supplier (i.e., the specific corporation) for establishing BOXes. Thereby, a service which is supplied only to a predetermined number of first applicants for a prize contest or a buyer in mail-order selling can be realized. Incidentally, if the upper limit is exceeded, the center transmits voice guidance ⑪ in step ST1034 and then stops all of the operations. This voice guidance is "Your designated BOX NO. is not available because the predetermined limit to the number of registered drafts is exceeded. Please make sure how to utilize the service, and try again." In contrast, if not exceeded, the center transmits voice guidance ⑫ to the FAX 7 or the general-purpose FAX 8 in step ST1035. This voice guidance is "Your designated BOX NO. is XXXX, isn't it? 5 sheets of your draft can be registered at a time. If correct, please push a button representing #. If wrong, please push buttons representing * and #". When the FAX terminal receives this voice guidance in step ST1036, the user inputs a confirmation code # in accordance with this voice guidance or inputs ID NO. specifying the user in step ST1037. Then, in the center, it is judged in step ST1038 which of a signal representing # and another signal representing (a numeral+#) the center receives. If receiving the latter signal, the center transmits voice guidance ⑬ in step ST1039. This voice guidance is "You uses registered ID NO., don't you? Your ID NO. is XXXX? If correct, please push a button representing #. If wrong, please push buttons representing * and #". Thereafter, if a signal indicating a confirmation code # from the FAX terminal is received in step ST1040, the center transmits voice guidance ⑭ in step ST1041 and subsequently receives drafts transmitted from the FAX terminal in step ST1042. Thus the operations of the FAXes 7 and 8 and the center are completed. Incidentally, this voice guidance is "To start registration of your draft, please push a start-button and put back the receiver."

In addition, only one of the application conditions may be employed. For instance, only application term may be predetermined, and there may be no restriction to areas from which application are sent. Such application conditions may be predetermined flexibly by taking the purposes and manners of utilization by the supplier who establishes a BOX.

Figure 25:
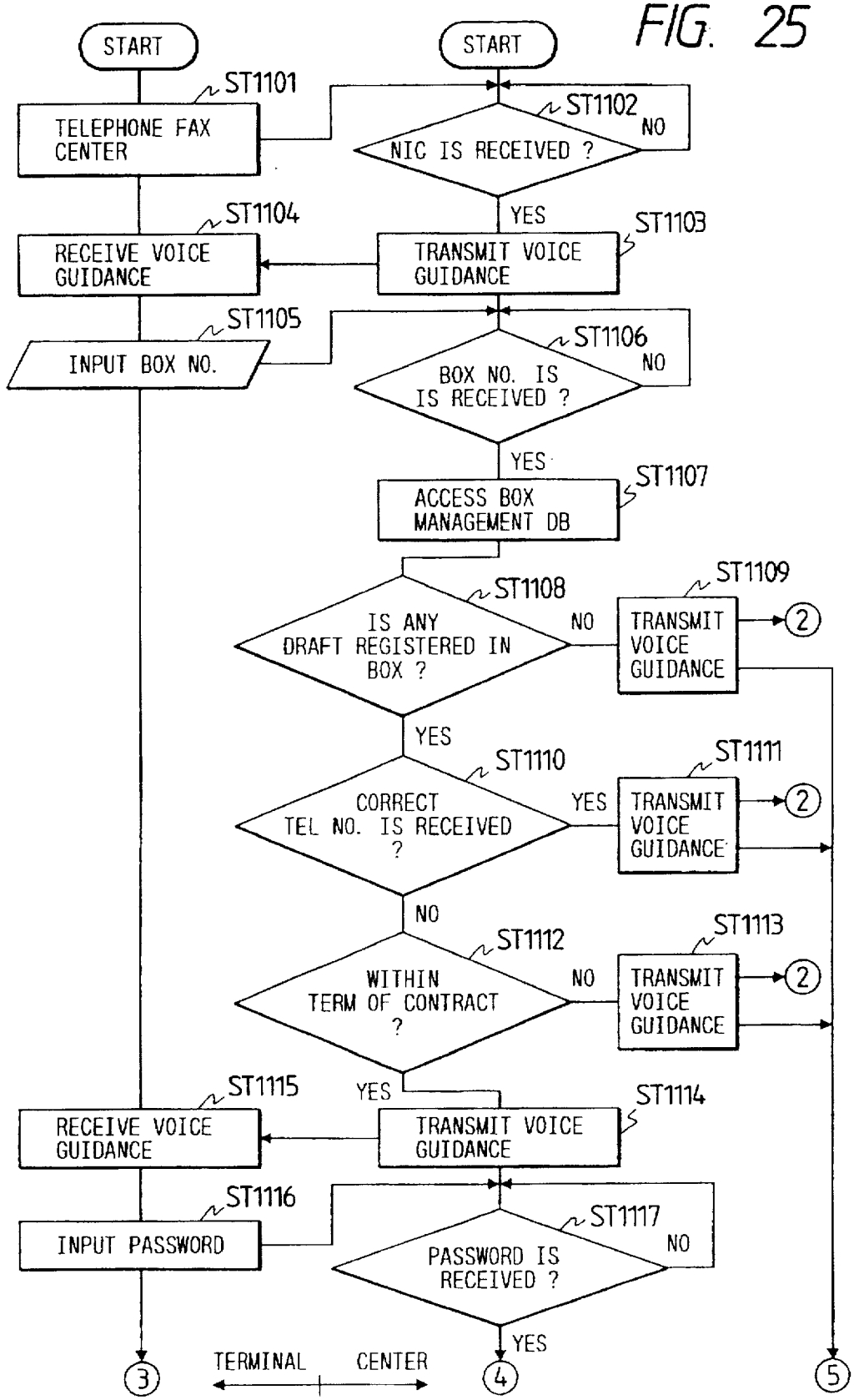
FIGS. 25 and 26 are flowcharts for illustrating operations of output of drafts in case of a POB service.
Figure 26:
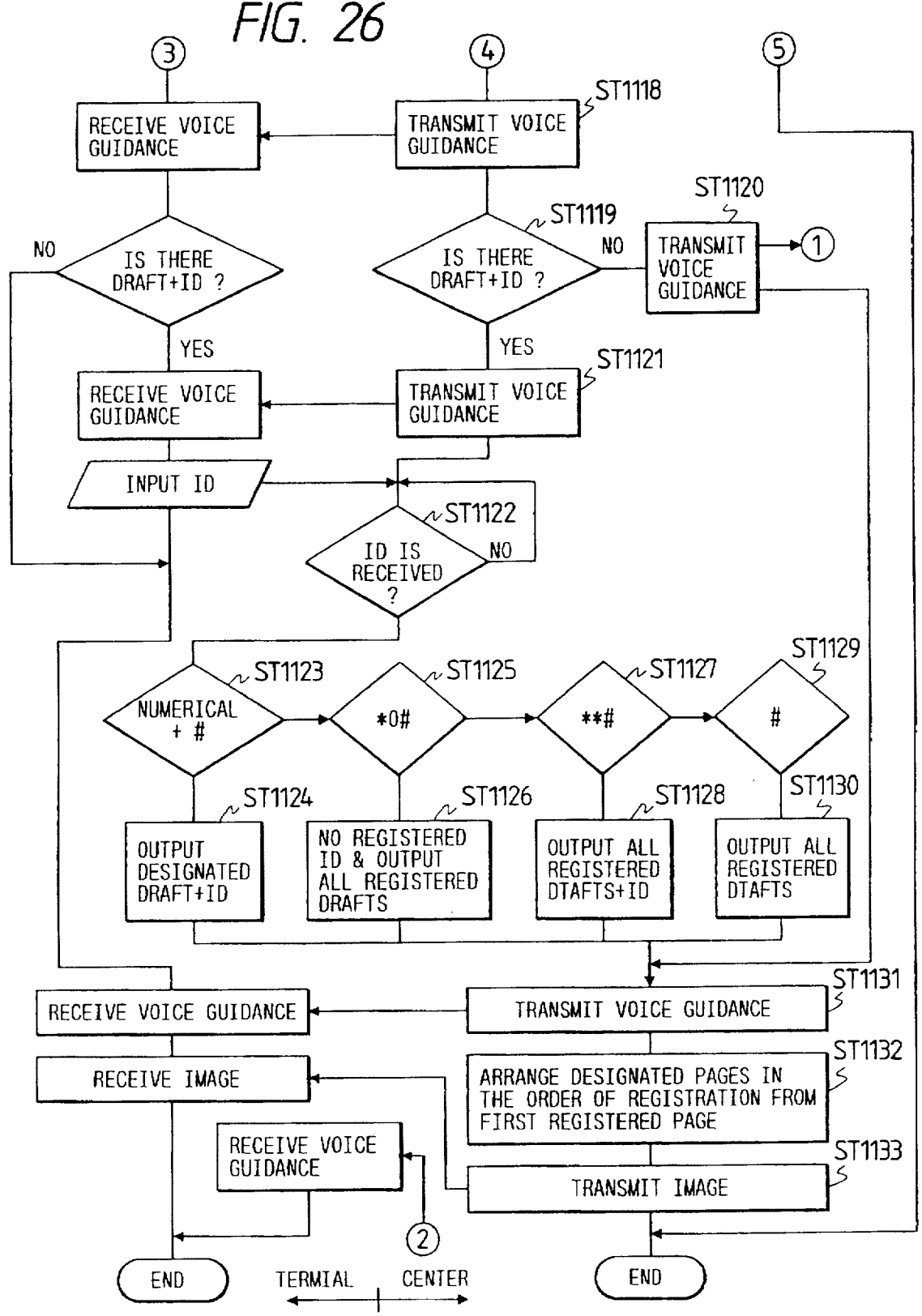

Next, operations of the FAX terminal and the center in case of utilizing POB service will be described hereinbelow. FIGS. 25 and 26 are flowcharts illustrating the operations of the FAX terminal and the center in case of utilizing POB service, respectively. As shown in these figures, a call is made from the FAX terminal to the center by telephoning a specific telephone number (corresponding to the POB service) in step ST1101. The center is in a receiving state and stands by for a signal indicating a notice of an incoming call from the FAX terminal. When receiving this notice in step ST1102, the center transmits voice guidance ① to the FAX terminal in step ST1103. The voice guidance ① to be transmitted is "Hello, this is FAX Center. You wish to read information, don't you? Please input BOX NO. and push a button representing #".

When the FAX terminal receives this voice guidance in step ST1104, the user inputs BOX NO. indicating a BOX, which stores the draft to be read, in step ST1105. The center is in a receiving state and stands by for this BOX NO. When receiving the BOX NO. from the FAX terminal in step ST1106, a BOX management database is accessed in step ST1107.

Further, it is judged in step ST1108 whether any draft or message is already registered in the designated BOX. If no draft is registered in the designated BOX, the center transmits voice guidance ② to the FAX terminal in step 1109 and then stops all of the operations. This voice guidance is "Your designated BOX NO. is not registered now. Please make sure how to utilize the service, and try again." Further, in case where it is judged in step ST1108 that there is a document registered in the designated BOX, it is next judged in step ST1110 whether or not the telephone number transmitted from FAX terminal in step ST1101 is a correct number (namely, a telephone number by which the designated BOX can be used). If not correct, the center transmits voice guidance ③ to the FAX terminal in step ST1111 and then stops all of the operations. This voice guidance is "Your designated BOX NO. cannot be used by this telephone number. Please make sure how to utilize the service, and try again." If correct telephone number, it is further judged in step ST1112 whether or not the term of contract of the designated BOX has expired. If expired, the center transmits voice guidance ④ in step ST1113 and then stops all of the operations. This voice guide is "your designated BOX NO. is not registered now. Please make sure how to utilize, and try again." If not expired, the center transmits voice guidance ⑤ in step ST1114. This voice guidance is "Your designated BOX NO. is XXXX, isn't it? If wrong, please push buttons representing * and #". If correct, please input a password and push a button representing #."

When the FAX terminal receives this voice guidance in step ST1115, the user inputs a password unique to him in step ST1116.

On the other hand, after transmitting the voice guidance in step ST1114, the center is in a receiving state and stands by for the password. Further, when receiving this password in step ST1117, the center transmits voice guidance ⑥ in step ST1118. This voice guidance is "Now your designated BOX is searched. (Background music is played.)" Incidentally, the reason why the background music is played in this voice guidance is as follows. Namely, a period of time required for searching the BOX for registered drafts is relatively long. Thus it is necessary to prevent a user from feeling unpleasant.

When the center finds the draft to be read, it is judged in step ST1119 whether or not this is a draft with ID NO. If not, the center transmits voice guidance ⑦ in step 1120. This voice guidance is "There are X drafts and Y sheets in total." If a draft with ID NO., the center transmits voice guidance ⑧ in step 1121 and becomes in a receiving state and stands by for ID NO. transmitted from the FAX terminal. This voice guidance is "There are X drafts and Y sheets in total. Among them, the number of drafts with ID NO. is XX and that of sheets of the drafts with IT NO. is YY in total. If you read all of the drafts, please push a button representing #. If you designates ID NO., please input ID NO. and push the button representing #."

When receiving a signal representing ID NO. and # or a signal representing # in step ST1122, the center performs the following operation according to input data represented by the received signal. Namely, in case where the input data represents (a numeral (ID NO.)+#) in step ST1123, the center outputs the designated draft with ID NO. in step ST1124. Further, in case where the input data represents (*+0+#) in step ST1125, the center outputs all of the drafts having no ID NOS. in step ST1126. Furthermore, in case where the input data represents (*+*+#) in step ST1127, the center outputs all of the drafts each having ID NO. in step ST1128. Moreover, in case where the input data represents only # in step ST1129, the center outputs all of the drafts registered in the BOX in step ST1130.

Thus, by establishing various draft-reading modes as described above, the user can read only necessary drafts and utilize effectively.

Further, after such an output processing is completed, the center transmits voice guidance ⑨ in step ST1131 and arranges the designated pages in the ascending order in step ST1132 and transmits these pages to the FAX terminal in step ST1133. Incidentally, if it is judged in step ST1119 that there is no draft with ID NO., the center transmits voice guidance in step ST1131, and thereafter performs an operation similar to that described above.

Figure 27:
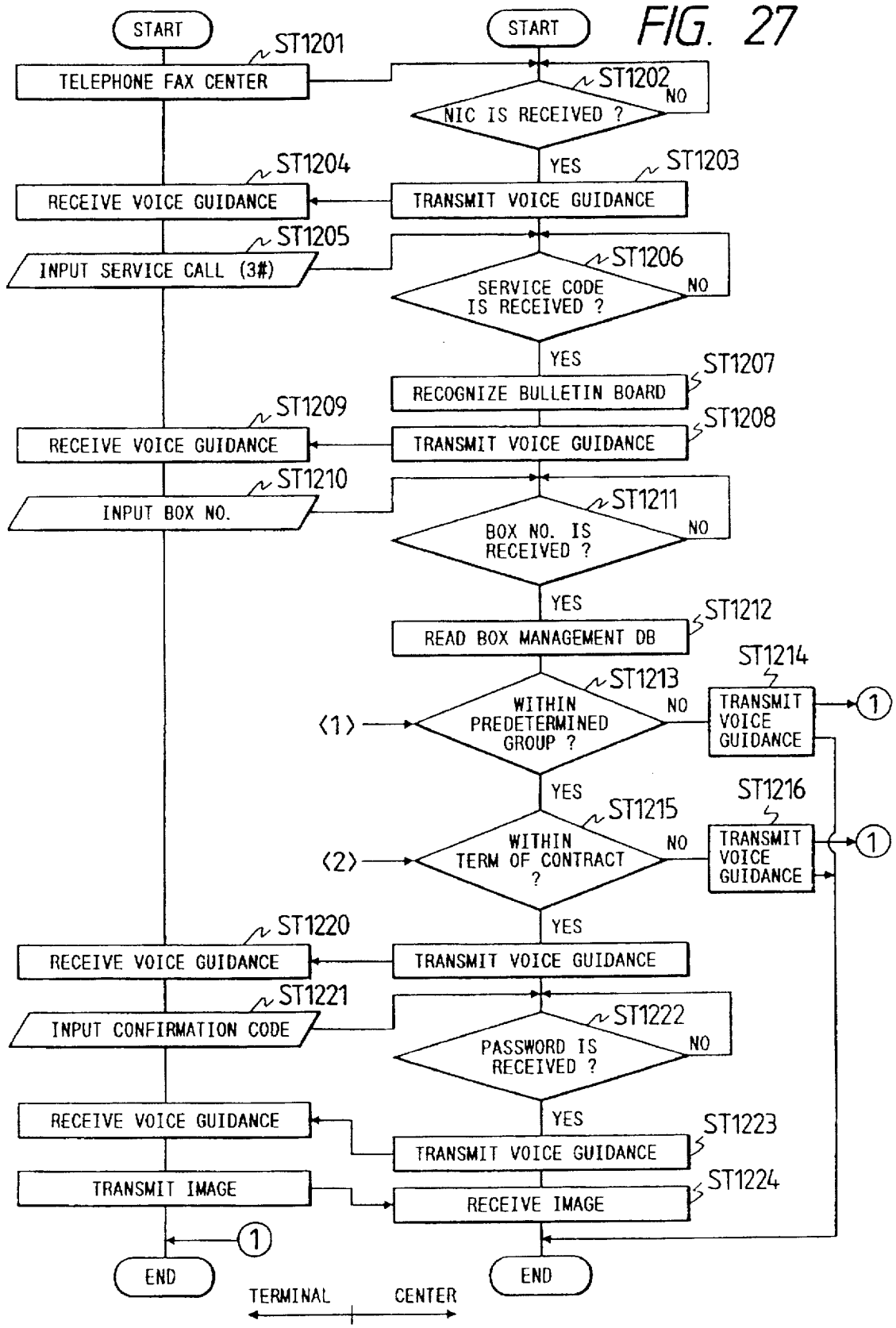
FIG. 27 is a flowchart for illustrating an operation of registration of a draft in case of a message board service.

Next, the registration and outputting (or reading) of a draft in case of utilizing the FAX bulletin (or notice) board described by referring to FIG. 16 will be described hereinbelow. FIG. 27 is a flowchart for illustrating operations of the FAX terminal and the center in case of the FAX bulletin board service. As shown in these figures, a call is made from the FAX terminal to the center by telephoning a specific telephone number (corresponding to a BOX used in the bulletin board service) in step ST1201. The center is in a receiving state and stands by for a signal indicating a notice of an incoming call from the FAX terminal. When receiving this notice in step ST1202, the center transmits voice guidance ① to the FAX terminal in step ST1203. This voice guidance is "Hello, this is FAX Center. You wish to register information, don't you? Please make sure that your draft is set correctly. If you need a message board service, please push buttons representing 1 and #; if a POB service, please push buttons representing 2 and #; if a notice board service, please push buttons representing 3 and #; and if a mark sheet POB service, please push buttons representing 4 and #."

When the FAX terminal receives this voice guidance in step ST1204, a user inputs a service code in step ST1205. Here, it is assumed that a code consisting of 3 and # is inputted for utilizing this service. The center is in a receiving state and stands by for this service code. When receiving the service code in step ST1206, the center recognizes in step ST1207 that the user wishes the bulletin board service. Then, the center transmits voice guidance ② in step ST1208. This voice guidance is "You wish to register a message in a BOX for a message board service, don't you? If wrong, please push buttons representing * and #. If correct, please inputs BOX NO. and push buttons representing #."

When the FAX terminal receives this voice guidance in step ST1209, the user inputs the BOX NO. in this voice guidance in step ST1210. After transmitting the voice guidance ②, the center is in a receiving state and stands by for this BOX NO. When receiving the BOX NO. from the FAX terminal in step ST1211, the center, reads data from a BOX management database in step ST1212. Further, it is judged in step ST1213 whether the telephone number transmitted from the FAX terminal is a phone number, corresponding to the designated BOX. If not, the center transmits voice guidance ③ in step ST1214 and stops all of the operation. This voice guidance is "Your designated BOX NO. is not available by this telephone number now. Please make sure how to utilize a BOX, and try again". Further, if it is judged in step ST1213 that the telephone number transmitted from the FAX terminal is the phone number corresponding to the designated BOX, it is next judged in step ST1215 whether or not a further draft can be registered in the designated BOX.

This is to judge whether or not the term of contract of the BOX does not run out. If runs out, the center transmits voice guidance ④ in step ST1216 and stops all of the operations. This voice guidance is "Your designated BOX NO. is not used now. Please make sure how to utilize, and try again". If judged in step ST1215 as not run out, the center transmits voice guidance ⑤ in step ST1219 and finishes all of the operations. This voice guidance is "Your designated BOX NO. is XXXX, isn't it? You can register 10 sheets of the draft at a time. If wrong, please push buttons representing * and #". If correct, please input a password and push a button representing #."When the FAX terminal receives this voice guidance in step ST1220, the user inputs a password in step ST1221.

On the other hand, after transmitting the voice guidance ⑤, the center is in a receiving state and stands by for the password and the symbol # to be sent from the FAX terminal. When receiving the password and the symbol # in step ST1222, the center transmits voice guidance ⑥ in step ST1223 and then receives the draft transmitted from the FAX terminal in step ST1224.

Incidentally, this voice guidance is "To start registration of your draft, please push a start-button and put back the receiver." Thus the operations of the FAX and and the center are finished.

Figure 28:
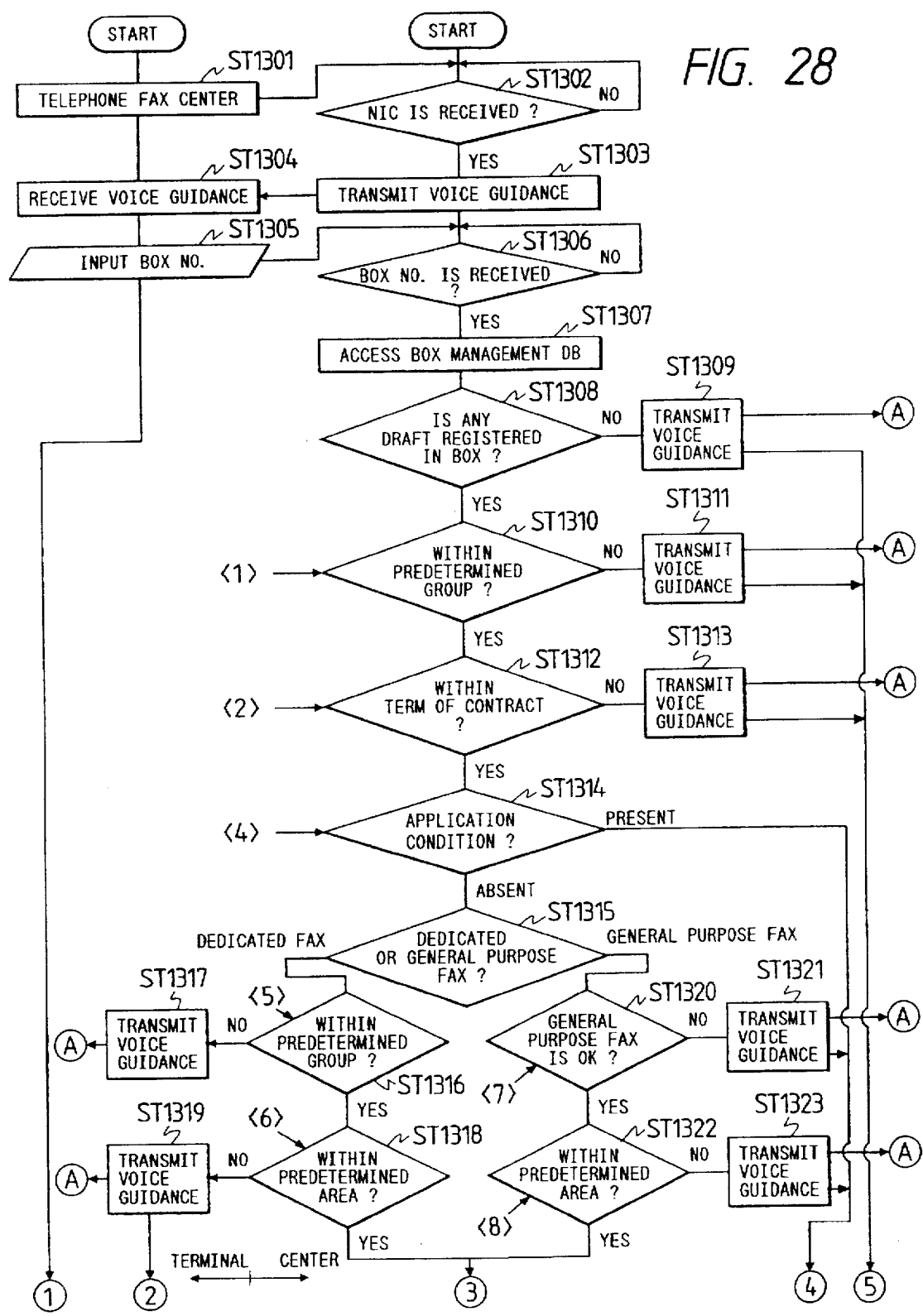
FIGS. 28, 29 and 30 are flowcharts for illustrating flowcharts of output of drafts in case of a message board service.
Figure 29:
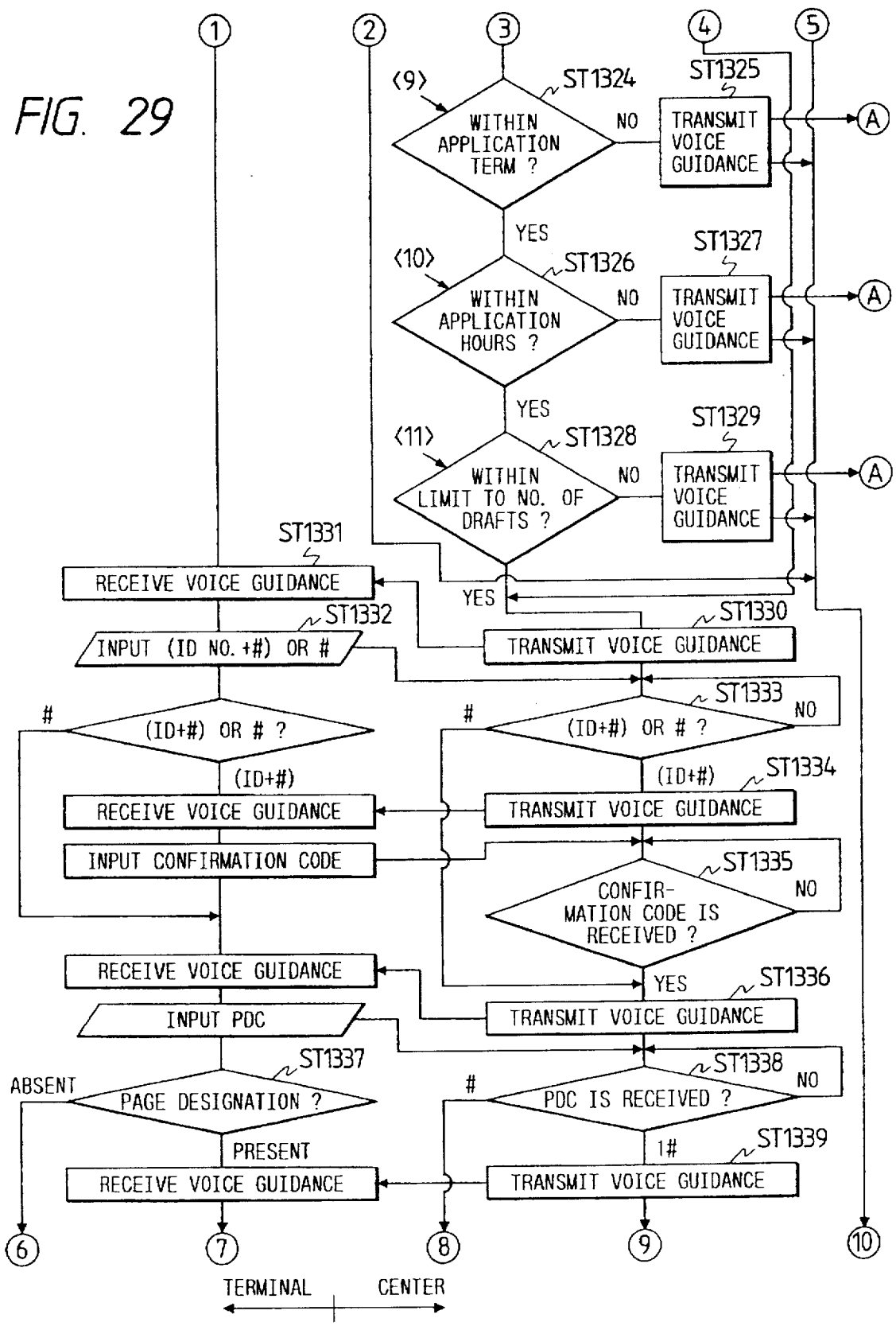
Figure 30:
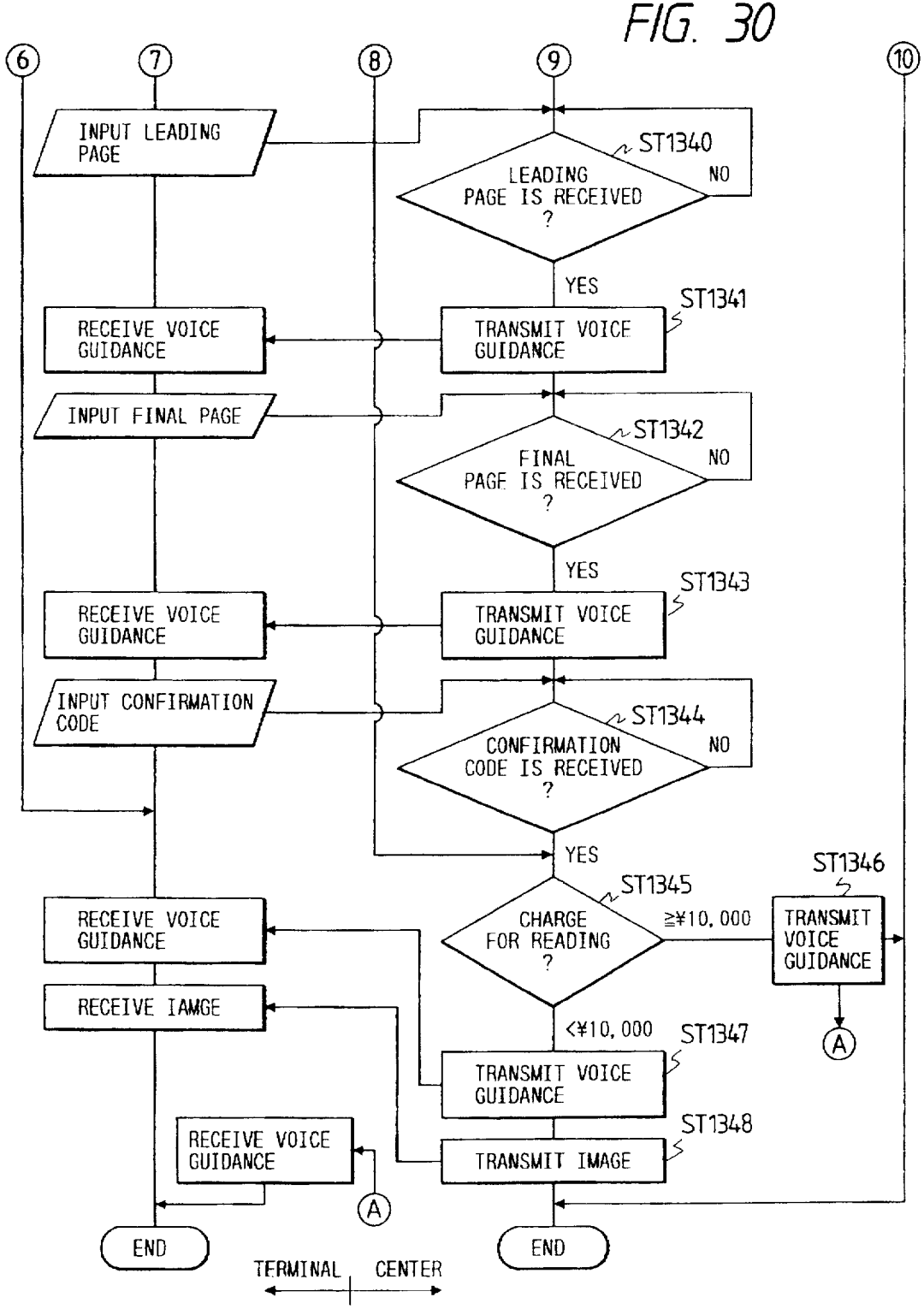

Next, operations of the FAX terminal and the center at the time of reading drafts in case of utilizing the bulletin board service will be described hereinbelow by referring to FIGS. 28 to 30. As shown in these figures, a call is made from the FAX terminal to the center by telephoning a specific telephone number (corresponding to the bulletin board service) in step ST1301. The center is in a receiving state and stands by for a signal indicating a notice of an incoming call from the FAX terminal. When receiving this notice in step ST1302, the center transmits voice guidance ① to the FAX terminal in step ST1303. The voice guidance ① to be transmitted is "Hello, this is FAX Center. You wish to read information, don't you? Please input BOX NO. and push a button representing #".

When the FAX terminal receives this voice guidance in step ST1304, the user inputs BOX NO. indicating a BOX, which stores the draft to be read, in step ST1305. The center is in a receiving state and stands by for this BOX NO. When receiving the BOX NO. from the FAX terminal in step ST1306, a BOX management database is accessed in step ST1307.

Further, it is judged whether any draft or message is already registered in the designated BOX. If no draft is registered in the designated BOX, the center transmits voice guidance ② to the FAX terminal in step 1309 and then stops all of the operations. This voice guidance is "Your designated BOX NO. is not registered now. Please make sure how to utilize the service, and try again."

In case where it is judged that there is a document registered in the designated BOX, it is next judged in step ST1310 whether or not the telephone number transmitted from FAX terminal in step ST1301 is a correct number (namely, a telephone number by which the designated BOX can be used). If not correct, the center transmits voice guidance ③ to the FAX terminal in step ST1311 and then stops all of the operations. This voice guidance is "Your designated BOX NO. cannot be used by this telephone number. Please make sure how to utilize the service, and try again." If judged as the correct telephone number in step ST1310, it is further judged in step ST1312 whether or not the term of contract of the designated BOX has expired. If expired, the center transmits voice guidance ④ in step ST1313 and then stops all of the operations. This voice guide is "your designated BOX NO. is not registered now." If not expired, it is further judged in step ST1314 whether or not application conditions are satisfied. If satisfied, it is next judged in step ST1315 which of a dedicated FAX (namely, the FAX 7 of FIG. 1) provided in a service system and a general-purpose FAX (namely, the FAX 8 of FIG. 1) the calling FAX terminal is. Thereby, FAX terminals which can accept the service are limited to dedicated FAX terminals which are provided in stores kept by specific corporations.

Further, if the calling FAX terminal is not of the group of the dedicated FAX terminals, the center transmits voice guidance ⑤ in step ST1317 and stops all of the operations. This voice guidance is "Your designated BOX cannot be used for registering drafts sent from your used store."

If it is judged in step ST1316 that the calling FAX terminal is of the group, it is further judged in step ST1317 whether or not the calling FAX terminal is provided in a predetermined area. Thereby, places at which FAX terminals accepting the service (namely, FAX terminals capable being used for registration of drafts) are provided are limited within the predetermined area. Practically, only dedicated FAX terminals placed within, for instance, Tokyo can utilize the service.

Incidentally, in this case, the center transmits voice guidance ⑤ in step ST1319 and then finishes all of the operations.

Further, if it is judged in step ST1315 that the calling FAX terminal is a general-purpose FAX terminal, it is further judged in step ST1320 whether or not this general-purpose FAX terminal can be used for registering drafts in case of the bulletin board service. In case where a general-purpose FAX terminal cannot be used for accepting the service, the center transmits voice guidance ⑥ in step ST1321 and then stops all of the operations. This voice guidance is "Your designated BOX NO. is a dedicated FAX NO. of a specific corporation XXXX." In contrast, if a general-purpose FAX terminal can be used for accepting the service, it is further judged in step ST1322 whether or not the general-purpose FAX terminal is provided in the predetermined area, similarly as in step ST1318. If the general-purpose FAX terminal is not within the predetermined area, the center transmits voice guidance ⑦ in step ST1323 and then stops all of the operations similarly as in step ST1318. This voice guidance is "BOX having your designated BOX NO. is not available from your used telephone due to restriction to a utilization area."

If within the predetermined area, it is further judged in step ST1324 whether or not an application term (namely, a term when drafts can be read) expires, similarly as in case where it is judged in step ST1318. If not, the center transmits voice guidance ⑧ in step ST1325 and then finishes all of the operations. This voice guidance is "Application term of your designated BOX NO. has expired." If not expire, it is next judged in step ST1326 whether or not application hours have passed. If passed, the center transmits voice guidance ⑨ and then finishes all of the operation. This voice guidance is "Your designated BOX NO. is not available and no draft can be read because application hours have passed."

As above described, application term and hours are predetermined or limited, and only applications transmitted from applicants within the predetermined application term and hours are valid in this embodiment. Thus services useful for suppliers (namely, specific corporations) for outputting drafts can be realized.

Further, if it is judged in step ST1326 that the application hours have not passed, it is next judged in step ST1328 whether the upper limit to the number of drafts registered in the designated BOX is exceeded. Thus the number of drafts registered within a predetermined term is restricted by preliminarily setting the number of drafts in the BOX by the information supplier (i.e., the specific corporation) for establishing BOXes. Thereby, a service which is supplied only to a predetermined number of first applicants for a prize contest or a buyer in mail-order selling can be realized. Incidentally, if the upper limit (namely, the number of users capable of reading a draft) is exceeded, the center transmits voice guidance ⑩ in step ST1329 and then stops all of the operations. This voice guidance is "Your designated BOX NO. is not available and no draft can be read because the predetermined limit to the number of registered drafts is exceeded." In contrast, if not exceeded, the center transmits voice guidance ⑪ to the FAX 7 or the general-purpose FAX 8 in step ST1330. This voice guidance is "Your designated BOX NO. is XXXX, isn't it? If correct, please push a button representing #. If wrong, please push buttons representing * and #". When the FAX terminal receives this voice guidance in step ST1331, the user inputs a confirmation code # in accordance with this voice guidance or inputs ID NO. specifying the user and a symbol # in step ST1332. On the other hand, the center is in a receiving state and stands by for a signal sent from the FAX terminal. Further, it is judged in step ST1333 which of a signal representing # and another signal representing (a numeral+#) the center receives. According to the result of this judgement, the following processing can be performed. If receiving the latter signal, the center transmits voice guidance ⑫ in step ST1334. This voice guidance is "You uses registered ID NO., don't you? Your ID NO. is XXXX? If correct, please push a button representing #. If wrong, please push buttons representing * and #". Thereafter, if a signal indicating a confirmation code # from the FAX terminal is received in step ST1335, the center transmits voice guidance ⑬ in step ST1336. This voice guidance is "There are XX sheets of the draft." On the other hand, if the former signal representing only # is received in step ST1333, the center transmits the voice guidance ⑬ of step ST1336.

When receiving this voice guidance, the user inputs a page designation code designating necessary pages of the draft in accordance with this voice guidance in step ST1337. Then, the center performs the following operation when receiving a page designation code in step ST1338. Namely, the center first transmits to the user in step ST1339 voice guidance ⑭ instructing to input a leading page. When receiving from the FAX terminal a signal indicating the leading page in step ST1340, the center further transmits to the user in step ST1341 voice guidance ⑮ instructing to input a final page. Incidentally, the voice guidance ⑭ and the voice guidance ⑮ are "Please input a leading page and push a button representing #" and "Please input a final page and push a button representing #", respectively. Further, when receiving from the FAX terminal a signal representing the final page in step ST1342, the center transmits voice guidance ⑯ in step ST1343. This voice guidance is "You wish to read draft from pages XX to YY, don't you? If correct, please push a button representing #. If wrong, please push buttons representing * and #." Thereafter, when receiving from a confirmation code # in step ST1344, the center calculates a charge for reading and judges whether the charge is equal to or more than 10,000 yen, in step ST1345. If more than 10,000 yen, the center transmits voice guidance ⑰ and all of the operations are finished in step ST1346. This voice guidance is "You cannot read the draft because the charge exceeds 10,000 yen." Further, if the charge is less than 10,000 yen, the center transmits voice guidance ⑱ in step ST1347 and transmits these pages to the FAX terminal in step ST1348. Incidentally, this voice guidance is "It is in course of preparation. (Background music is played.) Please push a start-button and put back the receiver."

As above described, an upper limit to a charge for reading is predetermined and a reading operation is not performed if a charge exceeds the upper limit, for the same reason as in case of the reading operation in the message board service.

Further, in case of the bulletin board service, the upper limit is predetermined as 10,000 yen. However, as long as can be treated in the settlement processing in this embodiment, an appropriate amount other than 10,000 yen may be employed as the upper limit.

Figure 31:
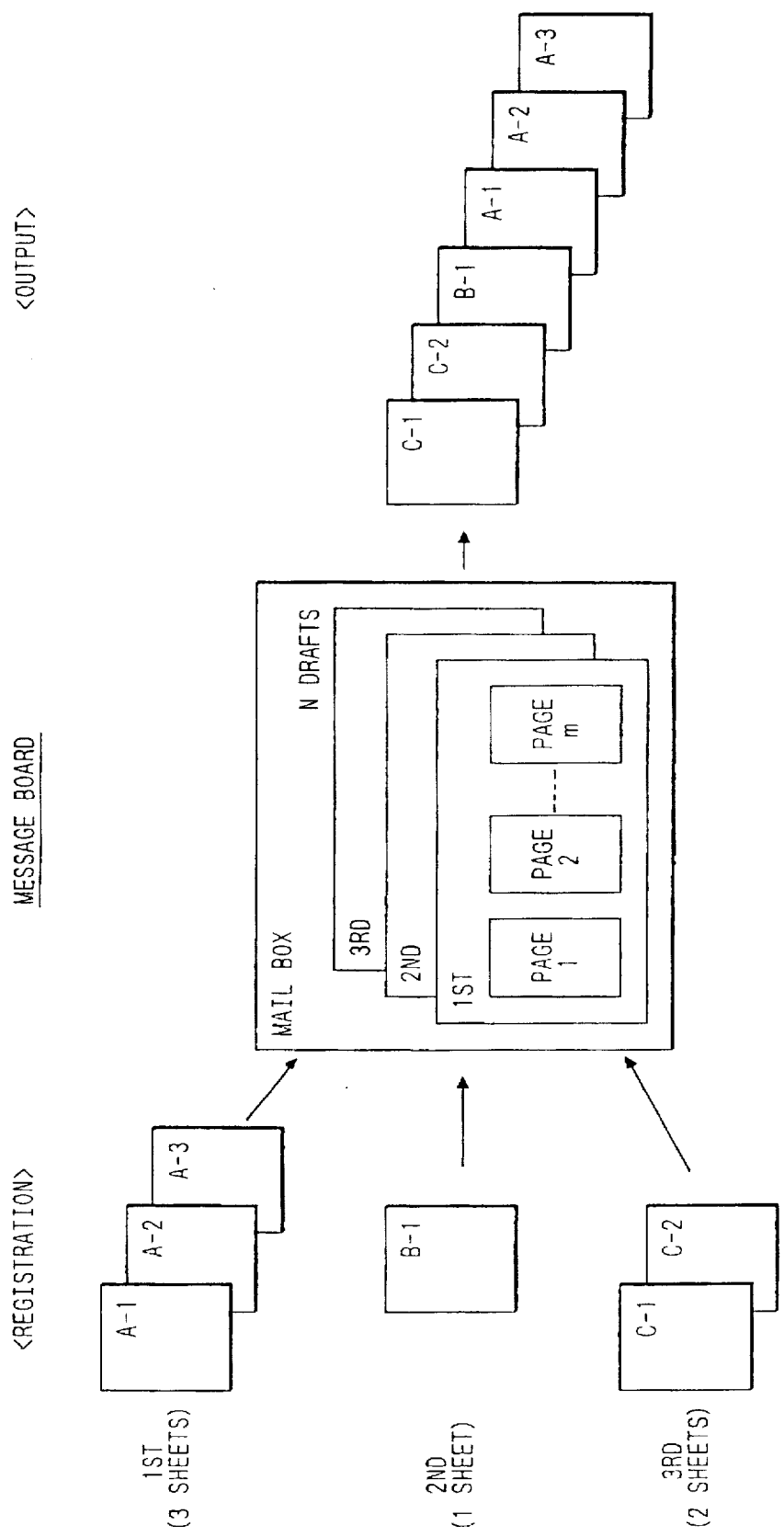
FIG. 31 is a diagram for illustrating the sequence of drafts outputted in case of a message board service.
Figure 32:
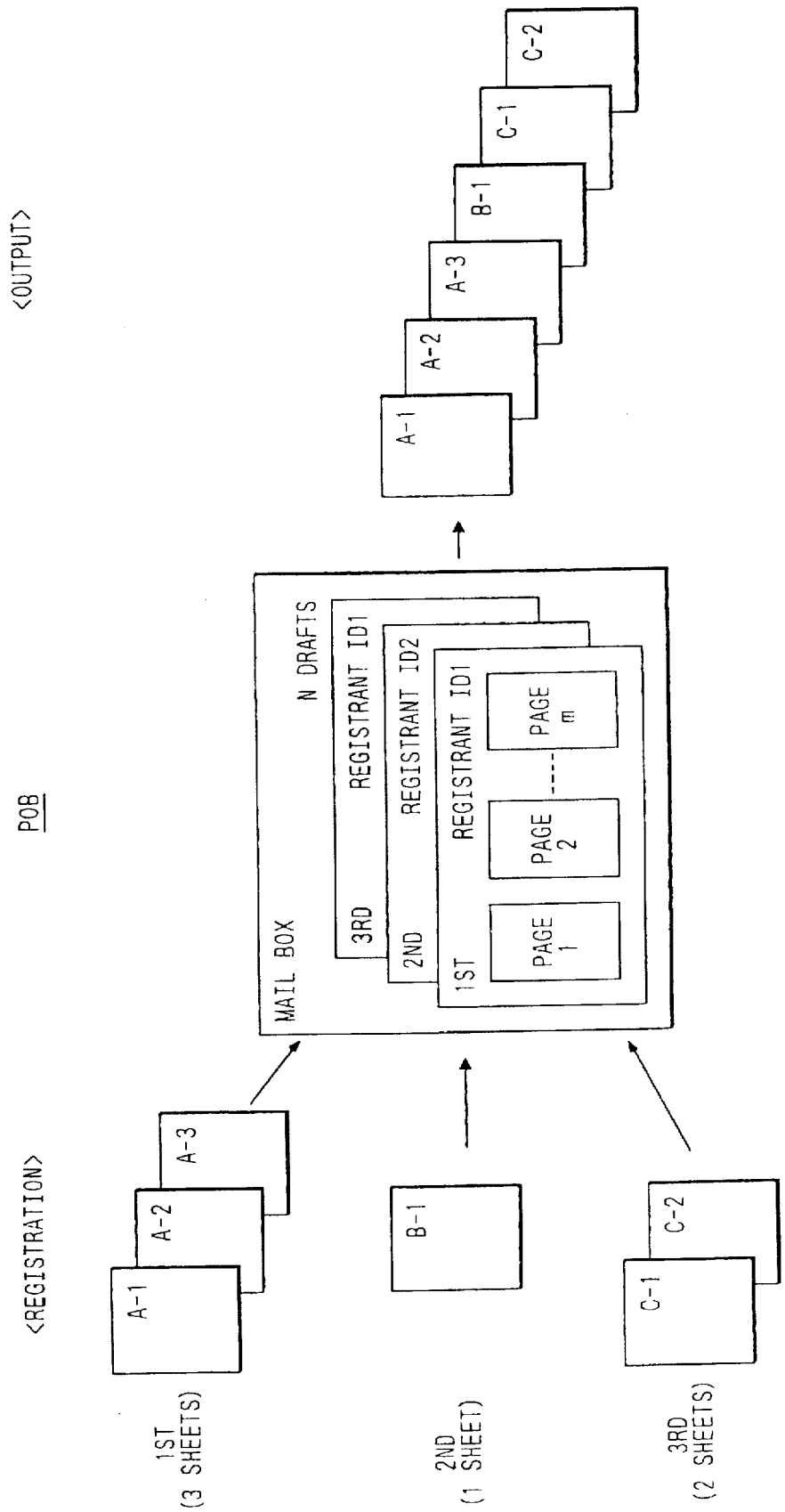
FIG. 32 is a diagram for illustrating the sequence of drafts outputted in case of a POB service.

In the foregoing description, the operations of the terminal and the center in each service have been described. Hereinafter, the order of reading or outputting registered drafts in each case of the message board service and the POB service will be described. FIG. 31 is a diagram for illustrating the order of reading or outputting registered drafts in case of the message board service. FIG. 32 is a diagram for illustrating the order of reading or outputting registered drafts in case of the POB service. As is apparent from FIG. 31, in case of the message board service, drafts are read from the last registered one. Namely, a thirdly registered draft C is first read out. The reason why the order of reading drafts is set like this is because of the facts that the message board service is often utilized for leaving a message between users and that the last registered message most clearly indicates what a user means.

In contrast, in case of the POB service, drafts are read from the first registered draft A as illustrated in FIG. 32. The reason why the order of reading drafts is established like this is because of the fact that the POB service is often utilized by unspecified users to make applications for a prize contest or a mail-order selling and therefore, the first registered draft should be processed preferentially.

FIGS. 33 and 34 illustrate information stored in the BOX management database. The first day and the last day of the term of contract of a BOX and the maximum number of drafts which can be stored in this database are predetermined and stored in the database. Further, FIG. 34 illustrates information stored in the BOX management database in case where application conditions are established. Moreover, application conditions established for each of suppliers who establish a BOX are preliminarily registered therein. Incidentally, as described in relation to the POB service, areas in which the general-purpose FAX is used, date and hour at which a draft can be registered, and a limit to drafts which can be registered can be suitably determined according to manners of utilization by the supplier.

Figure 35:
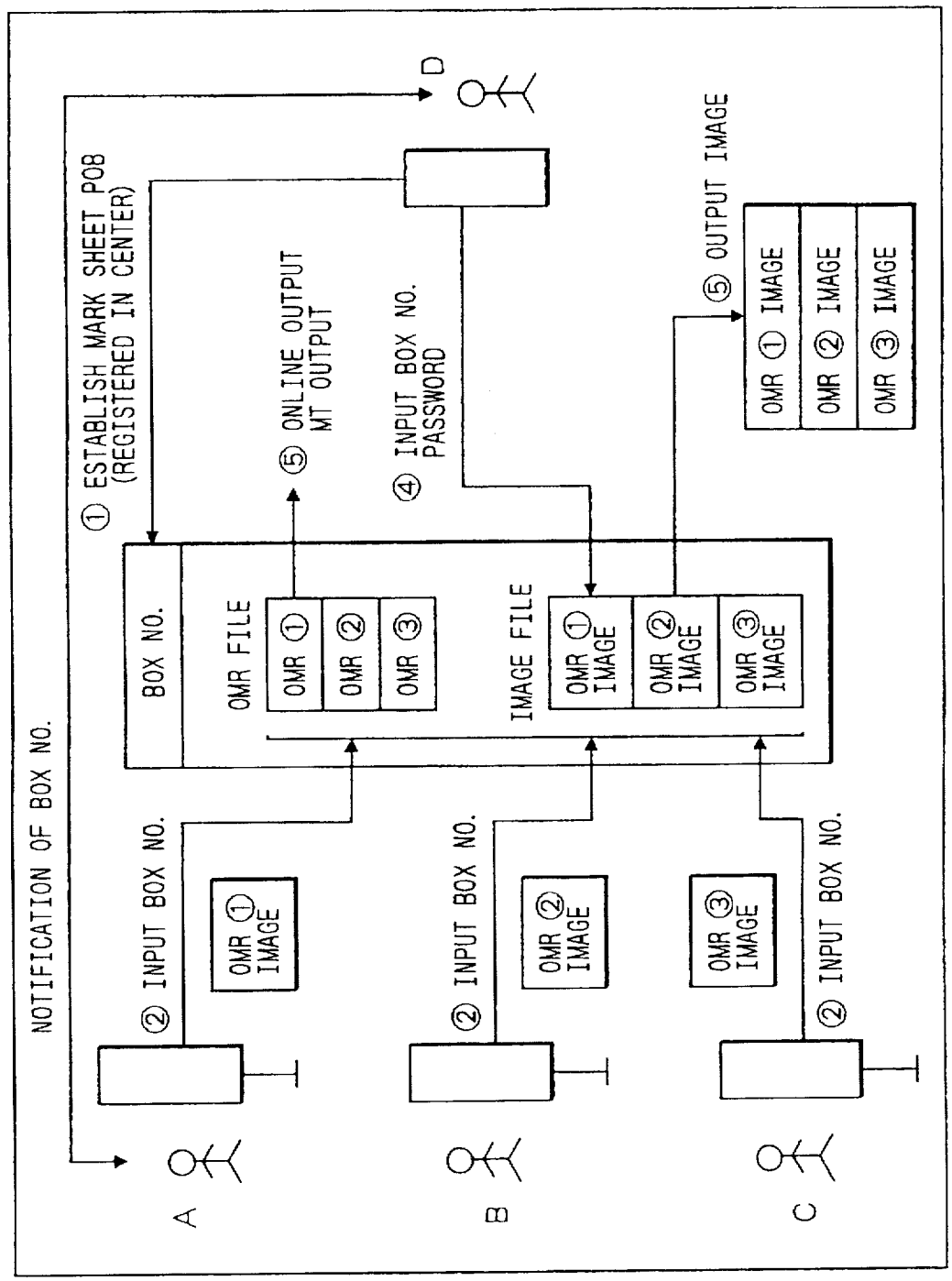
FIG. 35 is a schematic block diagram for illustrating a mark sheet POB in case of a manner of application of the present invention.
Figure 36:
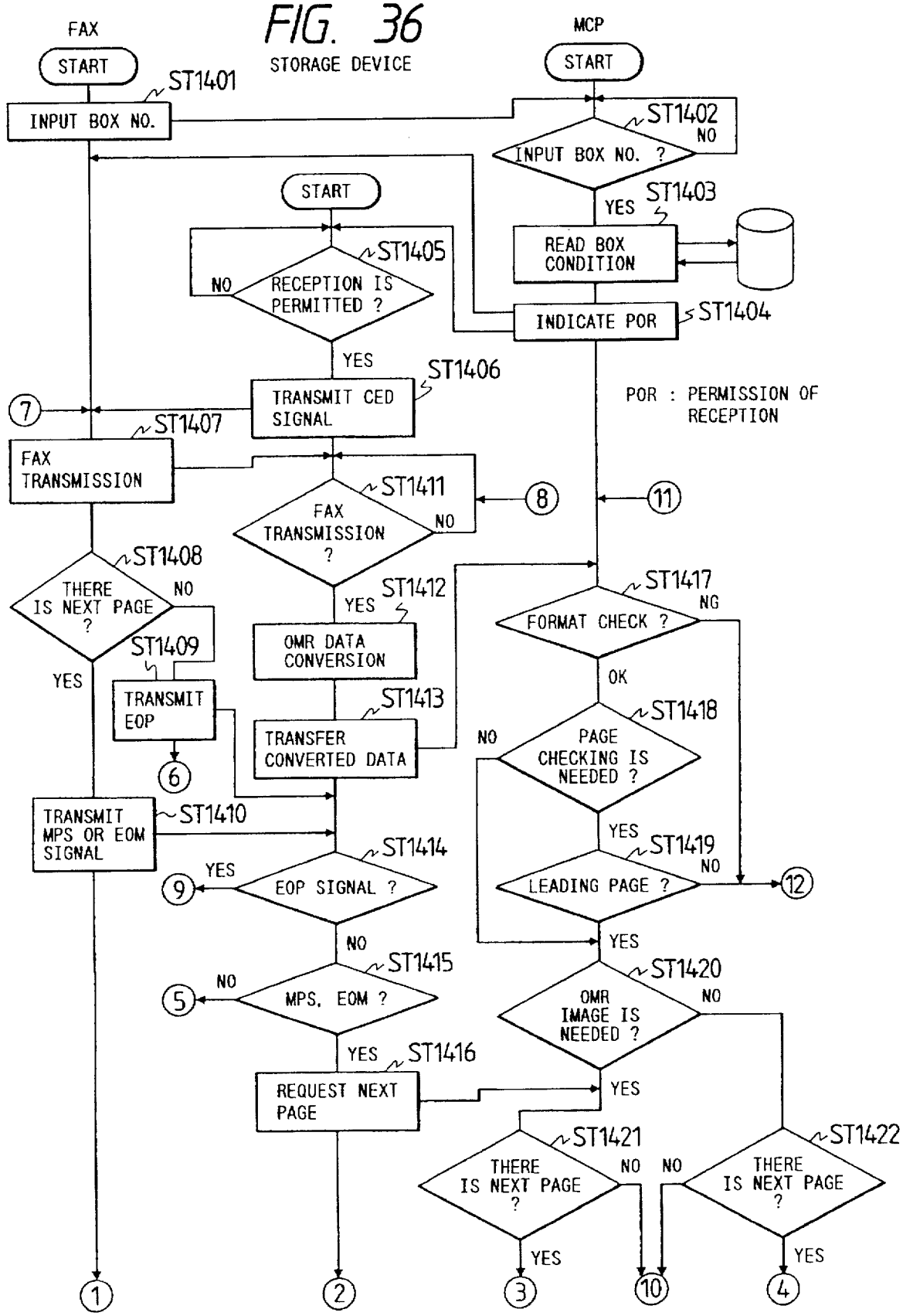
FIGS. 36, 37, 38 and 39 are flowcharts for illustrating operations of registration of drafts in case of a mark sheet POB service.
Figure 37:
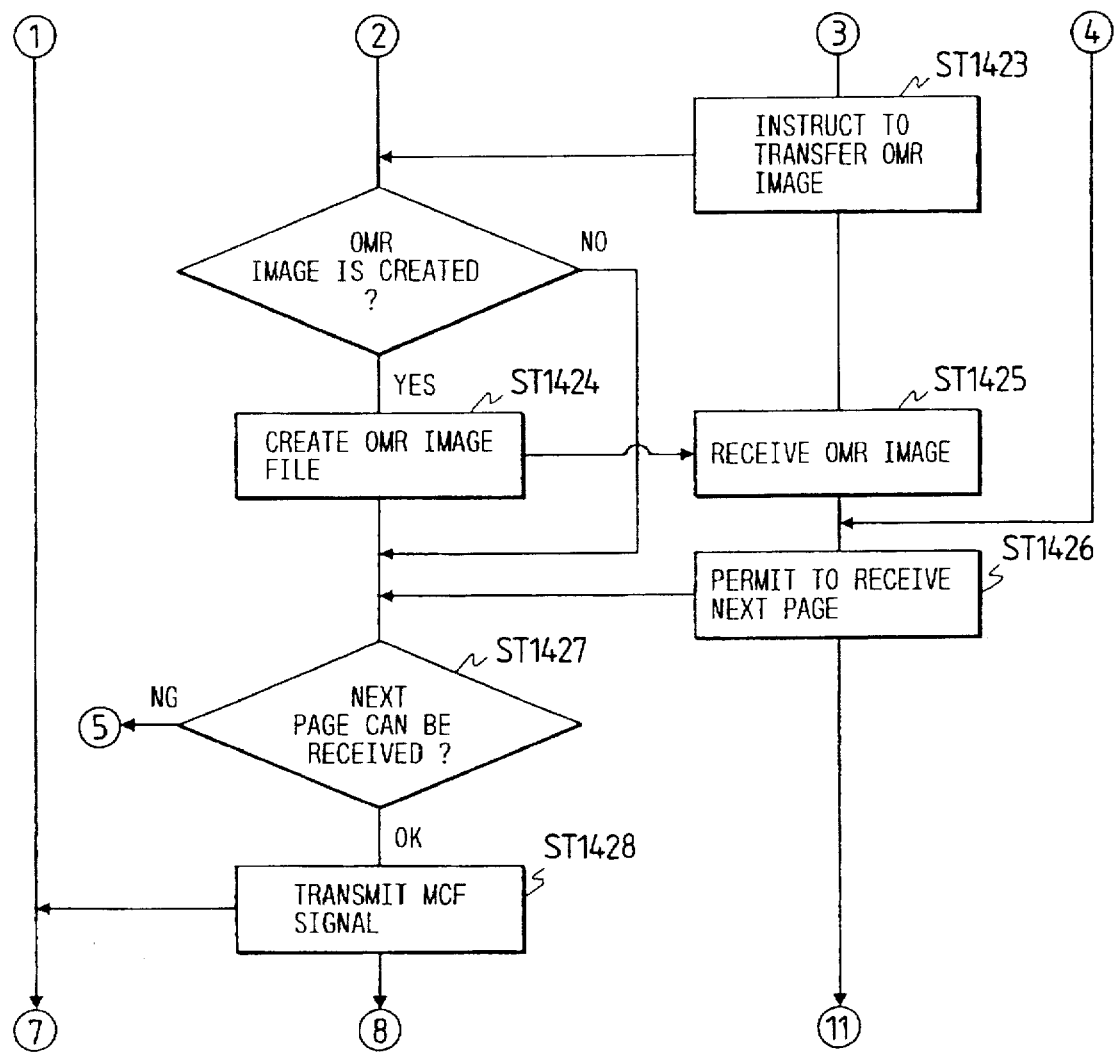

Next, a mark sheet POB, which is a special application manner of the POB, will be described hereinbelow. FIG. 35 is a diagram for illustrating the manner of application of the mark sheet POB. Further, BOX NO., which is effective in the term of contract thereof, can be registered by establishing a BOX in order to collect questionnaires, to accept requests and to collect a large amount of information on orders in case of the mail-order selling. A contractor of the BOX notifies a user of a BOX NO. Then, the user registers a draft by using the BOX NO. as a key. The supplier (namely, the contractor of the BOX) outputs information on a draft according to the BOX NO. and a password. Further, only an OMR (Optical Mark Reader) draft can be used as the draft. Image data of the OMR draft is first recognized, and next the result of the recognition is converted into bit-data. Subsequently, the bit-data is registered in an OMR file. Moreover, the OMR draft is stored in an ordinary image file as image data.

As shown in FIG. 35,

① First, a mark sheet POB is established and BOX NOS. are determined and notified to users.

② Then, a user puts marks on an OMR draft (namely, a user mark sheet form) and further inputs (namely, transmits) the OMR draft together with a BOX NO. Incidentally, the BOX NOS. corresponds to format NOS. of the OMR sheets in one-to-one correspondence relation.

③ Image file of the transmitted OMR draft is stored for a predetermined period (in this case, a standard default value is one week). Incidentally, another value may be set as a value of the predetermined period.

④ The user input a BOX NO. and a password.

⑤ Further, the user reads data, namely, bit-data registered in the OMR file or image data stored in the image file.

Next, an operation of registering drafts in case of the mark sheet POB service will be described hereinbelow by referring to FIGS. 36 to 39 which are flowcharts for illustrating operations of the MCP 1, the storage device 2 and the FAX terminal, respectively. As shown in these figures, first, a BOX NO. is inputted from the FAX terminal in step ST1401. Then, the MCP 1 receives this BOX NO. in step ST1402. Subsequently, data corresponding to the BOX NO. is read from the BOX management database in step ST1403. If it is judged from the read data that this request for reading a draft should be permitted, a reception permission indication signal is transmitted to the FAX terminal and the storage device 2 in step 1404.

The storage device 2 is in a receiving state and stands by for this reception permission indication signal. When receiving this signal in step ST1405, the storage device 2 transmits a CED signal to the FAX terminal in step ST1406. On the other hand, when receiving the reception permission indication signal from the MCP 1 and the CED signal from the storage device 2, the FAX terminal starts a FAX transmission in step ST1407. Here, a draft to be transmitted is an OMR sheet to which the user writes predetermined items. Upon completion of a transmission of one page of the draft, it is judged in step ST1408 whether or not there is a second page of the OMR draft to be transmitted. If not, an EOP signal is sent to the storage device 2 in step ST1409. If there is the second page, an MPS signal or an EOM signal is transmitted to the storage device 2 in step ST1410, and the program returns to step ST1407. Incidentally, an operations of the FAX terminal will be described later (see FIG. 38).

On the other hand, the storage device 2 is in a receiving state and stands by for a FAX transmission of step ST1407. When receiving this FAX transmission in step ST1411, OMR data is read bit by bit and further converted into data (composed of bits each having 0 or 1) having a predetermined format in step ST1412. Then, the data obtained as the conversion is transferred to the MCP 1 in step ST1413. Thereafter, it is judged in step ST1414 whether or not an EOP signal is received from the FAX terminal. If not, it is next judged in step ST1415 whether an MPS signal or an EOM signal is received. If received, this indicates that the next page of the OMR draft is transmitted from the FAX terminal. Thus, in step ST1416, the device 2 sends to the MCP 1 a signal indicating that the next page of the draft is transmitted thereto.

On the other hand, when receiving the converted OMR data from the storage device 2 in step ST1413, it is checked in step ST1417 whether or not the received data corresponds to the designated BOX NO. Namely, correspondingly to each BOX, the format of OMR data is predetermined. Thus it is checked whether the OMR data transmitted in step ST1413 has the format corresponding to the BOX NO. inputted in step ST1402. If judged as having such a format, it is next judged in step ST1418 whether or not a page checking should be performed. Namely, it is checked whether or not a predetermined page-checking condition is satisfied in case that there are a plurality of OMR sheets of a set.

This checking operation will be described further detailedly hereinbelow by giving examples of usages of kinds of OMR sheets.

(a) All-of-Sheets-Required Condition Sheet

In case of this kind of sheets, it is necessary for being judged as satisfying a condition (namely, necessary for permission of a transmission) to have a complete set of sheets. If one of input sheets is lacked or follows the wrong order, it is determined that an OMR recognition error occurs and all of the input sheets are invalid. In this case, it is judged in step ST1418 that the page checking should be performed. In addition, in this application, this kind of an OMR sheet draft is referred to as of the type that only a set of sheets can satisfy a requirement.

(b) A-Sheet-Satisfying Condition Sheet

In case of this kind of sheets, if there is a sheet of the set, a transmission of the set is permitted. In this case, it is judged in step ST1418 that the page checking should not be performed. In addition, in this application, this kind of an OMR sheet draft is referred to as of the type that even a sheet can satisfy a requirement.

(c) All-of-Sheets-Required-But-No-Checking Sheet

In case of this kind of sheets, it is necessary for being judged as satisfying a condition to have all of the input sheets. However, such a set of the input sheets is judged as normal even when one of the input sheets is lacked. In this case, it is judged in step ST1418 that the page checking should not be performed.

Thus, the judgement on the necessity of the page checking is made in step ST1418 according to the above described kinds of OMR sheets. Incidentally, if it is judged that the page checking should be performed, it is further checked in step ST1419 whether or not the OMR data transferred in step ST1413 is of a leading page. If it is judged as the result of this check that the OMR data is of the leading page, it is further judged in step ST1420 whether or not there is image information on the OMR sheet draft.

As above described, the mark sheet POB service is often used for making orders in a mail-order selling and answering to a questionnaire. In such cases, an OMR sheet is used as an order form and a questionnaire form. When used as an order form and a questionnaire form, the user requires an OMR sheet in which information used as data (e.g., Commodity NO., Answer NO., Mark Information Recording Area) and information used as image information (Address And Name of Client, contents no included in a group of answer words (corresponding to I1 and I2 of FIG. 40)) coexist as illustrated in FIG. 40.

Figure 40:
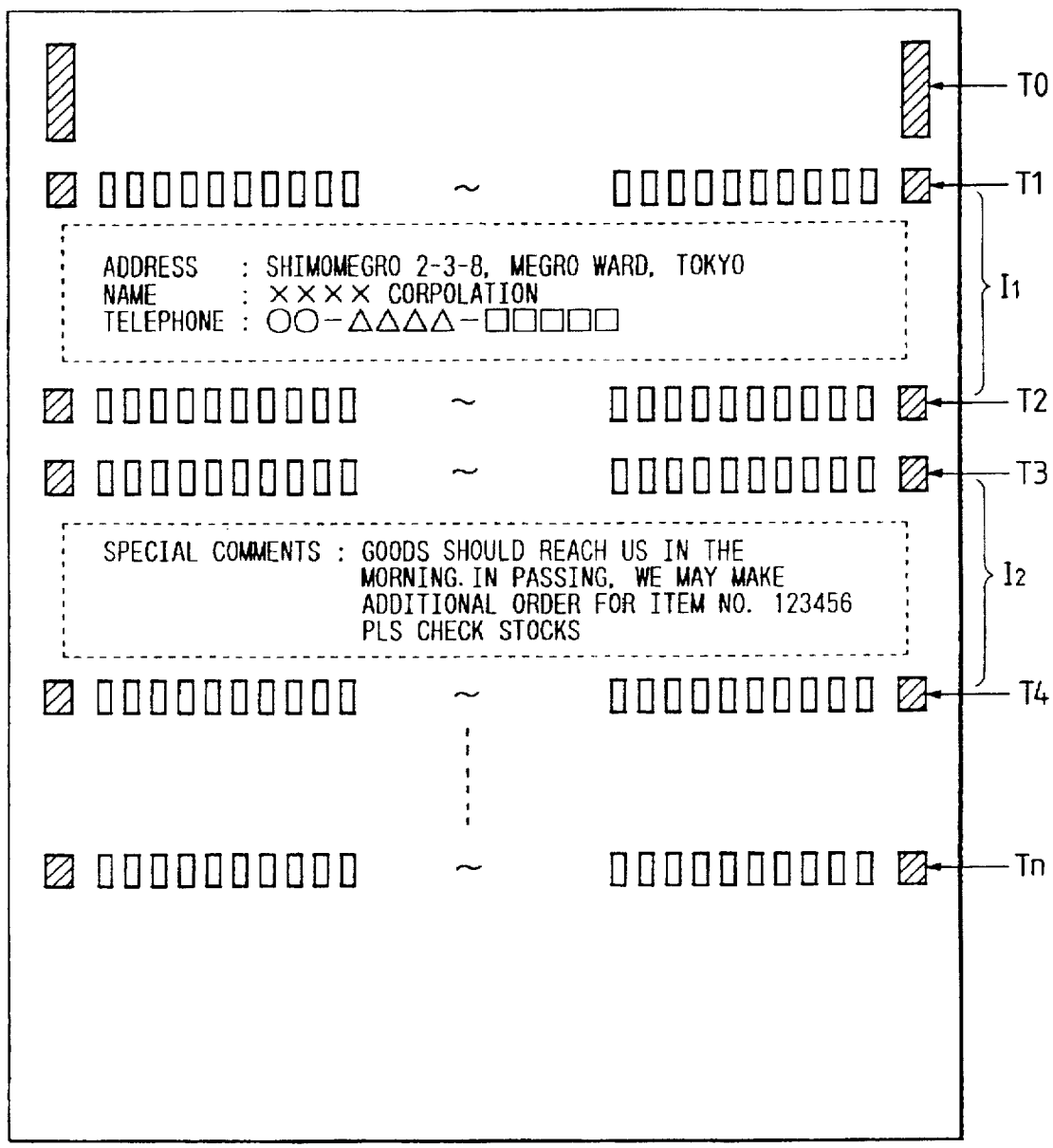
FIG. 40 is a diagram for illustrating an optical mark reading (OMR) sheet employed in a mark sheet service of the present invention.

The OMR sheet of FIG. 40 is used as an order form for a mail-order selling. As is apparent from this figure, an address of a customer ordering goods is described in the image information area I1, and special comments not included in mark information are described in the area I2.

Figure 41:
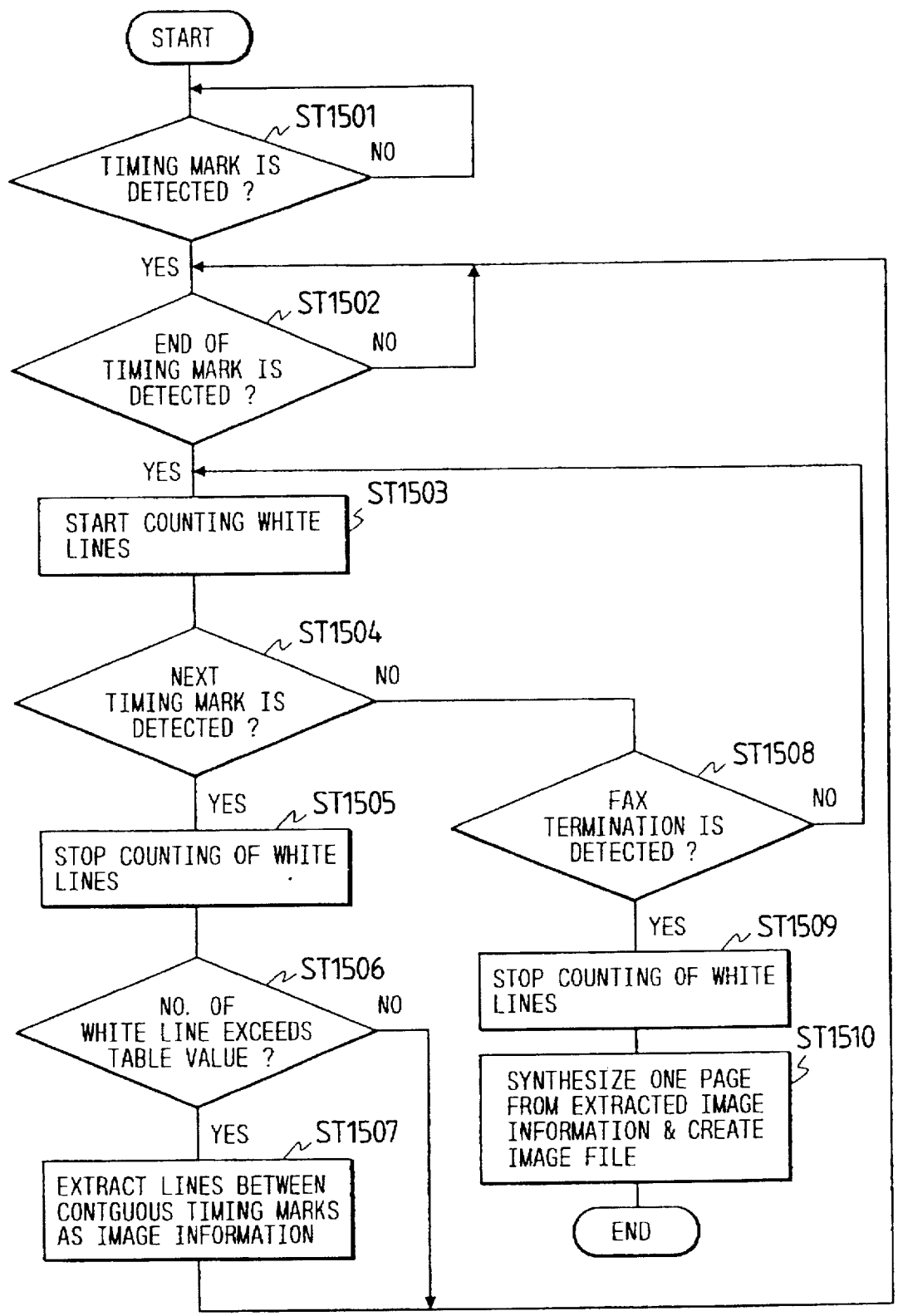
FIG. 41 is a diagram for illustrating an operation of extracting data area from an OMR sheet.

In this embodiment, the utilization of an OMR sheet in which such kinds of information coexist is realized by separately extracting the area for OMR sheet drat data and the area to be treated as image data. FIG. 41 is a flowchart for illustrating an operation of separately extracting the data areas when using such an OMR sheet. Incidentally, this operation is performed by the storage device 2. As shown in FIG. 41, when detecting an OMR sensing mark (T0 of FIG. 40) from data transmitted from the FAX terminal (in step ST1407 of FIG. 36), the device recognizes that the received FAX draft is an OMR. sheet, and waits for a detection of a first timing mark (T1). When detecting the mark T1 in step ST1501, the device waits for the last line of the first timing mark. Then, when detecting the last line of the first timing mark in step ST1502, the device starts to count white lines in step ST1503. Thereafter, the device stands by until the next timing mark T2 is detected. When detecting the mark T2 in step ST1507, the device stops the operation of counting white lines in step ST1505, which operation was started in step ST1503.

Next, the count of white lines is compared with a predetermined table value in step ST1506. If the former exceeds the latter, the device extracts information representing the lines between the timing marks T1 and T2 as image information in step ST1507.

Incidentally, this table value corresponds to the number of white lines between the timing marks corresponding to mark lines. In case of FAX standard mode communication, the interval between the contiguous timing marks is set as 115 lines. In case of fine mode communication, such an interval is set as 230 lines. (Such an interval may be preferably changed according to the manner of usage of FAX.) Namely, if the count is equal to the table value, the lines between the timing marks are judged as mark lines. In contrast, if the former exceeds the latter, such lines are judged as of the image information area.

The above-mentioned operations from step ST1502 to step ST1507 are repeated until a FAX termination is detected in step ST1508. When detecting the FAX termination in step ST1508, the device stops the operation of counting white lines in step ST1509 and then synthesizes image information of one page from the extracted image information in step ST1510 to create an image file.

Turning back to FIG. 36, if it is judged in step ST1420 that there is an OMR image, the program advances to step ST1421. If it is judged in step ST1420 that there is no OMR image, the program advances to step ST1422. In steps ST1421 and 1422, it is judged whether or not there is the next page. This checking is to check the above stated All-of-Sheets-Required Condition Sheet. If it is judged that there is the next page, the following operation is performed. Namely, 1 case where there is OMR image, the program advances from step ST1421 to step ST1423 whereupon a signal indicating that image information is transferred is transmitted to the device 2. When receiving this signal, the device 2 creates an OMR image file in step ST1424 as described above and transmits the file to the MCP 1. When receiving this file in step ST1425, the MCP 1 transmits to the storage device 2 in step ST1426 a signal indicating that the reception of the next page is allowed. On the other hand, in case where it is judged in step ST1420 that there is no OMR image, the foregoing operations from step ST1423 are not effected but a permission signal is transmitted in step ST1426. After transmitting the permission signal in step ST1426, the MCP 1 returns to step ST1417 and thereafter receives data converted from the next page of the OMR draft. Then, the MCP 1 repeats the above described operations again.

The storage device 2 is in a receiving state and stands by for the permission signal. When receiving this signal in step ST1427, the device 2 transmits an MCF signal to the FAX terminal in step ST1428. Then, the device 2 returns to step St1411 whereupon the device becomes in a receiving state and stands by for the next page of the OMR sheet draft transmitted from the FAX terminal. The next page is processed as above described. Further, when receiving the MCF signal from the storage device 2, the FAX terminal returns to step ST1407 whereupon the FAX starts to transmit the next page of the OMR sheet draft again.

Figure 38:
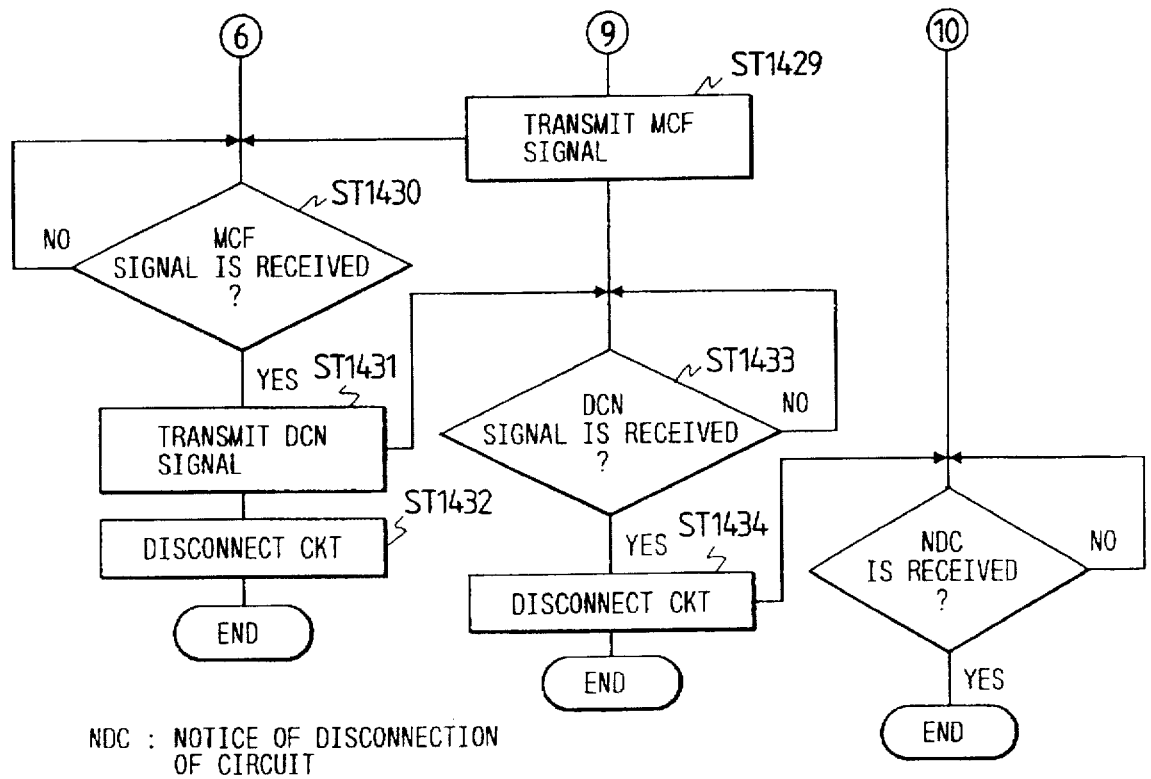
Figure 39:
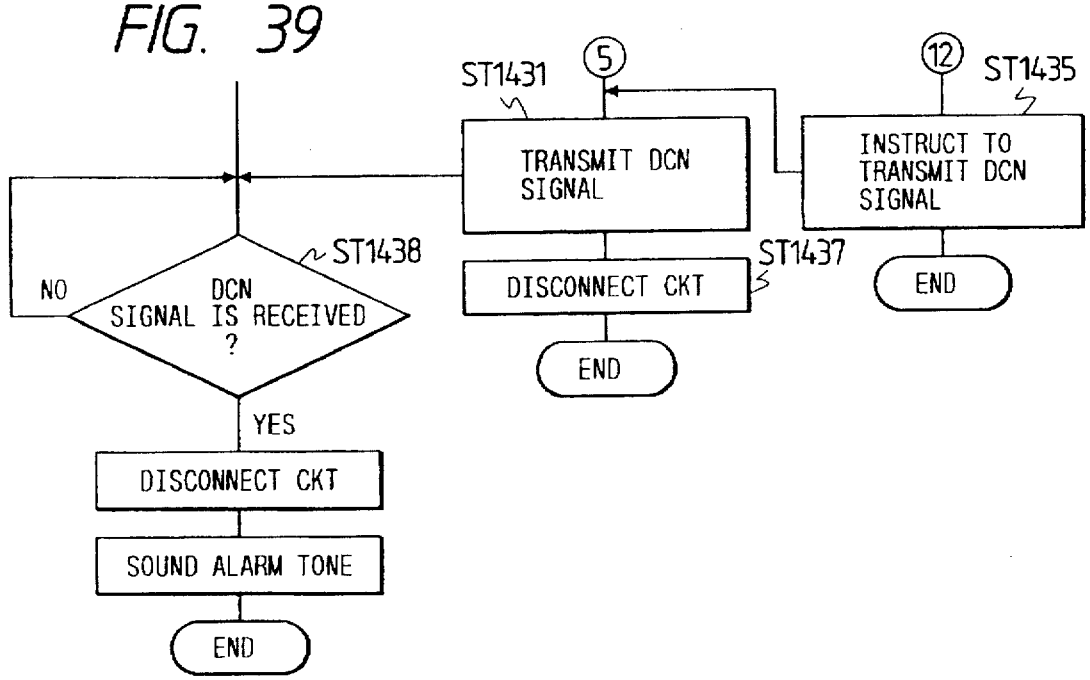

Next, an operations of the FAX terminal to be effected after the EOP signal is transmitted in case where it is judged in step St1408 that there is not the next page of the OMR steer draft, an operation of the storage device 2 to be effected in case where the EOP signal is received in step ST1414, and a operation of the MCP 1 to be effected in case where it is judged in steps ST1421 and ST1422 that there is not the next page of the OMR sheet draft, will be described hereinbelow. FIG. 38 illustrates these operations. As shown in this figure, an MCF signal is first transmitted from the storage device 2 to the FAX terminal in step ST1429. When receiving the FAX terminal in step ST1430, the FAX terminal sends back a DCN signal to the storage device 2 and then disconnects the circuit in step ST1432.

On the other hand, when receiving the DCN signal in step ST1433, the device 2 disconnects the circuit in step ST1434 similarly and then notifies the MCP1 of the disconnection of the circuit. Moreover, when the MCP 1 receives this signal indicating the disconnection of the circuit in step ST1435, the operation of the entire system is finished.

Furthermore, in case where the device 2 does not receive the MPS signal or the EOM signal in step ST1415, and in case where NG event occurs when the MCP 1 operates in steps ST1417 and ST1419, an error processing is performed, which processing will be described hereinbelow. Namely, the MCP 1 transmits to the storage device 2 in step ST1435 an instruction signal indicating that a DCN signal should be transmitted (here, a case where an error occurs in steps ST1417 and ST1419 is described). When receiving such an instruction signal transmitted by the MCP 1, the storage device 2 transmits a DCN signal to the FAX terminal in step ST1436. Incidentally, in case where the MPS signal or the EOM signal is not received in step ST1415, the device 2 transmits to the FAX terminal the DCN signal even if the instruction signal is not received from the MCP 1. After transmitting the DCN signal, the circuit is disconnected in step ST1437. When receiving this DCN signal in step ST1438, the FAX terminal disconnects the circuit similarly in step ST1439 and sounds an alarm tone in step ST1449. Then, the error processing is completed. As the result of performing the mark sheet POB service as described above, there can be provided a communication system which is very convenient for applications such as operations of making orders in a mail-order selling and answering to a questionnaire.

Additionally, FIG. 42 illustrates an example of output information in case of the mark sheet POB service. This example is an order form outputted in case of a mail-order selling. As is apparent from this figure, this order form is obtained by outputting image information synthesized and extracted by the foregoing method from the information which is converted from the result of recognition of the mark information. Regarding the conversion of mark information into image information, the format is predetermined correspondingly to each BOX as above described. Thus, a user of the mail-order selling can make orders for desired goods by utilizing the OMR sheet, putting predetermined marks thereon and registering the draft (i.e., the OMR sheet) in a BOX. On the other hand, a mail-order firm can read the draft converted into an image from the BOX as the order form. Thus, operations of making orders in the mail-order selling and of answering to a questionnaire can be effected by utilizing a mail-box communication without using postal services.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A facsimile system comprising:
   a private network;
   a plurality of intra-network terminals available to individuals and connected to the private network, wherein at least one of said intra-network terminals is utilized as a sending terminal by a sending individual for inputting and transmitting documents and a corresponding password, and at least one of said intra-network terminals is utilized as a receiving terminal by a receiving individual to receive the documents; and
   an intra-network center for temporarily storing the documents and password, forwarding the documents to the receiving terminal in response to the entry of the password in the receiving terminal by the receiving individual, and charging the sending individual and the receiving individual;

wherein, when the sending terminal transmits the documents to the intra-network center, the intra-network center calculates a first charge for storing the documents and notifies the sending individual of the first charge, and, when the receiving terminal receives the documents from the intra-network center, the intra-network center calculates a second charge for forwarding the documents and notifies the receiving individual of the second charge.

2. A facsimile system according to claim 1, wherein the intra-network center calculates the first charge when the receiving terminal receives all the documents transmitted by the sending terminal and the documents are complete.

3. A facsimile system according to claim 1, wherein the intra-network center notifies the sending individual and the receiving individual of the first charge and the second charge, respectively, using a bar code to enable the first charge and the second charge to be registered in a cash register.

4. A facsimile system according to claim 1, wherein in receiving all documents that the sending individual transmits using the sending terminal, the intra-network center stores the received documents, and in failing to receive all the documents, the intra-network center cancels the received documents.

* * * * *